United States Patent
Kawata et al.

(10) Patent No.: US 6,219,149 B1
(45) Date of Patent: *Apr. 17, 2001

(54) PRINT PROCESSING APPARATUS

(75) Inventors: Tetsuro Kawata; Yuji Onozawa; Takashi Nagao; Noriaki Seki; Kazutaka Hirata; Yoshinori Wada; Hiroshi Ishikawa, all of Nakai-machi (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,361

(22) Filed: Mar. 31, 1998

(30) Foreign Application Priority Data

Apr. 1, 1997 (JP) .................................................. 9-082699
Jun. 11, 1997 (JP) .................................................. 9-153500

(51) Int. Cl.[7] .................................................. G06F 15/00
(52) U.S. Cl. ..................... 358/1.15; 358/1.9; 358/1.11
(58) Field of Search .................................. 358/1.14, 1.15, 358/1.16, 1.17, 1.1, 1.2, 1.9, 1.11, 1.18

(56) References Cited

U.S. PATENT DOCUMENTS

| 5,301,344 | | 4/1994 | Kolchinsky | 395/800 |
|---|---|---|---|---|
| 5,511,156 | * | 4/1996 | Nagasaka | 395/133 |
| 5,542,031 | * | 7/1996 | Douglass et al. | 395/114 |
| 5,768,489 | * | 6/1998 | Adachi et al. | 395/117 |
| 5,805,781 | * | 9/1998 | McIntyre et al. | 395/117 |

FOREIGN PATENT DOCUMENTS

| 6-131155 | 5/1994 | (JP) | G06F/7/00 |
|---|---|---|---|
| 6-282432 | 10/1994 | (JP) | G06F/9/38 |

* cited by examiner

Primary Examiner—Jerome Grant, II
Assistant Examiner—Douglas Tran
(74) Attorney, Agent, or Firm—Oliff & Berridge, PLC

(57) ABSTRACT

A print processing apparatus realizes high speed processing of input data which includes various types of drawing objects such as images, graphics and characters. In the apparatus, input data generated by an input data generating unit is converted into intermediate data in an intermediate data generating element. An intermediate data order controlling element rearranges intermediate data pieces based on overlap therebetween and classifies them into groups, in each of which the data pieces can be processed in parallel. A group ID indicating a group for parallel processing, a hardware configuration ID and so on are assigned to the intermediate data piece. A rasterizing unit receives configuration data from a configuration data administering element, if necessary, in accordance with the hardware configuration ID assigned to the intermediate data piece, and rewrites a function of a reconfigurable rasterizing element under the control of the reconfiguration controlling element. The rasterizing unit rasterizes the intermediate data into dot data and provides it to an outputting unit.

36 Claims, 61 Drawing Sheets

- CONTROL POINT OF ORIGINAL BÉZIER CURVE
- CONTROL POINT OF BÉZIER CURVE DIVIDED INTO TWO
- ‖ SYMBOL INDICATING MIDDLE POINT DIVISION

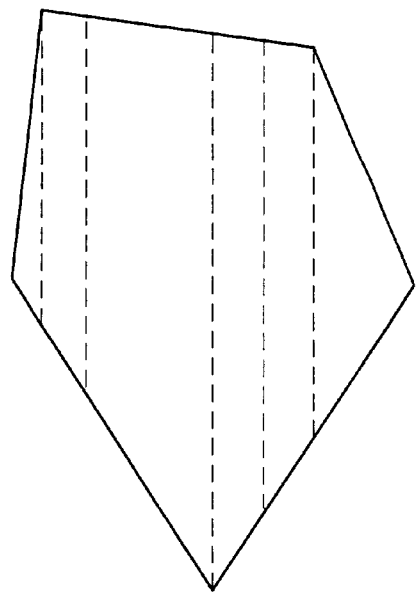
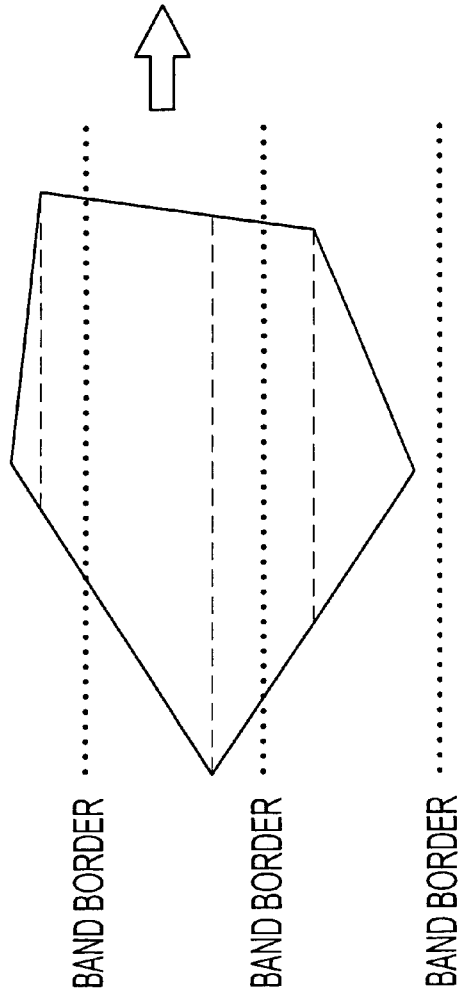
FIG. 7

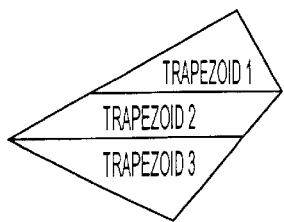

| OID | OTYPE | NUMBER OF TRAPEZOIDS (3) | BBOX | PID (F) |
|---|---|---|---|---|
| COLOR | TRAPEZOID 1 | TRAPEZOID 2 | TRAPEZOID 3 | |

OID: INCREMENTED IN ORDER OF DRAWING COMMAND
OTYPE: CHARACTER, FIGURE, IMAGE
BBOX: BOUNDING BOX
PID: RASTERIZING PROCESS ID
COLOR: VALUE OF CMYBK

DATA CORRESPONDING TO CHARACTER / FIGURE DRAWING COMMAND

FIG. 8A

| OID | O TYPE | NUMBER OF TRAPEZOIDS (3) | B BOX | PID (I1) |
|---|---|---|---|---|
| TRAPEZOID 1 | RH1 | RD1 | TRAPEZOID 2 | RH2 | RD2 |
| TRAPEZOID 3 | RH3 | RD3 | | |

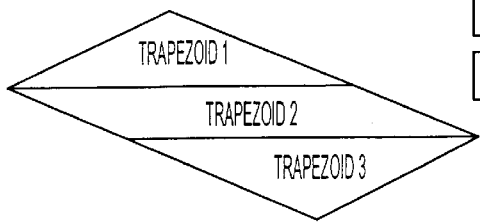

RH: IMAGE HEADER
RD: IMAGE DATA

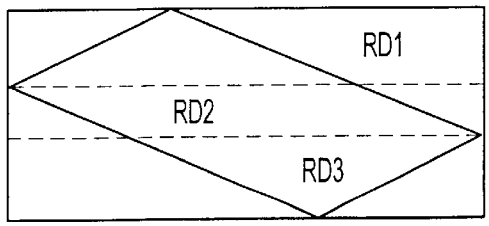

DATA CORRESPONDING TO IMAGE DRAWING COMMAND

FIG. 8B

SMALLEST RECTANGLE OF VECTOR AFTER TRANSFORMATION

SMALLEST RECTANGLE OF EACH TRAPEZOID DATA

| BID | HCID | OCOUNT(n) | OD1 | OD2 | ••• | ODn |
|-----|------|-----------|-----|-----|-----|-----|
| BID | HCID | OCOUNT(m) | OD1 | OD2 | ••• | ODm |
| BID | HCID | OCOUNT(k) | OD1 | OD2 | ••• | ODk |

BID : BAND ID
HCID : HARDWARE CONFIGURATION ID
OCOUNT : NUMBER OF OBJECTS
OD : OBJECT DATA (1, 2, ....., n)

FIG. 10

PAGE REGION

GROUP
(901, 902)
(903, 904)

OUTPUT DATA
(OBJECT ID, GROUP ID,
ORDER OF DRAWING)
901, 1, 1
902, 1, 2
903, 2, 1
904, 2, 2

| GROUP ID | OBJECT ID | RASTERIZING PROCESS ID | AREA OF BOUNDING BOX |
|---|---|---|---|
| 1 | 901 | CODE A | 400 |
| 2 | 903 | CODE G | 200 |

| HARDWARE CONFIGURATION ID | RESOURCE FOR OBJECT 901 | RESOURCE FOR OBJECT 903 | PROCESSING TIME (ms) |
|---|---|---|---|
| X | 3 | 2 | 20 |
| Y | 4 | 1 | 30 |

FIG. 15

PID MEANS RASTERIZING PROCESS ID

TARGET BOUNDING BOX OVERLAPPING SET OF BOUNDING BOXES

TARGET BOUNDING BOX NOT OVERLAPPING SET OF BOUNDING BOXES

| OVERLAP BETWEEN BOUNDING BOXES / KIND OF PROCESS | (A) TARGET BOUNDING BOX OVERLAPPING SET OF BOUNDING BOXES | (B) TARGET BOUNDING BOX NOT OVERLAPPING SET OF BOUNDING BOXES |
|---|---|---|
| SAVE | CONCATENATION OF OBJECTS FOR EACH RASTERIZING PROCESS ID | CONCATENATION OF OBJECTS FOR EACH RASTERIZING PROCESS ID |
| DIFFERENT | FLUSHING OF OUTPUT BUFFER | CONCATENATION OF OBJECTS FOR EACH RASTERIZING PROCESS ID |

FIG. 41

BEFORE UPDATE OF BITMAP IN SET OF BOUNDING BOXES STORING PART

AFTER UPDATE OF BITMAP IN SET OF BOUNDING BOXES STORING PART

| | | | | |
|---|---|---|---|---|
| APEX COORDINATES OF BOUNDING BOX IN FIRST LAYER | APEX 1 (X = x1, Y = y1) | APEX 2 (X = x2, Y = y2) | APEX 3 (X = x3, Y = y3) | APEX 4 (X = x4, Y = y4) |
| APEX COORDINATES OF BOUNDING BOX IN SECOND LAYER | APEX 1 (X = x5, Y = y5) | APEX 2 (X = x6, Y = y6) | APEX 3 (X = x7, Y = y7) | APEX 4 (X = x8, Y = y8) |
| ⋯ | | | | |
| APEX COORDINATES OF BOUNDING BOX IN iTH LAYER | APEX 1 (X = x9, Y = y9) | APEX 2 (X = x10, Y = y10) | APEX 3 (X = x11, Y = y11) | APEX 4 (X = x12, Y = y12) |

TARGET BOUNDING BOX NOT OVERLAPPING BOUNDING BOX IN BOUNDING BOX REGISTER

TARGET BOUNDING BOX OVERLAPPING BOUNDING BOX IN BOUNDING BOX REGISTER

BEFORE ADDITION OF OBJECT TO THE LIST

AFTER ADDITION OF OBJECT TO THE LIST

BOUNDING BOX BEFORE UPDATE AND TARGET BOUNDING BOX

BOUNDING BOX AFTER UPDATE

BEFORE REMOVAL OF OVERLAP BETWEEN PIECES OF TRAPEZOID DATA

AFTER REMOVAL OF OVERLAP BETWEEN PIECES OF TRAPEZOID DATA

HCID : HARDWARE CONFIGURATION ID
PCOUNT : NUMBER OF DIVISIONS
PD : REGION DATA

| OID | OTYPE | NUMBER OF TRAPEZOIDS (4) | B BOX | PID (F) | COLOR |
| HCID | PCOUNT (3) | PD1 | PD2 | PD3 |
| TRAPEZOID 1 | TRAPEZOID 2 | TRAPEZOID 3 | TRAPEZOID 4 |
OID : INCREMENTED IN ORDER OF DRAWING COMMAND
OTYPE : CHARACTER, FIGURE, IMAGE
B BOX : BOUNDING BOX
PID : RASTERIZING PROCESS ID
COLOR : VALUE OF CMYBK
HCID : HARDWARE CONSTRUCTION ID
PCOUNT : NUMBER OF DIVISIONS
PD : REGION DATA (1, 2,........., n)
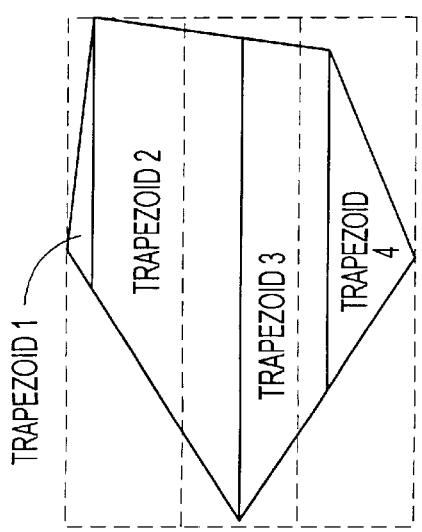
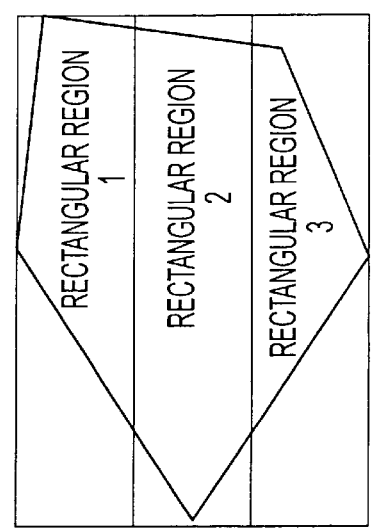
FIG. 64

PRINT PROCESSING APPARATUS

BACKGROUND OF THE INVENTION

1. Field of the Invention

The present invention relates to a print processing apparatus capable of executing print processing in page units.

2. Discussion of the Related Art

Small-size page printers of the electrophotographic type have been widely used. These printers are able to digitally print images, graphics, characters and so forth, and moreover, are able to use description languages to control the enlargement, rotation, transformation and the like of graphics, characters and so forth. Examples of these description languages are PostScript (Trademark of Adobe Systems Inc.), Interpress (Trademark of Xerox Corporation), Acrobat (Trademark of Adobe Systems Inc.), and GDI (Graphics Device Interface, Trademark of Microsoft Corporation).

Input data formed by the description language is constituted by a sequence of commands and/or data in which drawing commands and/or portions of data representing an image, graphics and characters arbitrarily positioned in a page, are arranged in an arbitrary order. When the page printer prints the input data, it must first be rasterized before printing. Rasterization is the process that expands the input data into a series of dots or pixels which crosses the page or a part of the page to form a raster scanning line. The conventional page printer rasterizes the input data for the whole page before printing and stores the rasterized data in a page buffer. This requires a large capacity memory to store the raster data for the whole page. In particular, color page printers of the electro-photographic type need raster data for the toner of four colors Cyan (C), Magenta (M), Yellow (Y) and Black($B_K$). In addition, a higher image quality than that of the monochrome page printer is required. Therefore, the color page printer generally requires additional data for each pixel and an even larger amount of memory capacity.

To overcome the necessity for larger memory capacities, a band memory technique has been devised. The band memory technique does not rasterize all portions of input data for the whole page before printing by the page printer. The band memory technique converts the input data into intermediate data because it is relatively easy and takes a shorter time than rasterizing the input data. The conversion is performed by dividing the page into plural regions (bands), each of which is adjacent to the other regions. Portions of the intermediate data corresponding to each of the bands are stored and transferred to a rasterizing element. The rasterizing element rasterizes the intermediate data and stores it in a buffer memory corresponding to the band. In the band memory technique, an additional memory for storing the portions of intermediate data is required. However, it is possible to reduce the buffer memory, which requires a large capacity for storing the raster data.

In the ordinary band memory technique it is necessary to complete the expansion of the intermediate data into raster data in the next band before printing of the raster data of a certain band is completed. However, in the case where the input data contains complex graphics drawing commands or image drawing commands dealing with a large amount of data, or a specific band in a page contains complex graphics drawing commands or image drawing commands, there is a possibility that the intermediate data cannot be rasterized in time for printing of the next band.

Therefore, use of an exclusive piece of hardware is suggested for accelerating the speed in expanding the intermediate data into the raster data. As described above, the objects to be drawn in a page include images, graphics and characters, each of which requires a specific process corresponding to the type of the object. For example, in the case of an image, resolution conversion, affine transformation, and interpolation or coloring process and the like are required. In the case of graphics, coordinate transformation, vector-raster transformation, a painting process and the like are required. In the case of a character, transformation of the outline coordinates, hinting, vector-raster transformation, a painting process and the like are required. Exclusive hardware corresponding to each of these processes are necessary. However, a problem arises in that the amount of exclusive hardware to be added is increased in order to reduce the amount of memory required. Thus, the system becomes expensive as a whole.

Conventionally, to resolve the above-described problem, an attempt to make the functions variable by reconfiguring the programmability or configuration of the hardware and to implement many functions at a high speed with a small number of hardware pieces corresponding to all functions has been devised. An example of such devices is disclosed in Japanese Patent Applications Laid-Open Nos. 6-131155 (1994, a counterpart of U.S. Pat. No. 5,301,344) and 6-282432 (1994).

Japanese Patent Application Laid-Open No. 6-131155 accomplishes various kinds of image processing with a small number of hardware pieces by reconfiguring means for operating data in a data storage area and means for generating addresses for obtaining the data stored in the data storage. The configuration can be reconfigured for image processing, in which the address information has an important meaning, but cannot be reconfiguration for the vector processing necessary for processing graphics or characters. The image processing is always executed after the reconfiguration is performed. Therefore, if various images arbitrarily appear, as in the case of the page description language (PDL), the problem arises that the time required for reconfiguration is increased. Furthermore, since the overwriting unit is set for the process having the largest size, waste occurs when reconfiguring for various size processes.

The method disclosed in Japanese Patent Application Laid-Open No. 6-282432 provides plural operation circuits that can be operated in parallel to control the data flow. This method is suitable for the frequent use of a few types of operation circuits for a certain kind of image processing. However, if it is applied to the mixing of various kinds of drawing objects such as images, graphics and characters, many different kinds of operation circuits are required. Therefore, reduction of the amount of hardware cannot be realized.

SUMMARY OF THE INVENTION

The present invention provides a print processing apparatus which is capable of reconfiguring the hardware efficiently, with respect to the number of times of rewriting and the amount of rewriting, in accordance with the content of the input data, including images, graphics and/or characters. The present invention also enables high-speed and resource-saving print processing using the same hardware resources.

To achieve the advantages, and in accordance with the purpose of the invention as embodied and broadly described herein, the present invention provides a print processing apparatus which rasterizes input data described by a predetermined drawing command representing at least one of a character, graphics and an image, into dot data having a data structure for image outputting and outputs an image based on the dot data. The print processing apparatus includes an inputting element that inputs the input data and a judging element that judges whether there is overlap among drawing objects included in the input data. The apparatus also includes a converting element that rearranges the drawing objects included in the input data based on at least a result of the judgment by the judging element and a content of the input data. The converting element converts the input data into data of a predetermined format that includes hardware configuration information. The apparatus further includes a hardware element that has processing modules and a switching component controlling a flow of input data and output data of each of the processing modules. The hardware element can set a mode of the switching component and function of at least one of the modules corresponding to the switching component to receive the data from the converting element and rasterize the data into dot data. The apparatus further includes an outputting element that outputs an image based on the dot data rasterized by the hardware element.

Additional advantages of the invention will be set forth in part in the description that follows and in part will be obvious from the description or may be learned by practice of the invention.

BRIEF DESCRIPTION OF THE DRAWINGS

The preferred embodiments of this invention will be described in detail, with reference to the following figures, wherein:

FIG. 7 illustrates division of the trapezoid data at band borders;

FIGS. 8(a) and 8(b) illustrate an example of a data representation of the trapezoid data;

FIG. 10 illustrates a data structure generated by an intermediate data order controlling element;

FIG. 15 shows an example of candidates for a hardware configuration ID;

FIG. 41 shows the state of overlap between the bounding boxes depending on whether the types of processes are the same or different;

FIG. 45 shows an example of the configuration of a set of bounding boxes storing part;

FIG. 64 shows a piece of intermediate data to which only pieces of region data are added by region division for parallel processing.

DETAILED DESCRIPTION OF THE PREFERRED EMBODIMENTS

Preferred embodiments of a print processing apparatus according to the present invention are now described in detail based on the drawings.

First Embodiment

Figure 1:
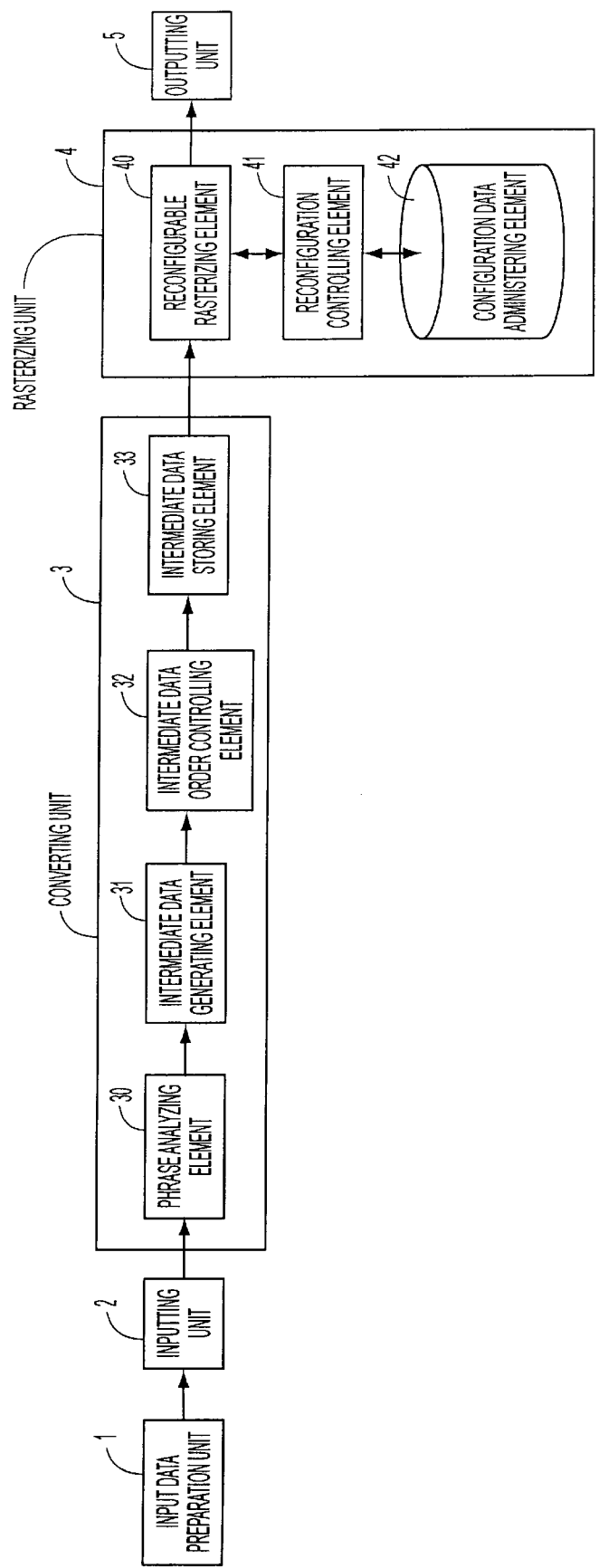
FIG. 1 is a block diagram showing a first embodiment of a print processing apparatus according to the present invention.

FIG. 1 is a block diagram showing the configuration of a first embodiment of the print processing apparatus according to the present invention. As shown in FIG. 1, the print processing apparatus comprises an input data preparation unit 1, an inputting unit 2, a converting unit 3, a rasterizing unit 4 and an outputting unit 5. The converting unit 3 further comprises a phrase analyzing element 30, an intermediate data generating element 31, an intermediate data order controlling element 32 and an intermediate data storing element 33. The rasterizing unit 4 further comprises a reconfigurable rasterizing element 40, a reconfiguration controlling element 41, and a configuration data administering element 42.

The input data preparation unit 1 prepares input data described by a description language, from document data generated by an application program, for executing a document preparation process or editing process in a personal computer or workstation, for example. The description language used in the present invention is a page description language such as PostScript (Trademark of Adobe Systems Inc.), Portable Document Format (PDF) typified by GDI (Graphics Device Interface, Trademark of Microsoft Corporation) or Acrobat (Trademark of Adobe Systems Inc.), and the like.

The inputting unit 2 inputs the input data generated by the input data preparation unit 1 and temporarily stores the pieces of input data until they are output to the converting unit 3.

The converting unit 3 converts the input data input by the inputting unit 2 into intermediate data which can be rasterized into dot data in the rasterizing unit 4 and rearranges the pieces of the data.

The phrase analyzing element 30 extracts a piece of the input data input by the inputting unit 2 as a token according to the syntax of the prescribed description language and outputs the token to the intermediate data generating element 31.

The intermediate data generating element 31 receives and interprets the token output by the phrase analyzing element 30. The intermediate data generating element 31 then executes drawing commands and generates pieces of data that include trapezoids as base units, in accordance with each drawing command. The intermediate data generating element 31 then transfers the data to the intermediate data order controlling element 32. The purpose of generating the intermediate data is to enable the rasterizing process in the rasterizing unit 4 to be performed at high speed. Therefore, the intermediate data is represented by a set of simple graphics (trapezoids). A rasterizing process ID is added to the intermediate data as information related to the rasterizing process. The intermediate data order controlling element 32 reads a certain amount of intermediate data output by the intermediate data generating element 31, determines overlaps between the pieces of the intermediate data, rearranges the pieces of the data based on the determination of overlaps, and outputs the rearranged intermediate data pieces to the intermediate data storing element 33.

For each group of the intermediate data pieces that can be processed in parallel, information indicating the borders with other groups and a hardware configuration ID, which is an identifier for configuration data written in the reconfigurable rasterizing element 40 in the rasterizing unit 4, are added. The pieces of intermediate data are then stored in the intermediate data storing element 33 and read by the rasterizing unit 4 as necessary.

The rasterizing unit 4 reads the intermediate data output by the converting unit 3 for every band unit and prepares dot data in a band buffer memory in the rasterizing unit 4. Pieces of the dot data are alternately stored in two band buffer memories in the rasterizing unit 4. As described later, the outputting unit 5 used in this embodiment is a color page printer and the pieces of the dot data, alternately stored in the buffer memories, correspond to the pieces of data of the recording colors used for printing in the outputting unit 5. Subsequently, the pieces of the dot data stored in the band buffer memories are alternately output to the outputting unit 5 in compliance with the dot data request made by the outputting unit 5.

The outputting unit 5 receives the pieces of the dot data output by the band buffer memories in the rasterizing unit 4 and outputs them by printing on the recording sheet. More specifically, the outputting unit 5 is a color page printer of the electrophotographic type using a laser scanning method capable of outputting a full-color image. The color image is output by repeating the processes that includes exposure, development and transfer for each of the colors of C, M, Y, $B_K$ (cyan, magenta, yellow and black). It is also possible to use an ink-jet color printer as the outputting unit 5. In this case, pieces of the dot data of the four colors are simultaneously output from the band buffer memories in the rasterizing unit 4 to the outputting unit 5.

Figure 2:
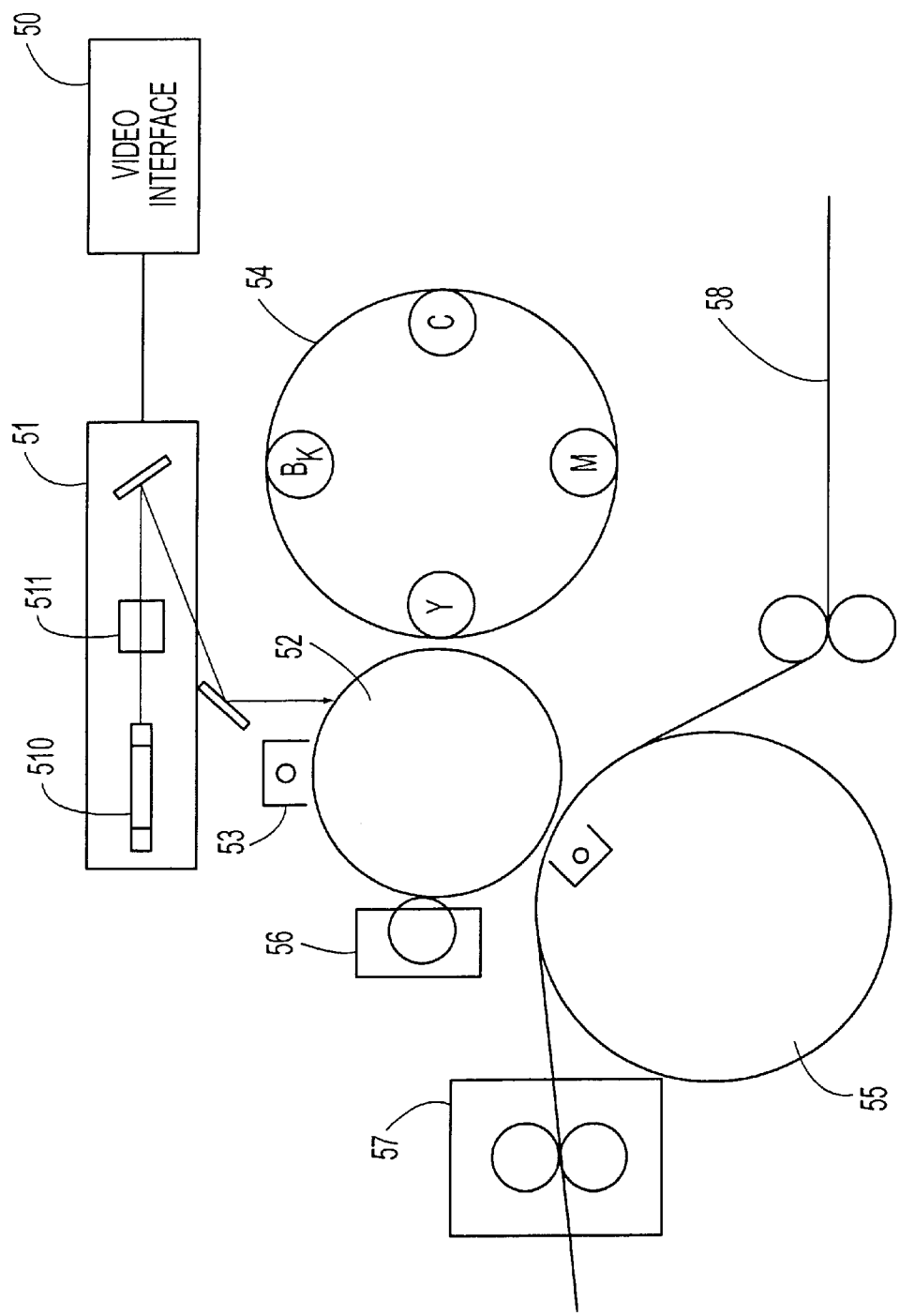
FIG. 2 illustrates the configuration of a color page printer.

The configuration and operation of a color page printer of the electrophotographic type using a laser scanning method is now discussed with reference to FIG. 2. As shown in FIG. 2, a video interface 50 inputs pieces of input data corresponding to pieces of color information of C, M, Y, $B_K$ transferred, in order, from the rasterizing unit 4 into an on-off driver of a semiconductor laser scanning device 51, and thereby converts them into optical signals. The semiconductor laser scanning device 51 consists of an infrared lay semiconductor laser (not shown), a lens 511 and a polygon mirror 510. The semiconductor laser scanning device 51 scans a photoreceptive drum 52 with a light beam having a spot diameter of several tens of $\mu$m. The photoreceptive drum 52 is charged by a charger 53 and an electrostatic latent image is formed thereon by an optical signal. The electrostatic latent image is developed into a toner image by two-component magnetic brush development on a rotary developer 54 and transferred to a recording sheet placed on a transfer drum 55. The toner remaining on the photoreceptive drum 52 is cleaned by a cleaner 56. These processes are repeated for each of the colors $B_K$, Y, M, and C in this order. Thereby, a multicolor image is transferred to the recording sheet. Finally, the recording sheet is peeled off the transfer drum 55 and the toner is fused on the recording sheet by a fuser 57. The reference numeral 58 indicates a carrying path of the recording sheet.

Next, the flow of the input data in the print processing apparatus with the above-described configuration is explained. The input data, prepared in the input data preparation unit 1, is transferred to the phrase analyzing element 30 of the converting unit 3 through the inputting unit 2. A token extracted from the input data in the phrase analyzing element 30 is input to the intermediate data generating element 31. In the intermediate data generating element 31, the token is interpreted and pieces of intermediate data divided into band units are generated. In the intermediate data order controlling element 32, the pieces of the intermediate data are rearranged in accordance with the determined overlap, classified into groups of pieces of data which can be processed in parallel and stored as band units for one page in the intermediate data storing element 33. A piece of the intermediate data uses a set of trapezoids as a base unit of the data and further may include a band ID indicating to which band the data belongs, a type of object such as an image, character, graphics or the like, attributes in the drawing, a bounding box of the set of trapezoids, a group ID indicating the group of parallel processing to which the piece belongs, and a hardware configuration ID. The intermediate data storing element 33 forwards the intermediate data in compliance with requests by the rasterizing unit 4.

In the rasterizing unit 4, a piece of configuration data is input from the configuration data administering element 42, if necessary, based on the hardware configuration ID contained in the intermediate data output from the converting unit 3. The function of the reconfigurable rasterizing element 40 is rewritten under the control of the reconfiguration controlling element 41.

In the rasterizing unit 4, pieces of the intermediate data are received and the rasterizing process is executed until the band buffer is filled with the pieces of the dot data first to be recorded in the outputting unit 5. When cycle-up or preparation for outputting in the outputting unit 5 is completed, the dot data for every line is transferred from the band buffer memory to the outputting unit 5 in accordance with the recording speed of the outputting unit 5. While the pieces of the dot data in one band buffer memory are printed, the rasterizing process is executed until the other band buffer memory is filled with the pieces of the dot data. The rasterizing process and printing process are repeated for each color or four colors simultaneously until the process for the pieces of the input data for one page is completed. If the input data has plural pages, the printing process is repeated until all pages are output.

The main parts of the print processing apparatus according to the present invention will now be explained in detail. First, the intermediate data generating element 31, the intermediate data order controlling element 32 and the intermediate data storing element 33 are discussed in detail.

Figure 3:
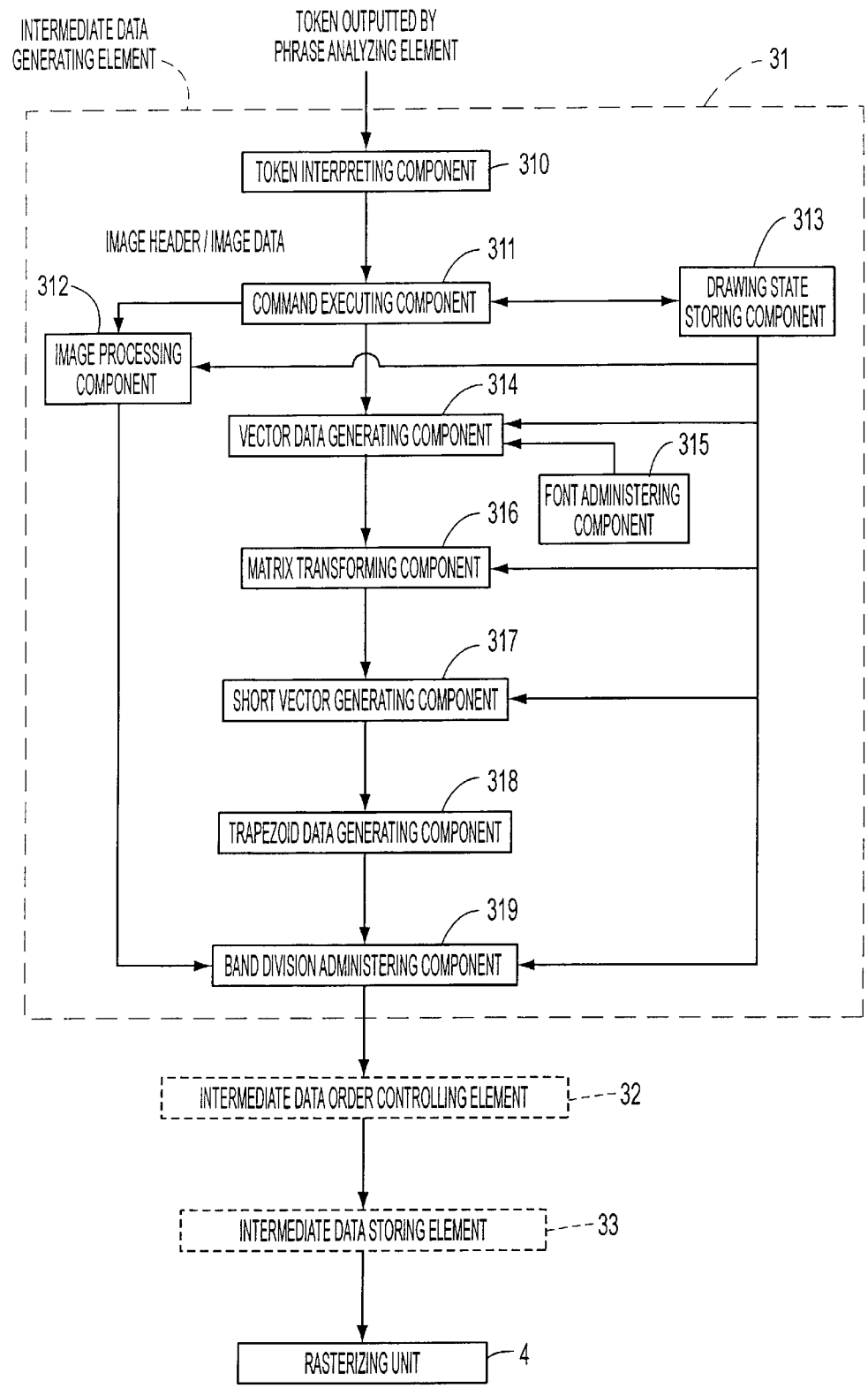
FIG. 3 is a block diagram showing an intermediate data generating element.

As shown in FIG. 3, the intermediate data generating element 31 includes a token interpreting component 310, a command executing component 311, an image processing component 312, a drawing state storing component 313, a vector data generating component 314, a font administering component 315, a matrix transforming component 316, a short vector generating component 317, a trapezoid data generating component 318 and a band division administering component 319.

The token interpreting component 310 interprets the token output by the phrase analyzing element 30, converts it into an internal command and transfers the command to the command executing component 311. The command executing component 311 forwards the transferred command to the image processing component 312, drawing state storing component 313 and vector data generating component 314 in accordance with the content of the command.

The image processing component 312 executes various kinds of image processing based on the image header and image data input to generate an output image header and output image data. The image processing component 312 then forwards the output image header and output image data to the band division administering component 319. The drawing state storing component 313 stores pieces of information necessary for drawing which are given by the command from the command executing component 311. The vector data generating component 314 generates vector data to be drawn by using the command from the command executing component 311, information given by the drawing state storing component 313 and information given by the font administering component 315, and transfers the vector data to the matrix transforming component 316.

The font administering component 315 stores and administers the outline data of various types of fonts and provides the outline data of characters on request. The matrix transforming component 316 performs affine transformation on the vector data output from the vector data generating component 314 by using a transformation matrix of the drawing state storing component 313 and transfers the transformed vector data to the short vector generating component 317.

The short vector generating component 317 approximates the vectors corresponding to a curved line among the input vectors with a set of vectors corresponding to plural straight lines (short vectors) and transfers them to the trapezoid data generating component 318. The trapezoid data generating component 318 generates the trapezoid data to be drawn from the short vectors that are input and forwards the trapezoid data to the band division administering component 319.

The band division administering component 319 divides a piece of trapezoid data covering the plural bands, among the pieces of trapezoid data that are input, into pieces of the trapezoid data for each of the bands. The band division administering component 319 then adds a band ID indicating to which band the data belongs, a bounding box of the set of the pieces of the trapezoid data divided into band units, data administering information, color information output from the drawing state storing component 313 or image data output from the image processing component 312, and a rasterizing process ID and transfers the data to the intermediate data order controlling element 32.

The intermediate data order controlling element 32 rearranges the pieces of the data for every band unit in accordance with a determined overlap between the pieces of the data and classifies them into groups in each of which the pieces of data can be processed in parallel. The intermediate data order controlling element 32 then adds the hardware configuration ID and group ID to each piece of the data.

The intermediate data storing element 33 stores the pieces of the intermediate data output from the intermediate data order controlling element 32 in band units for the page. The processes of the token interpreting component 310 to the intermediate data generating element 31 are executed whenever a drawing command is input. In some cases, these processes are executed in band units or page units. The pieces of the intermediate data are transferred from the intermediate data storing element 33 to the rasterizing unit 4 after the pieces of the intermediate data for one page are stored.

Next, the operations of the intermediate data generating element 31, the intermediate data order controlling element 32 and the intermediate data storing element 33 are described in detail with reference to an actual data structure.

The token interpreting component 310 interprets the token output from the phrase analyzing element 30, converts the content of the token into an internal command and an argument thereof, and transfers the internal command and its argument to the command executing component 311. The internal command includes, for example, a drawing command for executing drawing of a character, graphics or image, a drawing state command for setting information necessary for drawing in a color, line attribute and the like.

The command executing component 311 executes the internal command transferred from the token interpreting component 310. The commands executed here are mainly the drawing command and drawing state command. For example, the drawing command has three types. Information necessary for each type of drawing are shown in Table 1. Pieces of the underlined information are given as the arguments in the drawing command and the other pieces of information are stored in advance in the drawing state storing component 313 by the initial setting or a previous command. In execution of the drawing command, the drawing command that is received is directly transferred to the vector data generating component 314, except in the case of drawing of the image data. In the case of drawing of the image data, the length and breadth of the image header are transferred to the vector data generating component 314 in addition to the drawing command being transferred to the image processing component 312. The drawing state command is transferred to the drawing state storing component 313.

The image processing component 312 receives the input image header and input data which are the arguments of the command output from the command executing component 311. If a compression ID added to the header indicates that a compressed image has been input, the image processing component 312 expands the compressed image and performs affine transformation on the image by using a transformation matrix obtained from the drawing state storing component 313. In some cases, when a processed image is compressed, the output image header and output image data are generated and transferred to the band division administering component 319. In the compression process, the method of compression adopted for compressing the image data in PDL is generally used, but it is not limited thereto. For example, if the image has been compressed by discrete cosine transform (DCT) in PDL, the processed image can be compressed by either DCT or Lempel-Ziv & Welch (LZW), or it may not be compressed. Furthermore, the affine transformation for obtaining a resolution smaller than that of the outputting device can be adopted to reduce the amount of memory necessary in the intermediate data buffer.

The drawing state storing component 313 sets values for the pieces of information which are not underlined in Table 1 by using the value of the argument included in the command received from the command executing component 311, and stores them. Moreover, the drawing state storing component 313 transfers the stored values in reply to requests from the image processing component 312, the vector data generating component 314, the matrix transforming component 316, the short vector generating component 317 and the band division administering component 319.

TABLE 1 types of drawing command and information necessary for each type of drawing

| Drawing Command | Functions | information necessary for drawing |
| --- | --- | --- |
| character drawing | character drawing | character code, font ID, coordinate transforming matrix, current point, drawing color |
| image drawing | image drawing | source image data, source image header (length, breadth, depth, color space of source data. compression information), coordinate transforming matrix, current point |
| graphics drawing | painting | graphic vector (straight line, curved line). flatness, coordinate transforming matrix, drawing color |
| | stroking | graphic vector (straight line, curved line). line attribute (linewidth, linecap, linejoin, miterlimit, dash), flatness, coordinate transforming matrix, drawing color |

The vector data generating component 314 generates the vector data for drawing by using the command transferred from the command executing component 311, and the arguments of the command and the values stored in the drawing state storing component 313, except in the case of painting. The case of the character drawing is first explained.

The character code given by the argument and the font ID obtained from the drawing state storing component 313 are forwarded to the font administering component 315. Thereby, the outline data of the character is obtained. Since the obtained outline data does not contain the information related to a current point, the offset of the current point obtained from the drawing state storing component 313 is added to the outline data. Thereby, the desired vector data is generated.

Figure 4:
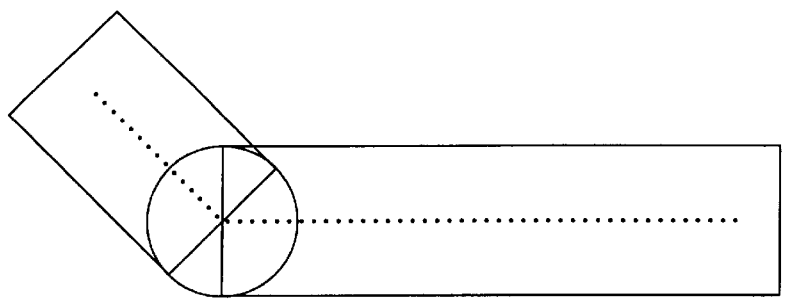
FIG. 4 illustrates an outline vector.

In the case of image drawing, a rectangular vector is generated based on the length and breadth of the image header given by the argument and the offset of the current point obtained from the drawing state storing component 313 is added to the vector. Thereby, the desired vector data is generated. In the case of stroking, an outline vector of a line with the thickness as shown in FIG. 4 is generated based on a vector given by the argument and various kinds of line attributes obtained from the drawing state storing component 313.

Each vector generated as described above is transferred to the matrix transforming component 316 (in the case of painting, the vector directly received from the command executing component 311 is transferred).

The font administering component 315 stores pieces of the outline vector data for various types of fonts and provides the outline vector data corresponding to a character in accordance with the given character code and font ID.

The matrix transforming component 316 performs the affine transformation on the vector data received from the vector data generating component 314 by using the transformation matrix obtained from the drawing state storing component 313. The main purpose of the affine transformation is to transform the resolution (coordinates) of the application into the resolution (coordinates) of the printer.

As an example, 3×3 matrix of expression (1) may be used as the transformation matrix. The input vector data (Xn, Yn) is transformed into the output vector data (Xn', Yn'), and transferred to the short vector generating component 317.

$$(Xn', YN') = (Xn, \ Yn) \begin{pmatrix} a & b & 0 \\ c & d & 0 \\ e & f & 1 \end{pmatrix} \quad (1)$$

If there is any vector of a curved line among the input vectors, the short vector generating component 317 executes approximation of the vector of the curved line with multiple short vectors so that the flatness error becomes less than the flatness value obtained from the drawing state storing component 313.

Figure 5:
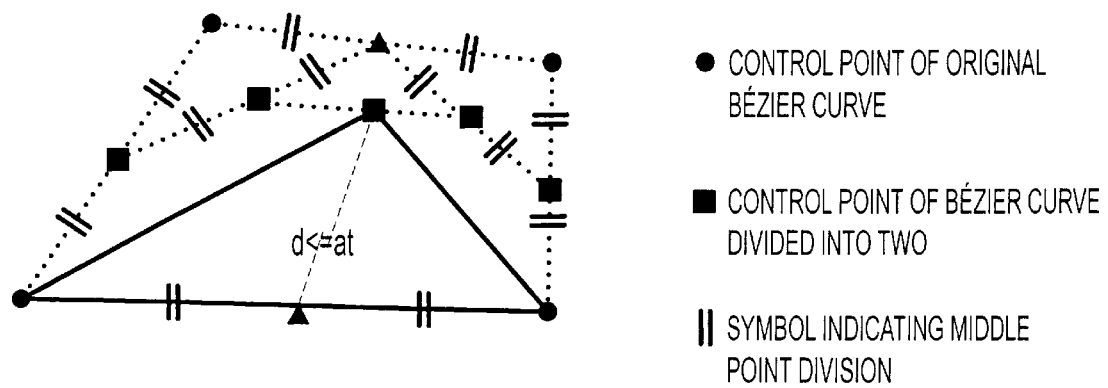
FIG. 5 illustrates recursive division of a Bezier curve.

For example, a Bézier curve represented by four controlling points, as shown in FIG. 5, may be adopted as the vector of curved line. In this case, the process of generating short vectors is executed by dividing the Bézier curve recursively as shown in FIG. 5. Division is completed when the height (distance d) becomes smaller than the given flatness value. The short vector is generated by connecting the starting point and the terminating point of each divided Bézier curve. The generated short vectors are transferred to the trapezoid data generating component 318.

Figure 6B:
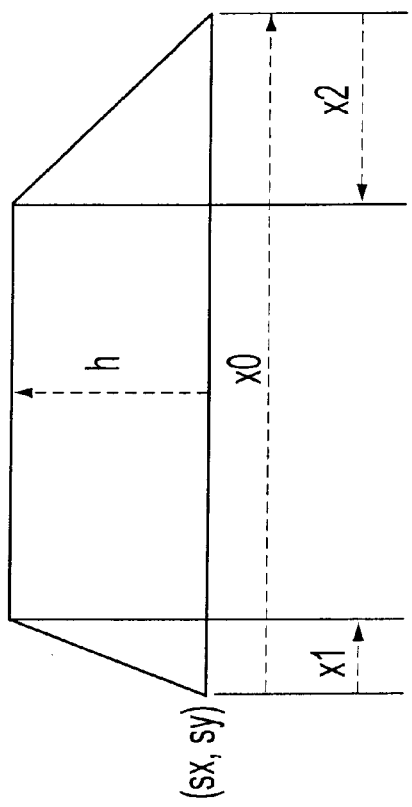
FIGS. 6(a) and 6(b) illustrate trapezoid data.
Figure 6A:
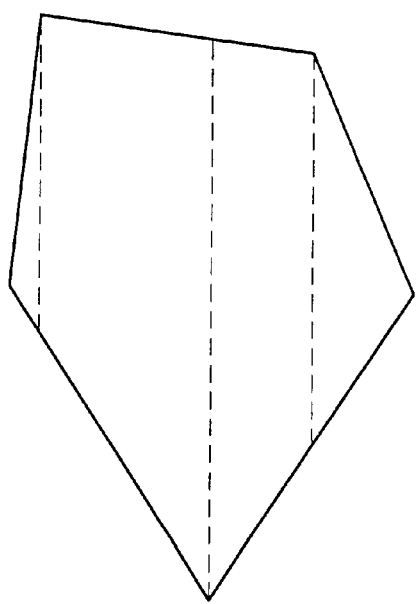

The trapezoid data generating component 318 generates a set of pieces of trapezoid data (in some cases, some of the pieces are triangle, but their data structures are the same as those of the trapezoid pieces) indicating a drawing region based on the vector data that is input. For example, for a polygonal vector, indicated by a thick line in FIG. 6(a), the drawing region is indicated by four trapezoids. These trapezoids have two sides parallel to the scanning line of the outputting device. One of the trapezoids is represented by six pieces of data (sx, sy, x0, x1, x2, h) as shown in FIG. 6(b). The generated trapezoids are transferred to the band division administering component 319.

The band division administering component 319 divides a piece of the trapezoid data covering multiple bands among the pieces of trapezoid data that are input, into pieces of trapezoid data for each of the band units. For example, as shown in FIG. 7, four pieces of the trapezoid data are divided into six pieces by the band division administering component 319. Additional information is given to each of the divided trapezoid data, for each band unit, to generate the intermediate data. The additional information contains information for administering the intermediate data, the rasterizing process ID indicating the content to be processed by the rasterizing unit 4 and color information indicating with what color the trapezoid data is to be painted.

The administering information for character or drawing commands includes the band ID indicating to which band the data belongs, an object ID, an object type, the number of pieces of trapezoid data and the bounding box of the set of pieces of the trapezoid data. The object ID is the identification number assigned to a single drawing command. The object type is the identification data for the object of the drawing, such as a character, graphics or image. The rasterizing process ID indicates the process in the rasterizing unit 4. The color information includes, for example, values of C, M, Y, $B_K$.

As shown in FIG. 8(a), the piece of additional information is added to the front of the piece of the trapezoid data for each band unit generated by the drawing command. Therefore, the object includes multiple pieces of trapezoid data accompanied by a set of drawing attributes. The intermediate data is a set of such pieces of data for an object. The administering information for the drawing command of the image is the same as that of the character or graphics drawing command, however the color information turns into the image header and the image data.

Figure 9A:
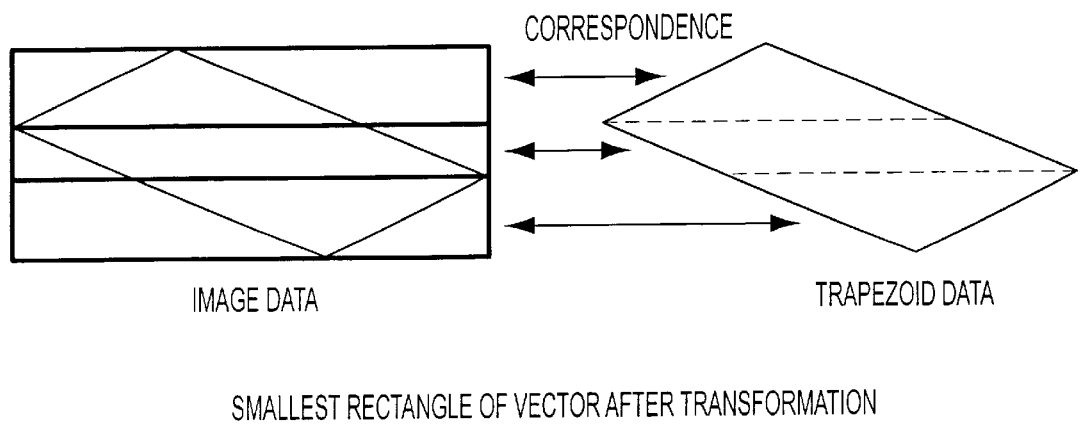
FIGS. 9(a) and 9(b) illustrate the correspondence between the trapezoid data and image data.
Figure 9B:
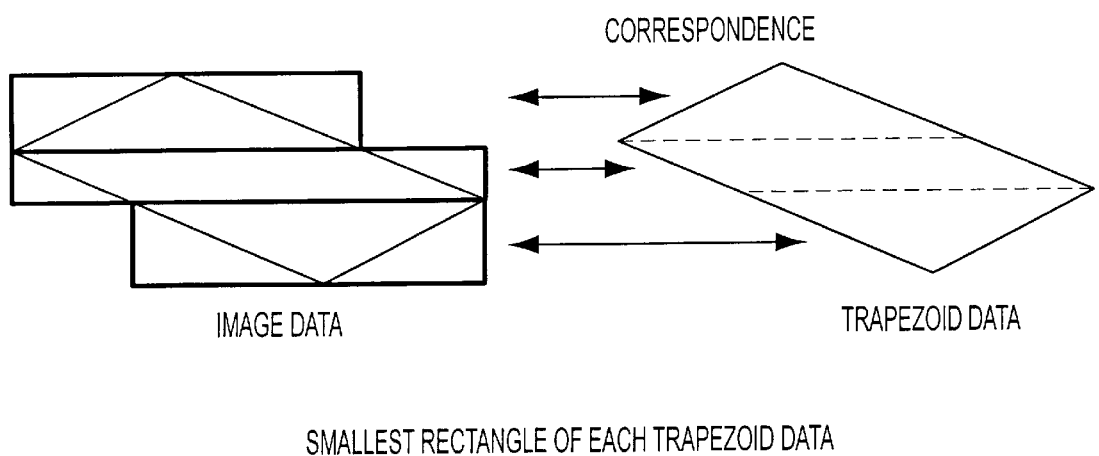

As shown in FIG. 8(b), one image header and a piece of image data are added to each of the trapezoid data for every unit generated in accordance with the drawing command. The image header and the image data are input from the image processing component 312. However, the image data added as the intermediate data may be the image data corresponding to the smallest rectangle of a vector indicating the transformed image, or may be the image data corresponding to the smallest rectangle of each piece of the trapezoid data as shown in FIGS. 9(a) and 9(b).

Since the image data has a large capacity, it can be compressed and then stored. The image header contains the kind of color conversion process and the kind of compression method as well as a parameter indicating the size of the image.

The rasterizing process IDs are code information corresponding to the process executed by the rasterizing unit 4. These processes are shown in Table 2. In the intermediate data order controlling element 32, the rasterizing process ID is converted into the configuration ID corresponding to each constituent of the configuration of the actual reconfigurable rasterizing element 40 in accordance with the scale of the reconfigurable hardware and the content of the process executed in parallel.

TABLE 2 rasterizing process ID and content of process

| rasterizing process ID | content of process |
| --- | --- |
| code A (graphics) | trapezoid drawing 1 + screening 1 |
| code B (character) | trapezoid drawing 1 + screening 2 |
| code C (image 1) | color conversion 1 + resolution conversion + trapezoid drawing 2 + screening 3 |

TABLE 2-continued rasterizing process ID and content of process

| rasterizing process ID | content of process |
|---|---|
| code D (image 2) | color conversion 2 + resolution conversion + trapezoid drawing 2 + screening 3 |
| code E (image 3) | expansion 1 + resolution conversion + trapezoid drawing 2 + screening 3 |
| code F (image 4) | expansion 2 + resolution conversion + trapezoid drawing 2 + screening 3 |
| code G (image 5) | expansion 1 + color conversion 2 + resolution conversion + trapezoid drawing 3 + screening 3 |

The intermediate data order controlling element 32 inputs a certain number of pieces of the intermediate data output by the intermediate data generating element 31, determines the overlap between the pieces of data, rearranges the pieces of data according to the result of the determination, and outputs the pieces of the data to the intermediate data storing element 33. At that time, for each set of the objects of the intermediate data where the objects can be processed in parallel owing to the rearrangement of the objects, information indicating the borders with other sets and a hardware configuration ID identifying the configuration data written in the reconfigurable rasterizing element 40 of the rasterizing unit 4 are added.

The output data format in the intermediate data order controlling element 32 is shown in FIG. 10. As shown in FIG. 10, the data structure of the intermediate data output by the intermediate data order controlling element 32 is classified into sets of objects which can be processed in parallel. A piece of data in each set includes the band ID, hardware configuration ID, the number of objects and pieces of data for the objects belonging to the set.

Figure 11:
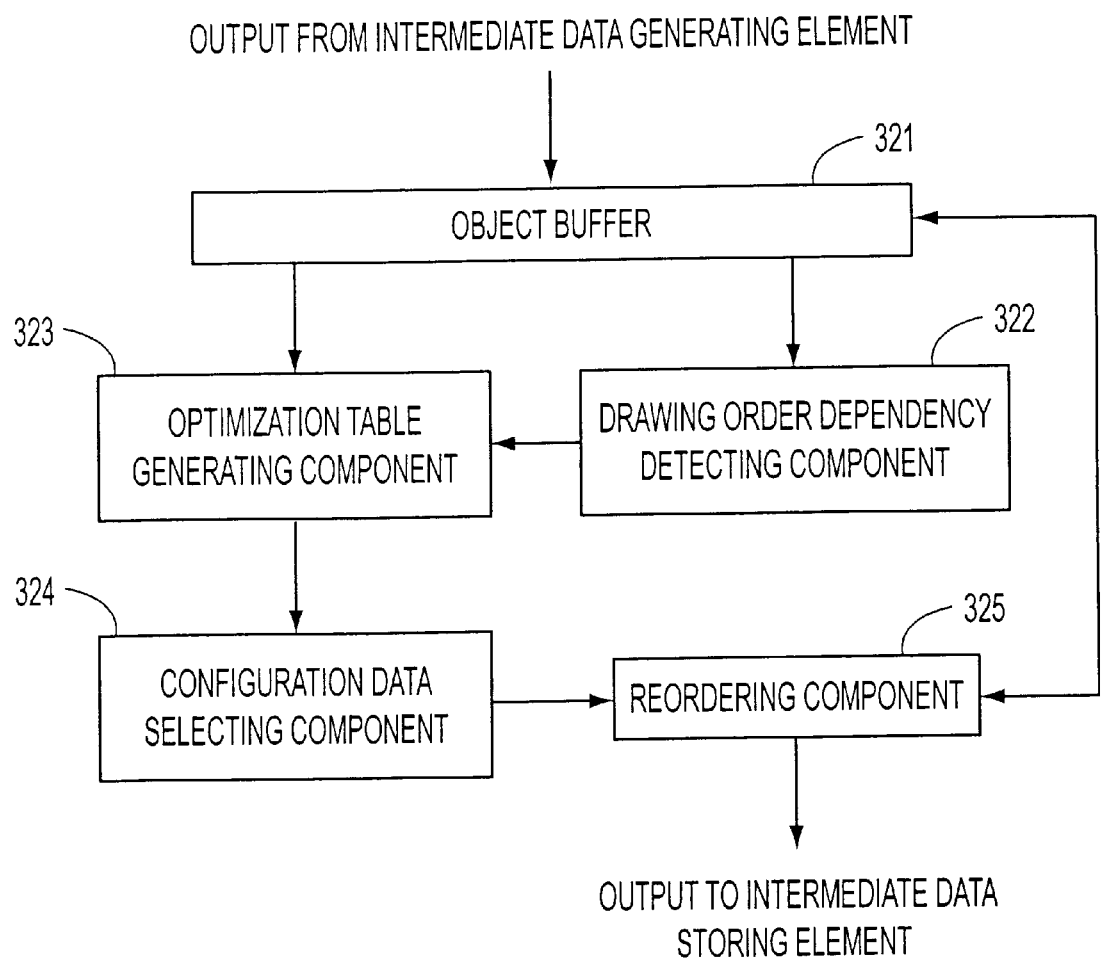
FIG. 11 is a block diagram showing the intermediate data order controlling element.

FIG. 11 shows the configuration of the intermediate data order controlling element 32. In FIG. 11, reference numerals 321, 322, 323, 324 and 325 indicate an object buffer, a drawing order dependency detecting component, optimization table generating component, configuration data selecting component and reordering component, respectively. The intermediate data order controlling element 32 classifies the objects into groups, each of which contains objects that can be processed in parallel, based on the detection of the drawing order dependency of the objects that are input. The intermediate data order controlling element 32 then puts the groups in order of the rasterizing process.

Figure 12:
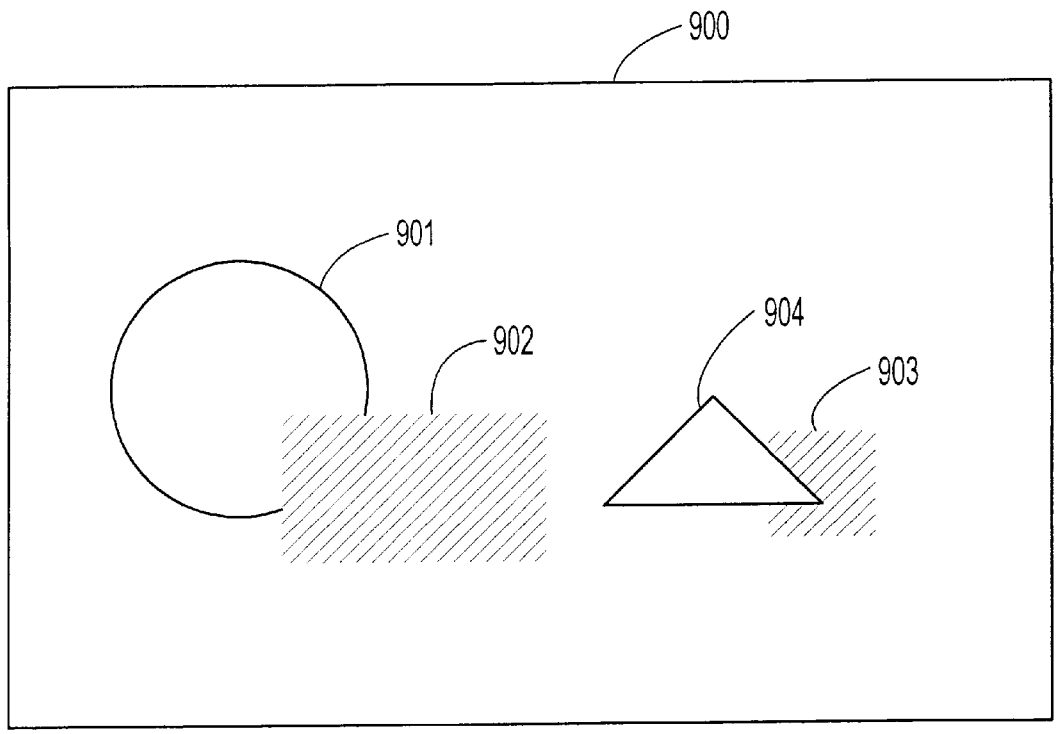
FIG. 12 shows overlap between drawing objects in a band region.

The drawing order dependency is characterized as follows. If the objects have overlap, they have to be drawn in order of interpretation of the pieces of input data by the phrase interpreting element 30 and of generation of drawing objects by the intermediate data generating element 31. In other words, they have to be drawn in order of the object IDs assigned to the pieces of the intermediate data from the background to the foreground. Such a model in which an object interpreted later is overwritten on another object previously interpreted is referred to as an opaque model. For example, as shown in FIG. 12, the reference numeral 900 indicates a page region, and 901, 902, 903 and 904 are individual drawing objects. The object 902 overlaps the object 901, therefore the latter has to be drawn over the former because the object 901 is interpreted earlier than the object 902. The object 904 overlaps the object 903, therefore the latter has to be drawn over the former by the same reason.

Multiple pieces of object data are input to the object buffer 321 and stored therein. The unit of the pieces of the object data input and stored in the object buffer 321 may be the multiple drawing objects or a larger unit such as a band or page, according to the circumstances.

The drawing order dependency detecting component 322 receives the IDs of the objects having the same band ID stored in the object buffer 321 and the coordinate values of the bounding boxes, and detects the drawing order dependencies of the objects. The process is described in detail with reference to FIG. 12. As shown in FIG. 12, the reference numerals 901 and 904 indicate graphics objects, and the reference numerals 902 and 903 indicate image objects. The object 902 overlaps the object 901, and the object 904 overlaps the object 903. It is determined whether the regions represented by the bounding boxes accompanying the objects overlap with each other or not, and the grouping is executed based on the result. The method of determining the overlap is performed on a combination of two arbitrary objects, wherein the bounding boxes of the two objects is the minimum unit for detection of overlap. The detection of overlap is performed as follows.

It is determined whether each of the coordinates (P1, P2, P3, P4) representing a region of a bounding box of an object exists within a region of a bounding box of another object (P5, P6, P7, P8) or on the border of the bounding box ((P1, P2, P3, P4) and (P5, P6, P7, P8) are not shown in FIG. 12). If at least one of P1, P2, P3 and P4 exists within the region of the bounding box (P5, P6, P7, P8) or on the border, the two objects overlap each other. Otherwise, these objects have no overlap.

Accordingly, in the case shown in FIG. 12, two groups (901, 902) and (903, 904) are generated. These expressions mean that drawing of the object 901 must be executed prior to that of the object 902, and that drawing of the object 903 must be executed prior to that of the object 904. They also indicate that the group (901, 902) and the group (903, 904) can be rasterized in parallel. The drawing order dependency detecting component 322 assigns a group ID and the number indicating the order of drawing to each object ID and outputs them. In FIG. 12, pieces of the data (901, 1, 1), (902, 1, 2), (903, 2, 1) and (904, 2, 2) are output. The three numerals in each data represent the object ID, group ID and the order of drawing. The size of the object buffer may be a unit of plural objects belonging to a specific band, a unit of the whole band buffer or the whole page depending on the circumstances. Grouping and selection of the objects which can be processed in parallel is executed for a band unit or a page unit.

Figures 13, 14:
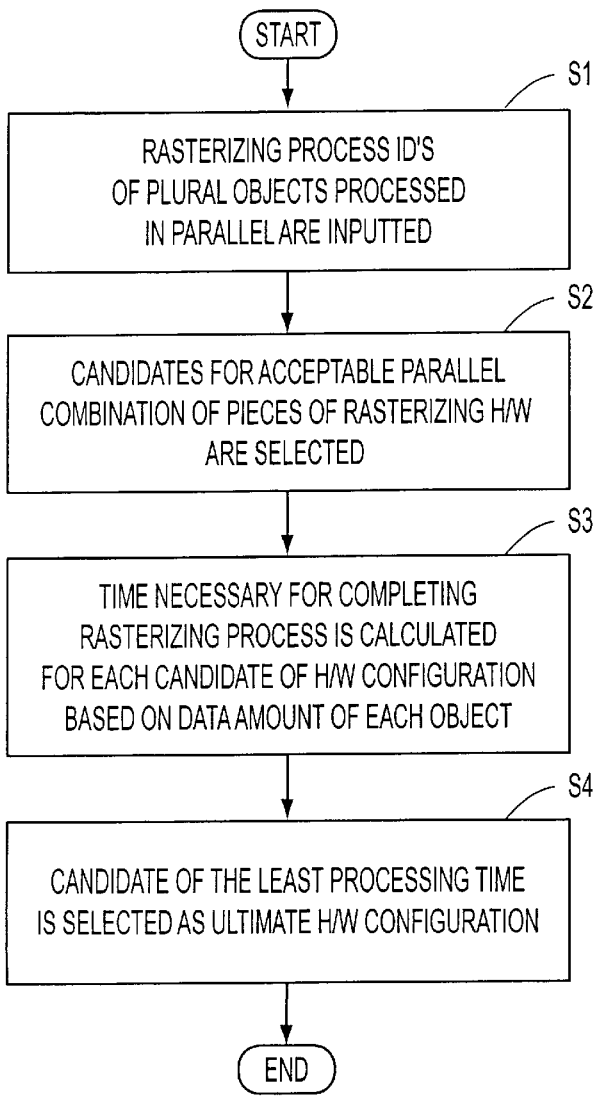
FIG. 13 shows an example of an optimization table.
FIG. 14 is a flow chart showing the procedures with which an example configuration data selecting component selects a piece of configuration data.

The optimization table generating component 323 generates a table, as shown in FIG. 13, based on the object ID, group ID and the order of drawing input from the drawing order dependency detecting component 322 and outputs it to the configuration data selecting component 324. As shown in FIG. 13, the group ID is assigned to each of the groups classified in the drawing order dependency detecting component 322. In the column of the object ID, the ID of the object to be formed at first in each group, namely the ID of the object having the order of drawing 1, is written to the table. In the column of the rasterizing process ID, the rasterizing process ID corresponding to each object is input from the object buffer 321 and written. In the example of FIG. 13, the rasterizing process ID corresponding to the object 901 is Code A, and the rasterizing process ID corresponding to the object 903 is Code G. In the column of the area of the bounding box, the coordinates of the bounding box corresponding to each object is input from the object buffer 321. The area of the bounding box is calculated and is then written to the table.

The configuration data selecting component 324 selects the most appropriate configuration in the reconfigurable rasterizing element 40 for the multiple objects which can be processed in parallel output by the optimization table generating component 323. The configuration data selecting component 324 selects the configuration data in the reconfigurable rasterizing element 40 by using the table output by the optimization table generating component 323 according to the flow chart shown in FIG. 14.

The process executed by the configuration data selecting component 324 has four steps S1 to S4. In step S1, the rasterizing process IDs of the multiple objects processed in parallel are input from the input table. In step S2, candidates for acceptable parallel pieces of hardware for rasterizing are selected from the reconfigurable hardware resources by selecting combinations which satisfy the inequality (2) based on the scale of the processing circuit obtained from the rasterizing process IDs of the objects to be processed in parallel.

$$SIZE \geq XN \times SIZE(X) + YN \times SIZE(Y) + \ldots + ZN \times SIZE(Z) \quad (2)$$

Here, SIZE is the scale of the whole reconfigurable hardware circuit in the reconfigurable rasterizing element 40. SIZE (X), SIZE(Y) and SIZE(Z) indicate the scale of the circuits X, Y and Z, respectively, each of which corresponds to the ID of each developing process. XN, YN and ZN indicate the degrees of parallelism of the circuits X, Y and Z, respectively. As expressed by the inequality, the configuration data selecting component 324 includes a mechanism capable of parallel processing by selecting the configuration data of the circuit configuration having different plural functions or the circuit configuration having the same plural functions. The component 324 also has a mechanism such that the circuit configuration having different plural functions is selected and pieces of input/output data are transferred among the functions by pipeline processing.

For example, a candidate having the function as shown in FIG. 15 is selected corresponding to the table shown in FIG. 13. In FIG. 15, the candidate having the hardware configuration ID X has a degree of parallelism of 3 as a hardware resource for the object 901 and a degree of parallelism of 2 as a hardware resource for the object 903. The candidate having the hardware configuration ID Y has a degree of parallelism of 4 as a hardware resource for the object 901 and a degree of parallelism of 1 as a hardware resource for the object 903.

Next, in step S3, a rasterization completing time is calculated for each candidate hardware configuration based on the amount of data for each object. Here, the rasterization completing time is the time necessary for completing rasterization of all objects which can be processed in parallel. The time $T_o$ necessary for rasterizing each object is calculated according to equation (3).

$$T_o = DSIZE \times Td \div PAR \quad (3)$$

Here, DSIZE indicates the amount of data for the object to be processed, Td indicates the time necessary for processing the data of a unit amount by a processing circuit of one unit, and PAR indicates the degree of parallelism. As the approximate value of the amount of data for the object to be processed, the area of the bounding box in the table of FIG. 13 is used. In the example of FIG. 15, the processing time for the candidate having the hardware configuration ID X is 20 ms and the processing time for the candidate having the hardware configuration ID Y is 30 ms.

In step S4, the candidate having the smallest processing time is selected as the ultimate hardware configuration. In the example of FIG. 15, the candidate having the hardware configuration ID X is selected as the ultimate hardware configuration.

The reordering component 325 converts the ID of the hardware configuration ultimately selected and each piece of data of the objects to be processed in parallel into the data configuration illustrated in FIG. 10 and outputs it to the intermediate data storing element 33. As to the data of the object, the object ID is input to the object buffer 321 and the piece of the data corresponding to the object is output from the object buffer 321.

The objects not selected as those that can be processed in parallel by the configuration data selecting component 324 are left in the object buffer 321. The process explained above is applied to each possible new combination of the objects in the object buffer 321 and the data structure of the intermediate data shown in FIG. 10 is output.

The pieces of the data output by the intermediate data order controlling element 32 are transferred to the intermediate data storing element 33. The band IDs are interpreted therein and the pieces of the data are stored for each of the bands. As an output command of the page is interpreted in the phrase interpreting element 30, end-of-page (EOP) is transferred to the intermediate data storing element 33 through the intermediate data generating element 31 and the intermediate data order controlling element 32. The data indicating end-of-data (EOD) is added to the last piece of data of each band stored in the intermediate data storing element 33 to clarify the end of the band data. The EOP is also transferred to the rasterizing unit 4 to start the operation of the rasterizing unit 4.

Figure 16:
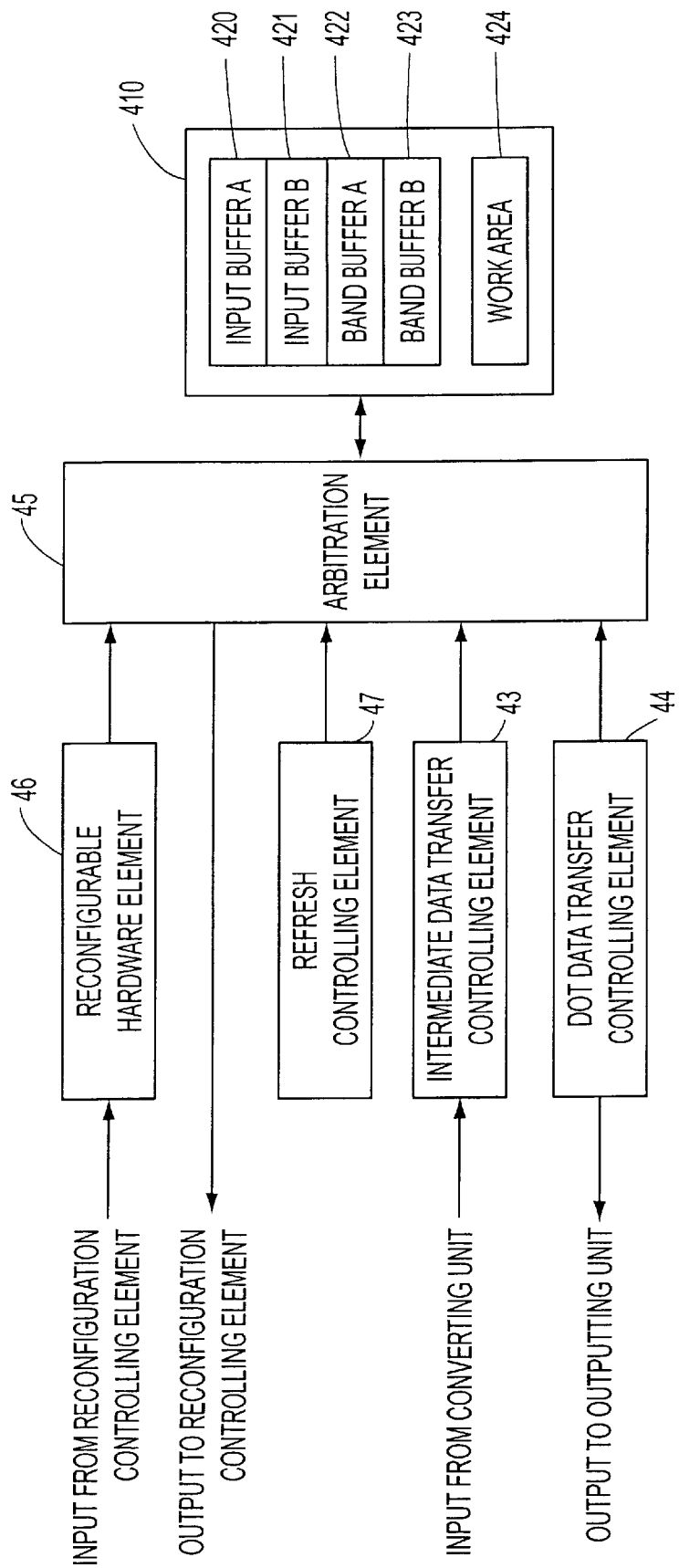
FIG. 16 is a block diagram showing a reconfigurable rasterizing element.

FIG. 16 is a block diagram of the reconfigurable rasterizing component 40. The intermediate data for each band generated by the converting unit 3 is read by the intermediate data transfer controlling element 43 and written to an input buffer A 420 or input buffer B 421 in a memory 410. The reconfigurable hardware element 46 reads the intermediate data from the input buffer A 420 or the input buffer B 421, rasterizes the data and draws an image in the band buffer A 422 or the band buffer B 423. The dot data transfer controlling element 44 reads the rasterized dot data from the band buffer A 422 or band buffer B 423 in which the image is drawn, executes serial conversion on the data for each word and outputs the data to the outputting unit 5 in synchronization with a serial output clock signal. A refresh controlling element 47 controls the refresh of the memory 410 having the input buffer A 420, input buffer B 421, band buffer A 422, band buffer B423 and a work area 424. An arbitration element 45 executes arbitration control when each of the refresh controlling element 47, the intermediate data transfer controlling element 43, the dot data transfer controlling element 44, the reconfigurable hardware element 46 and the reconfiguration controlling element 41 accesses the memory 410 in accordance with the access priority assigned to each element.

Figure 17:
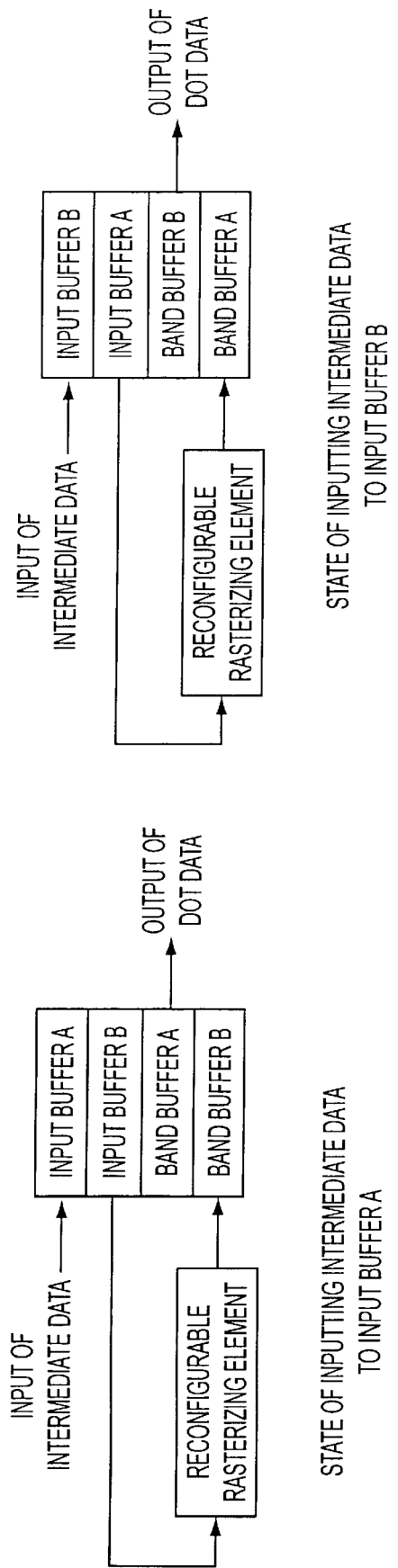
FIGS. 17(a) and 17(b) illustrate a method of using an input buffer and a band buffer.

FIGS. 17(*a*) and 17(*b*) show the state of using the input buffer A and input buffer B, respectively, in the course of inputting the intermediate data. In FIG. 17(*a*), the intermediate data corresponding to the band (i) is in the course of being input to the input buffer A and the intermediate data corresponding to the band (i−1) has already been input to the input buffer B. The reconfigurable hardware element 46 reads the intermediate data stored in the input buffer B, develops the data and forms an image in the band buffer B.

In the band buffer A, the dot data which is a result of developing and forming an image of the intermediate data corresponding to the band (i−2) is stored. The dot data transfer controlling element 44 reads the dot data and transfers it to the outputting unit 5.

In FIG. 17(*b*), the intermediate data corresponding to the band (i+1) is in the course of being input to the input buffer B. In the input buffer A, the intermediate data corresponding to the band (i) has already been input. The reconfigurable hardware element 46 reads the intermediate data stored in the input buffer A, develops the data, and forms an image in the band buffer A. The dot data which is a result of developing and forming an image of the intermediate data corresponding to the band (i−1) is stored in band buffer B. The dot data transfer controlling element 44 reads and transfers the data to the outputting unit 5.

The work area 424 is used as a temporary work area if necessary when the rasterizing unit 4 rasterizes the intermediate data received from the converting unit 3.

Figure 18:
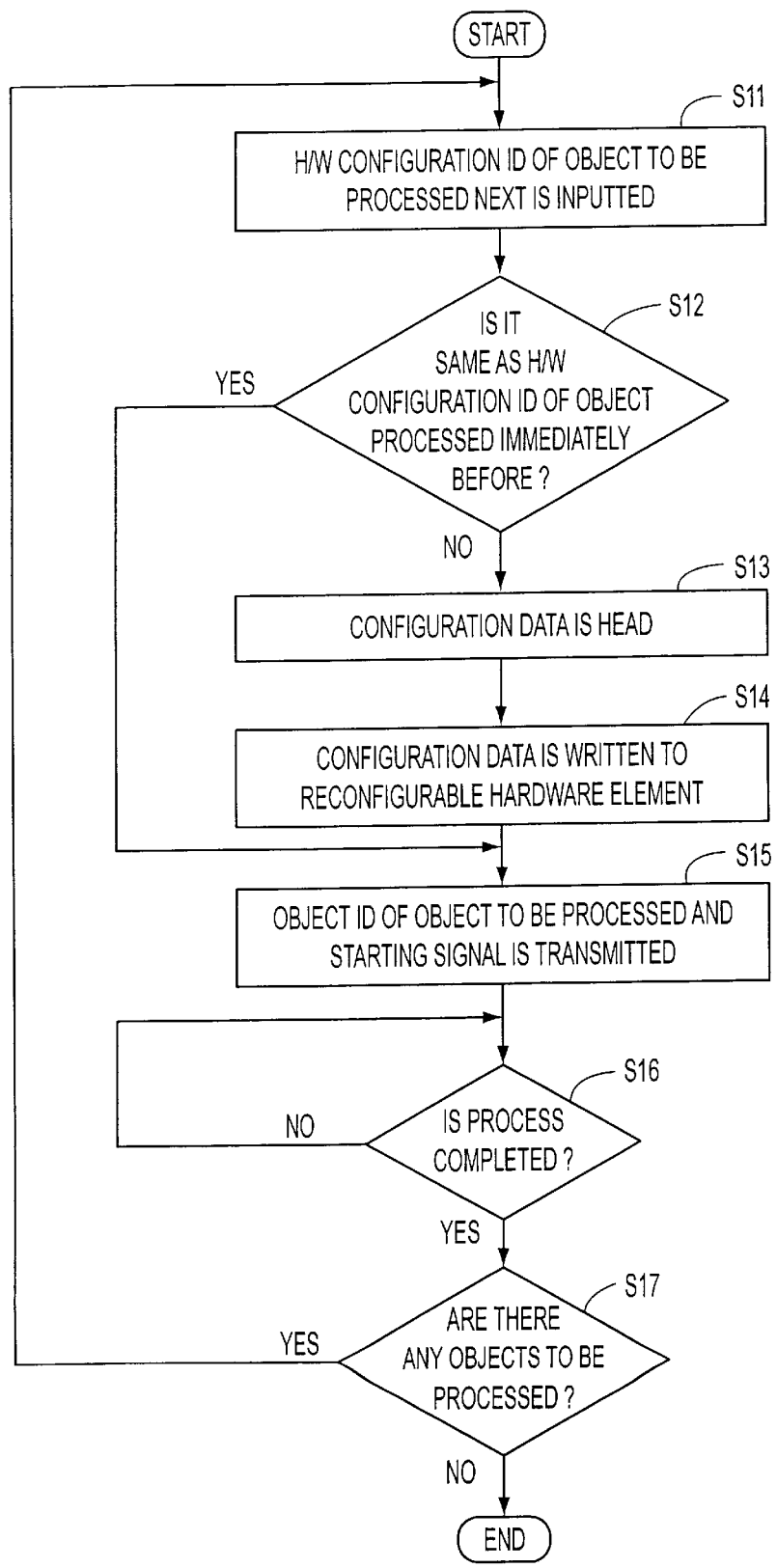
FIG. 18 is a flow chart showing procedures with which a reconfiguration controlling element controls a reconfigurable hardware element.

The procedures executed by the reconfigurable rasterizing element 40 for rasterizing the intermediate data shown in FIG. 10 output from the converting unit 3 are now discussed. The configuration controlling element 41 receives the hardware configuration ID and the object ID from the input buffer and, according to a flow chart shown in FIG. 18, controls the reconfigurable hardware element 46. The process performed by the configuration controlling element 41 has seven steps from S11 to S17.

At first, in step S11, the hardware configuration ID of the object to be processed next is input. Then, in step S12, it is examined whether the hardware configuration ID of the object to be processed next is the same as that of the object processed immediately before. If they are the same, it is unnecessary to newly write the configuration data to the reconfigurable hardware element 46 and the process skips to step S15. If they are different, the configuration data is read from the configuration data administering element 42 in accordance with the hardware configuration ID in step S13, and the configuration data read is written to the reconfigurable hardware element 46 in step S14. In step S15, the object ID of the object to be processed is output to the reconfigurable hardware element 46 and a starting signal is transmitted to inform the start of the process. In S16, completion of the process in the reconfigurable hardware element 46 is waited for. Then, in step S17, it is determined whether there are any more objects to be processed in the band being processed. If there are, the process returns to step S1, otherwise, the process is completed.

Figure 19:
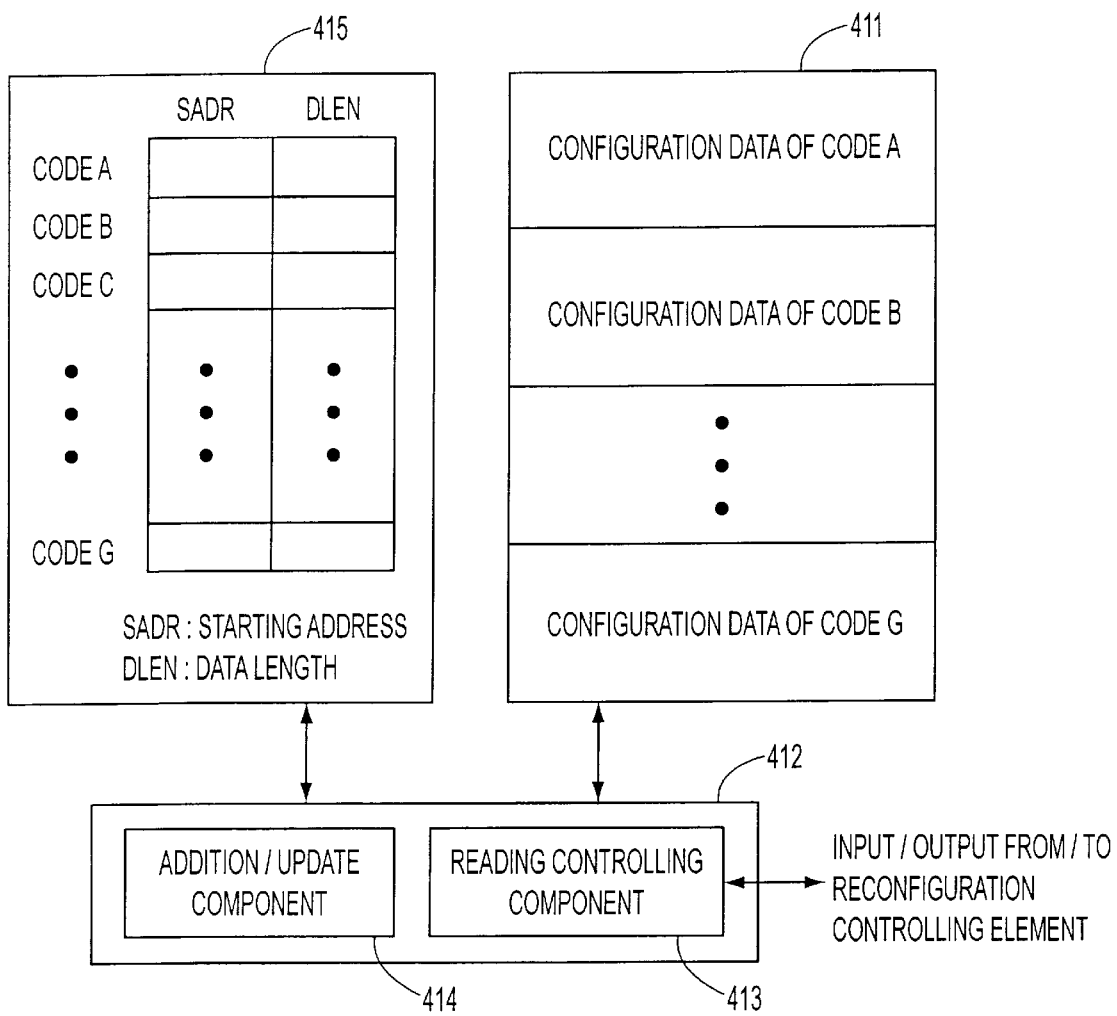
FIG. 19 shows the configuration of a configuration data administering element.

FIG. 19 shows the configuration of the configuration data administering element 42. The conversion table 415 receives the hardware configuration ID and outputs the starting address of a configuration code storage area 411 and the data length. The configuration code storage area 411 stores the configuration data corresponding to real hardware configuration IDs. Each entry has a variable length.

The controlling component 412 includes a reading controlling component 413 and an addition/update component 414. The reading controlling component 413 receives a reading signal and the hardware configuration ID and outputs the hardware configuration ID to the conversion table 415. Thereby, the address of the configuration code storage area 411 and the data length of the configuration data are input.

Next, the reading controlling component 413 outputs the input address to the configuration code storage area 411, reads the configuration data corresponding to the hardware configuration ID for the data length, and outputs the configuration data to the reconfiguration controlling element 41. The addition/update component 414 is a controlling component which adds or updates the configuration data transferred through a host computer (not shown). The addition/update component 414 executes addition, deletion or updating of the entries of the conversion table 415 and the configuration data in the configuration code storage area 411. The configuration code storage area 411 has the configuration data corresponding to the various circuit configurations for processing a single function, the configuration data corresponding to the parallel circuit configurations having the same plural functions, and the configuration data corresponding to pipeline processing circuit configurations having plural different functions.

Next, the specific configuration and the contents of processes of the reconfigurable hardware element 46 are described by using an example. The reconfigurable hardware element 46 is a processing block capable of changing the functions of the configuration data by writing the configuration data stored and administered by the configuration data administering element 42 under the control of the reconfiguration controlling element 41. Typically, the reconfigurable hardware element 46 can be constructed as a Field Programmable Gate Array (FPGA). The FPGA, for example, may include those produced by the XILINX Inc. (US) or the like.

Figure 20:
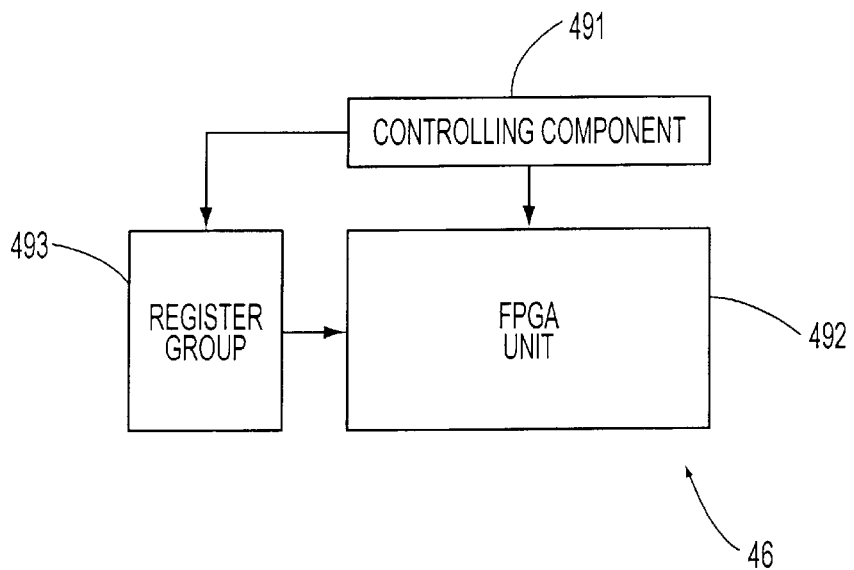
FIG. 20 is a block diagram showing an example configuration of the reconfigurable hardware element.

FIG. 20 shows a hardware configuration of the reconfigurable hardware element 46 using the FPGA. As shown in FIG. 20, the reconfigurable hardware element 46 is constructed to include a controlling component 491, FPGA unit 492 and register group 493. The register group 493 stores the configuration data transferred from the configuration data administering element 42. The function of the FPGA unit 492 is determined by the configuration data retained by the register group 493. The controlling component 491 controls the input/output of the data to/from the register group 493 or timing of operation of the FPGA unit 492.

Figure 21:
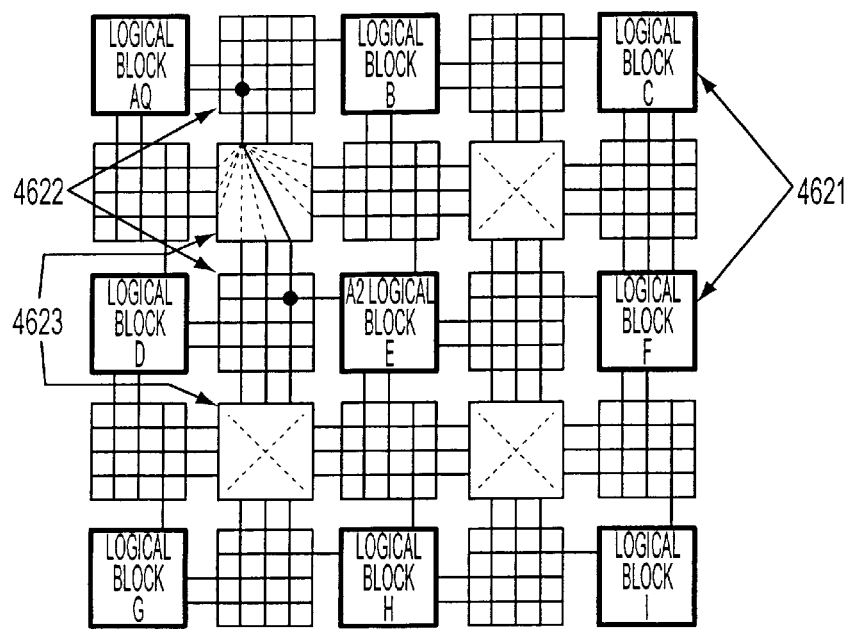
FIG. 21 illustrates the configuration of an FPGA unit shown in FIG. 20.
Figure 22:
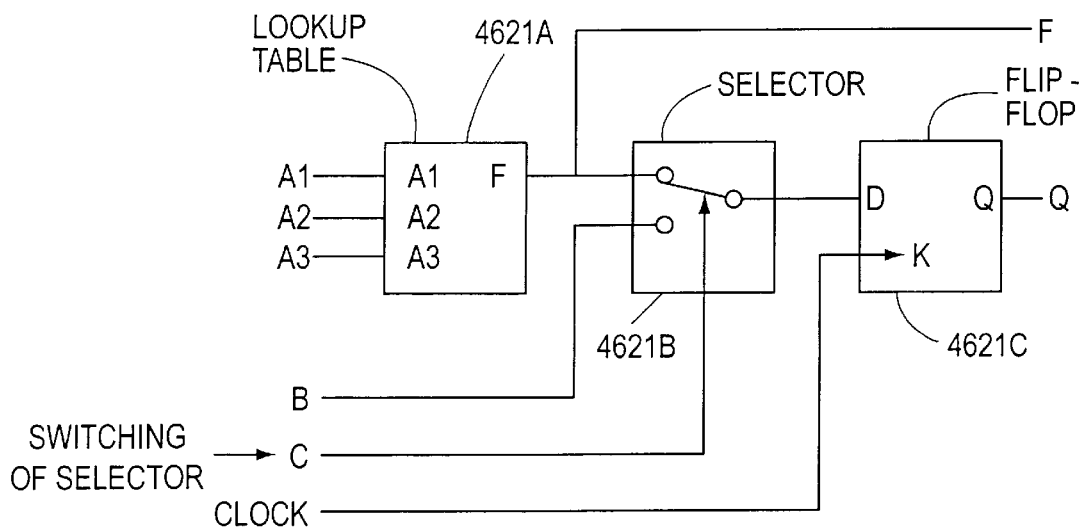
FIG. 22 illustrate the logical block shown in FIG. 21.
Figure 23:
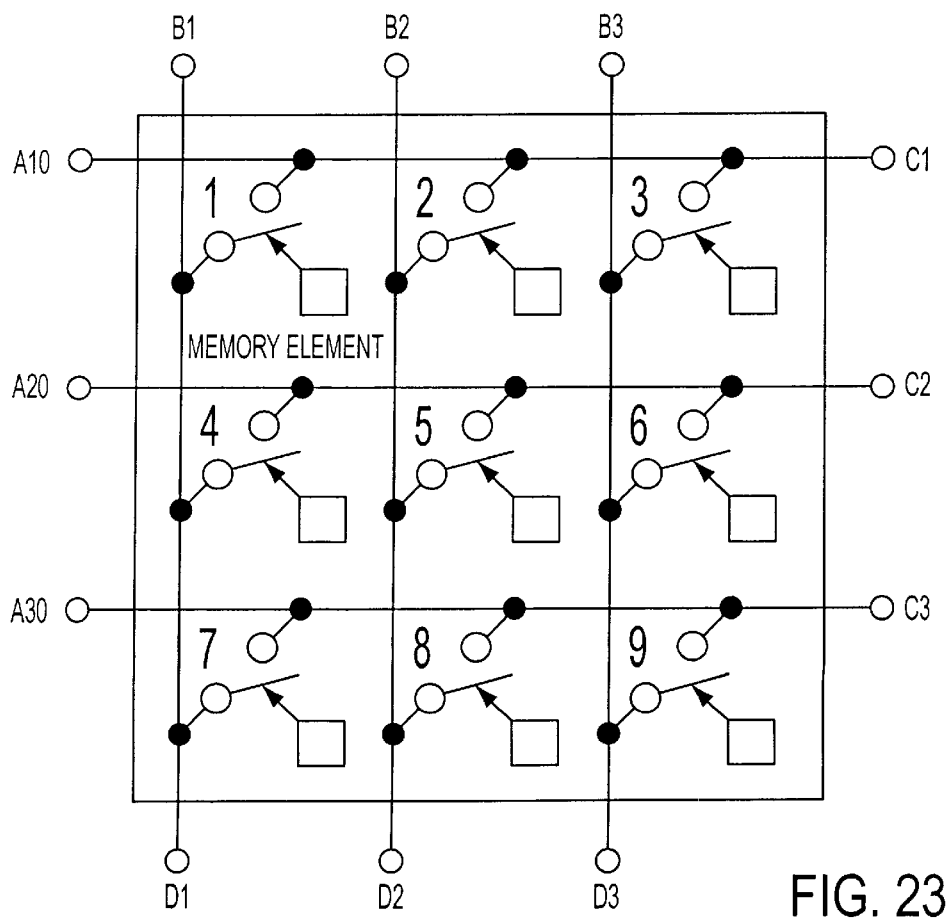
FIG. 23 illustrates the cross-point switch shown in FIG. 21.
Figure 24:
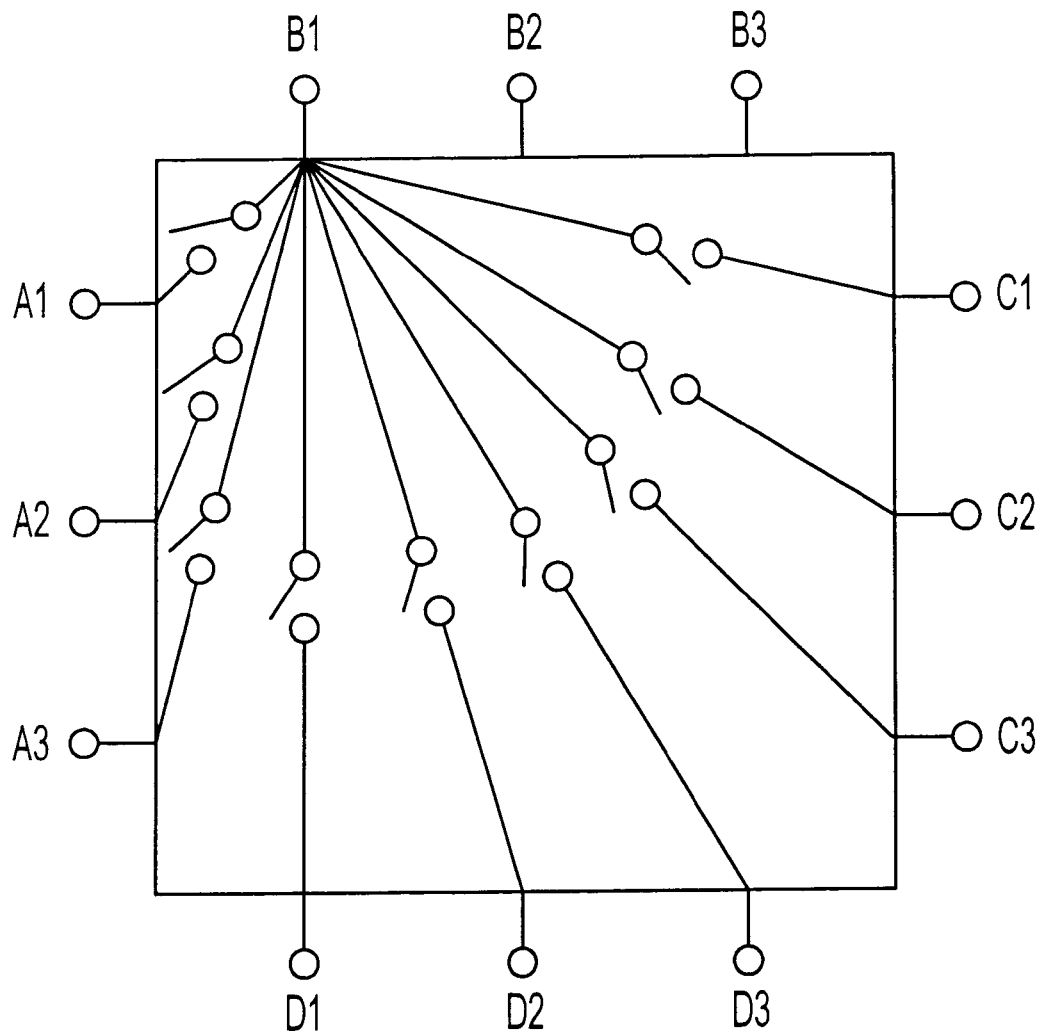
FIG. 24 illustrates the switch matrix shown in FIG. 22.

As shown in FIG. 21, the FPGA unit 492 is constructed to include multiple logical blocks 4621, multiple cross-point switches 4622 and multiple switch matrixes 4623. Each logical block 4621 includes a lookup table 4621A, selector 4621B and flip-flop 4621C as shown in FIG. 22. In the lookup table 4621A, a desirable truth table is packaged. A switching input signal of the truth table of the lookup table 4621A and the selector 4621B is determined by a value retained by the register group 493, which is a part of the configuration data. The cross-point switch 4622 and the switch matrix 4623 can be constructed as shown in FIGS. 23 and 24, respectively.

Figure 25:
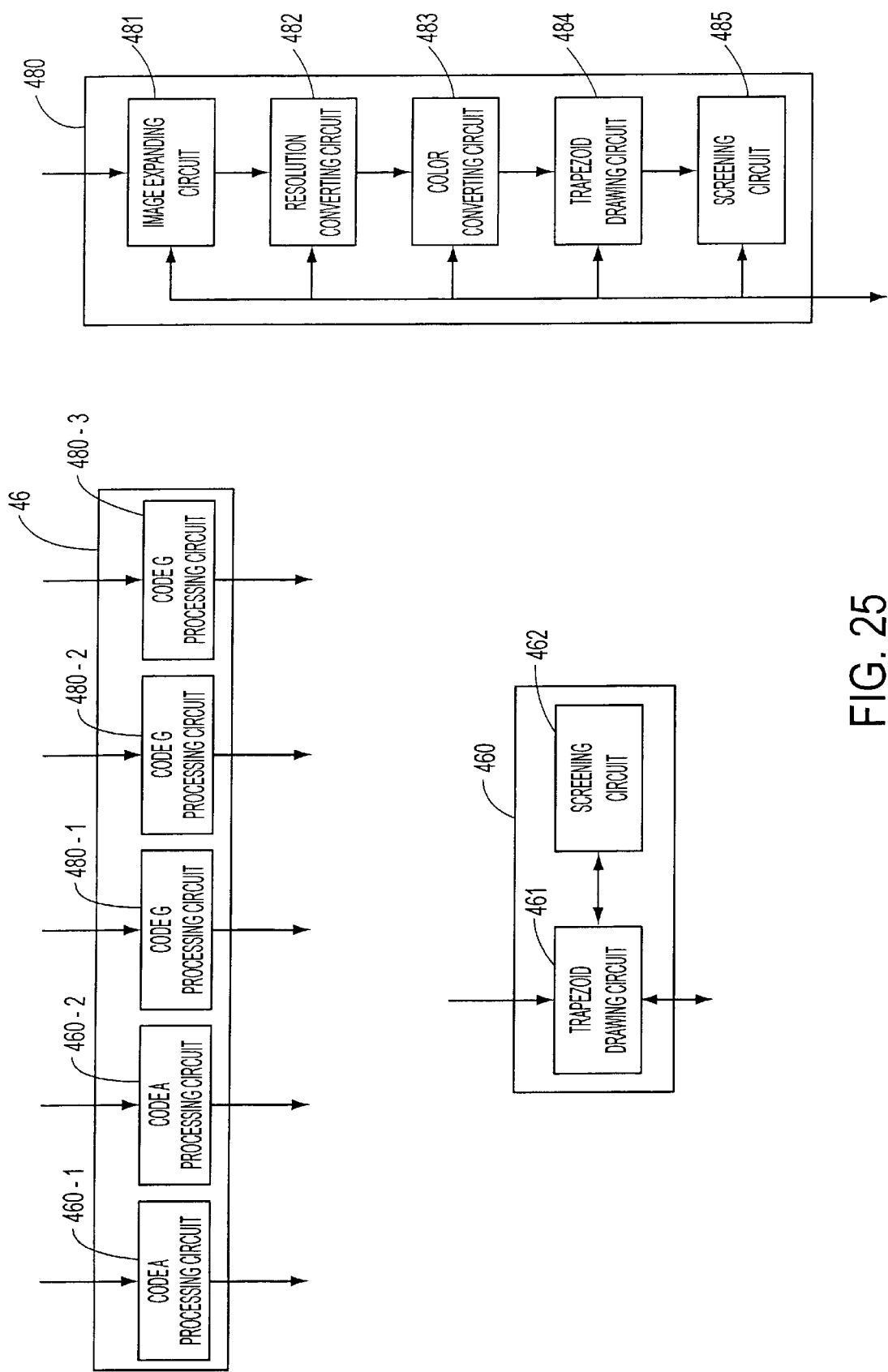
FIG. 25 is a functional block diagram of the configuration of the reconfigurable hardware element in the case where the hardware configuration ID is X.

A functional block diagram representing the functions of the reconfigurable hardware element 46 can be changed depending on the written configuration data. Therefore, the functional configuration and operation of the reconfigurable hardware element 46 are described by using an example where the hardware configuration ID is X. In the example, the reconfigurable hardware element 46 has the functional configuration as shown in FIG. 25. As shown in FIG. 25, the reference numerals 460, 460-1 and 460-2 indicate the processing circuits corresponding to the rasterizing process ID "Code A". The reference numerals 480, 480-1, 480-2 and 480-3 indicate the processing circuits corresponding to the rasterizing process ID "Code G". The internal configuration of the processing circuit 460 has a trapezoid drawing circuit 461 and a screening circuit 462. The internal configuration of the processing circuit 480 has an image expanding circuit 481, a resolution converting circuit 482, a color converting circuit 483, a trapezoid drawing circuit 484 and a screening circuit 485. As the circuit configuration having processing circuits 460-1, 460-2, 480-1, 480-2 and 480-3, the reconfigurable hardware element 46 is capable of parallel processing by using a circuit configuration having the same plural functions or a circuit configuration having different plural functions. Like the internal configuration of the processing circuit 480, it is also possible to execute pipeline processing of the input/output data among each of different plural functions. The configuration and operation of the processing circuit 460, whose rasterizing process ID corresponds to Code A, and the processing circuit 480, whose rasterizing process ID corresponds to Code G, are described in more detail as follows.

I. The Processing Circuit Whose Rasterizing Process ID Corresponds to Code A

Figure 26:
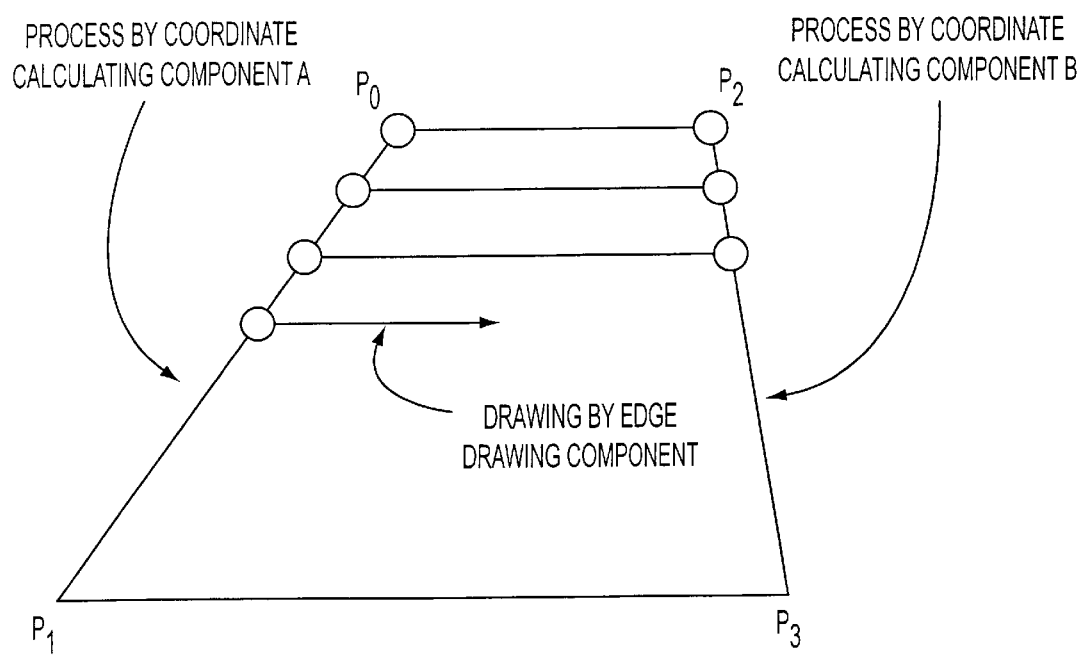
FIG. 26 illustrates the drawing of the trapezoid data.

The processing circuit 460 processes the intermediate data for the graphics which is generated by the converting unit 3. The trapezoid drawing circuit 461 transforms the trapezoid data (sx, sy, x0, x1, x2, h) representing the intermediate data that is input into a data format consisting of four points as shown in FIG. 26 and draws an image of the trapezoid region.

Figure 27:
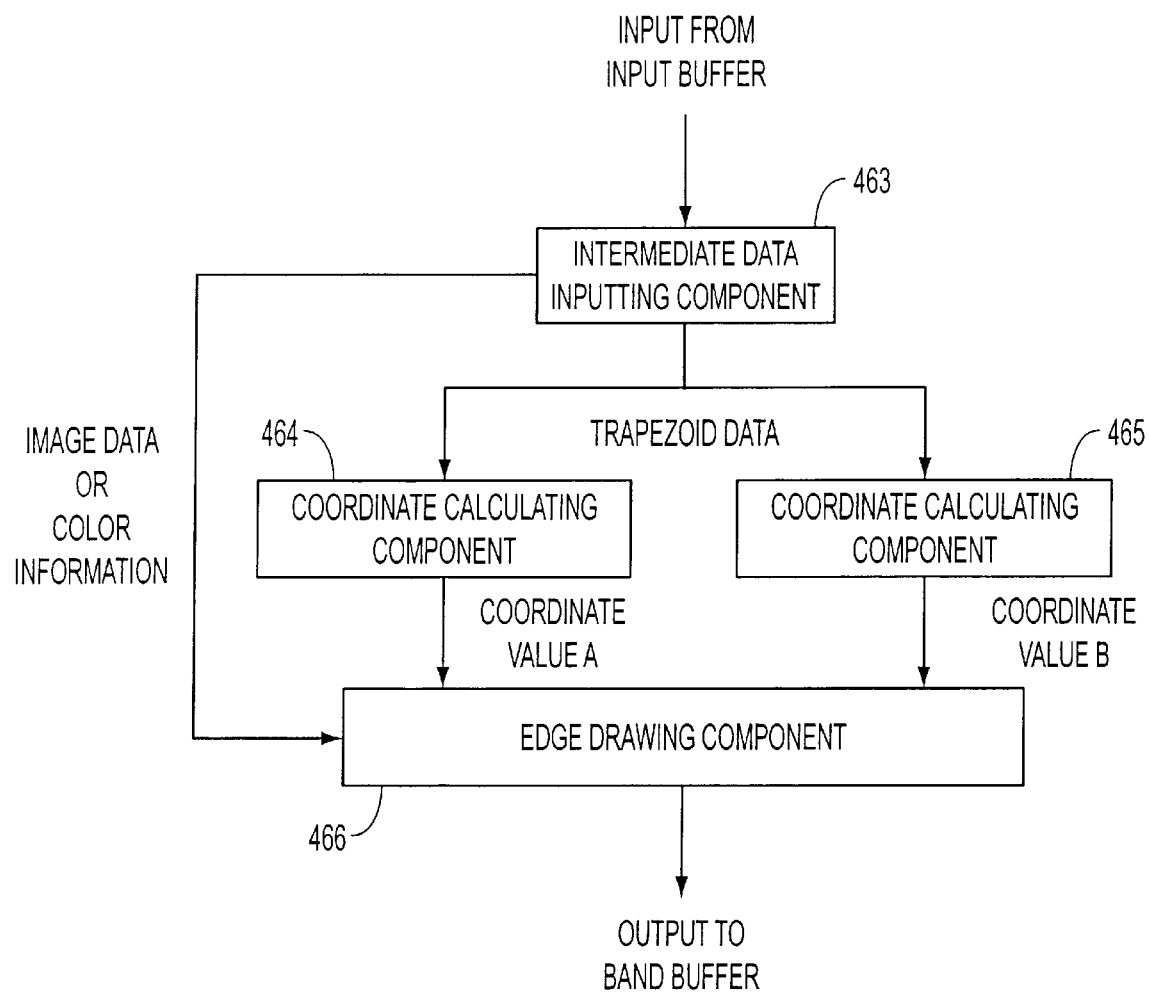
FIG. 27 is a functional block diagram of a trapezoid drawing circuit.

FIG. 27 shows the functional block diagram of the trapezoid drawing circuit 461. The intermediate data inputting component 463 reads the pieces of data, each of which is the basis of an individual trapezoid, and outputs the trapezoid data to the coordinate calculating components 464 and 465. The coordinate calculating component 464 calculates the coordinates of the left-side edge of the trapezoid (the edge P0–P1 in FIG. 26) and outputs the coordinate values on the edge in order from P0 to P1. The coordinate calculating component 465 calculates the right-side edge of the trapezoid (the edge P2–P3 in FIG. 26) and outputs the coordinate values on the edge in order from P2 to P3. An edge drawing component 466 draws straight lines in parallel with the x-axis in the trapezoid according to the coordinate values input from the coordinate calculating components 464 and 465.

Figure 28:
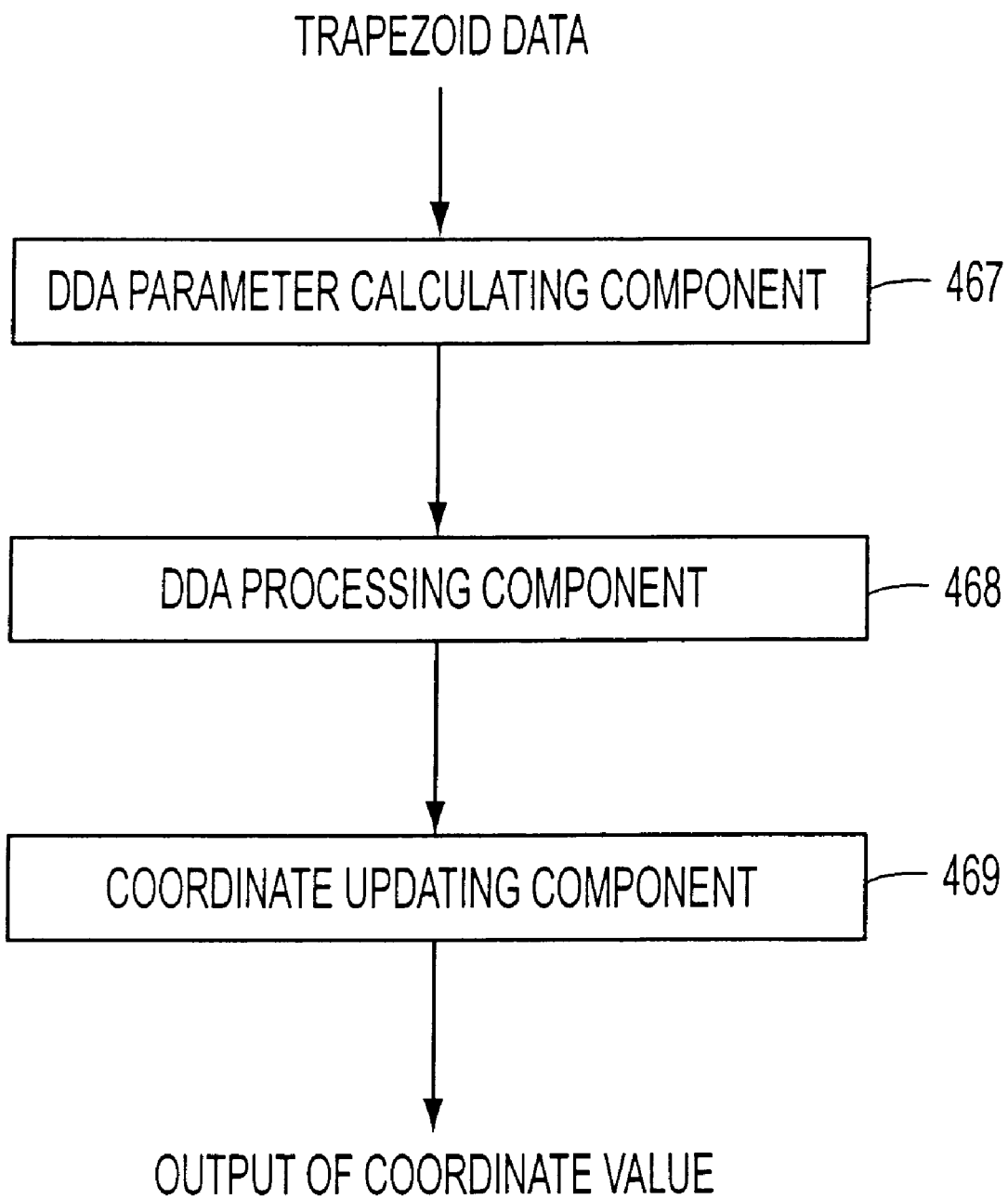
FIG. 28 is a functional block diagram of a coordinate calculating component.

FIG. 28 is a functional block diagram of the coordinate calculating component. The DDA parameter calculating component 467 transforms the input trapezoid data (sx, sy, x0, x1, x2, h) into the trapezoid data consisting of four points (P0, P1, P2, P3). The DDA parameter calculating component 467 then calculates DDA parameters such as the gradient, an initial value of the remainder, or the like, and outputs them to a DDA processing component 468. The DDA processing component 468 executes the DDA processing according to the input parameters, and outputs the direction of transfer and the amount of transfer for the point last obtained. A coordinate updating component 469 updates the coordinate values currently retained based on the input direction of transfer and amount of transfer and outputs them. The initial values of the coordinates are set by the intermediate data inputting component 463.

Figure 29:
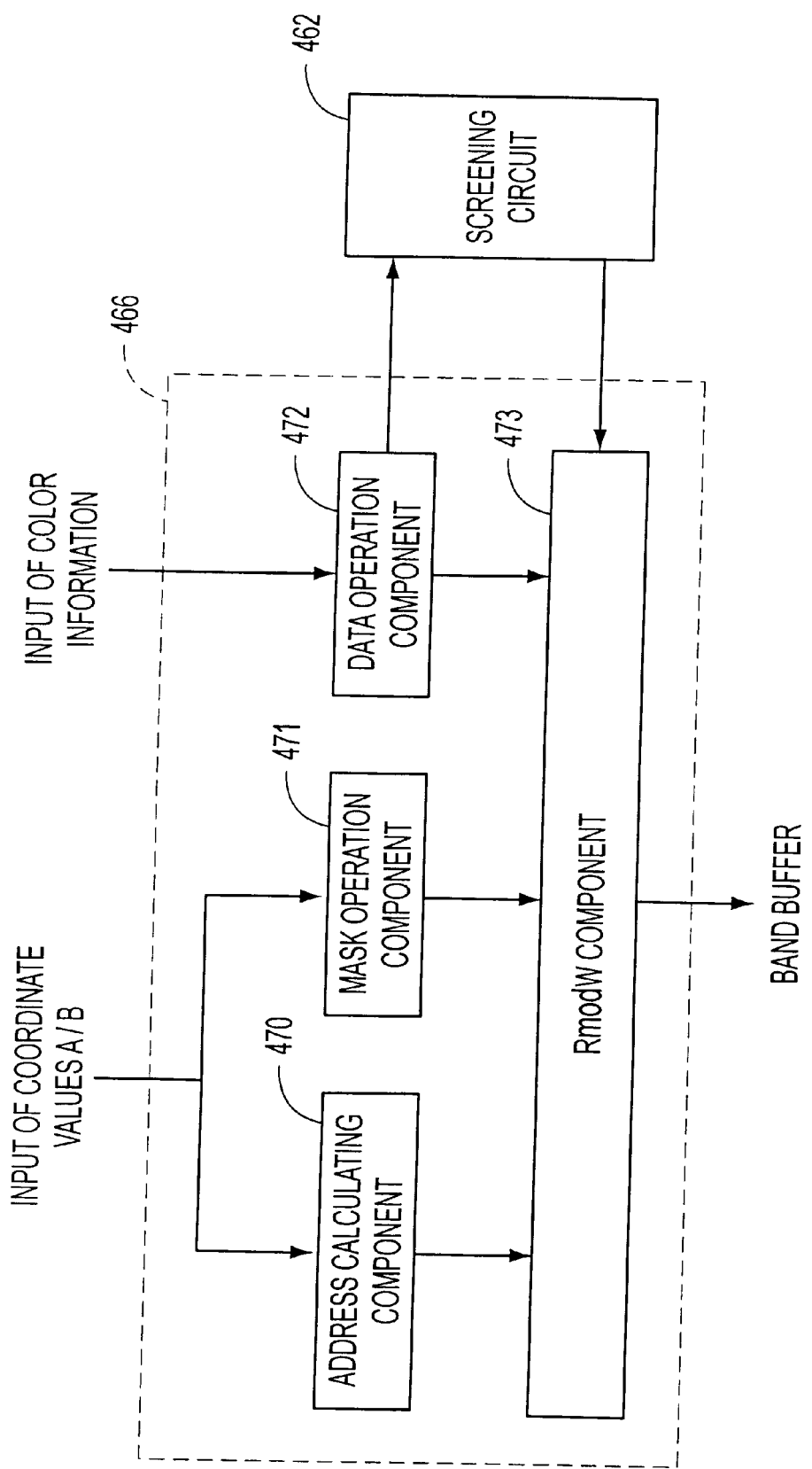
FIG. 29 is a functional block diagram of an edge drawing component.

FIG. 29 is a block diagram showing the edge drawing component 466. The edge drawing component 466 receives the coordinate values A, B and color information, and paints the inside region of the trapezoid. An address calculating component 470 receives the coordinate values A and B to calculate the addresses of components of the edge to be drawn. A mask operation component 471 receives the coordinate values A and B and outputs a mask that represents effective bits in a word to be drawn. A data operation component 472 receives color data representing fixed colors, develops the values for each word, and outputs them to the screening circuit 462. The result of the screening is output to an RmodW component 473. The RmodW component 473 draws an image by executing the following processes by utilizing the input address, mask and data.

First, the band buffer is read by the address. Assuming that the data read is "Source", the mask data is "Mask" and the drawing data is "Data", the operation (Mask*Data+ Mask#*Source) is performed and written to the same address. Here, *, + and # represent AND, OR, and logical NOT, respectively. The process is conducted for each word containing the edge to be drawn. The screening circuit 462 conducts final δ modification and halftoning in which a screen pattern optimized for outputting the graphics has been set. If the rasterizing process ID is Code B, the screening is the process for conducting the final γ modification and halftoning where a screen pattern optimized for outputting the character has been set.

II. The Processing Circuit Whose Rasterizing Process ID Corresponds to Code G

The processing circuit 480 receives an image in which pixels of the intermediate data have different colors, and executes various image drawing processes shown in the column of Code G in Table 2 above. The processing circuit, in the case of combination of processes for image drawing (expansion, resolution conversion, color space conversion, trapezoid drawing, screening), is explained as follows.

If the image of the input intermediate data has been compressed and requires an expanding process, the image expanding circuit 481 executes the expanding process for the intermediate data using an algorithm such as JPEG.

Figure 30:
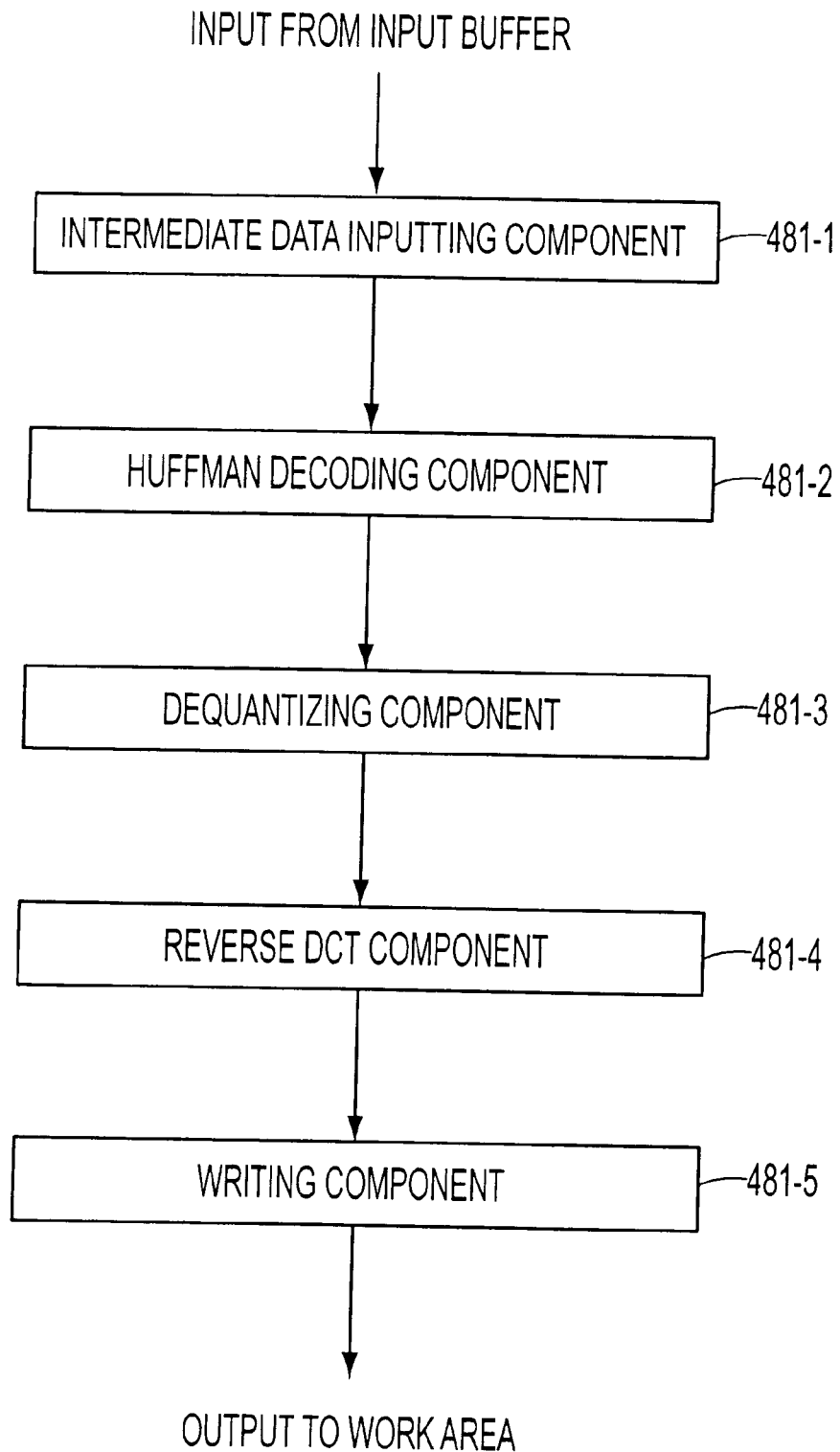
FIG. 30 is a functional block diagram of an extension processing circuit.

FIG. 30 is a functional block diagram of the expanding circuit 481. Through an intermediate data inputting component 481-1, the intermediate data which is a piece of compressed image data is input from the input buffer under operation. A Huffman decoding component 481-2 decodes the compressed data based on a Huffman decoding table disposed in it. A dequantizing component 481-3 dequantizes the data input from the Huffman decoding component 481-2 based on the Huffman coding table disposed in it and outputs the data. A reverse DCT component 481-4 transforms the data input from the dequantizing component 481-3 by the reverse DCT transforming expression and outputs the transformed data. A writing component 481-5 writes the image data decoded by the reverse DCT component 481-4 to the work area 424.

Figure 31:
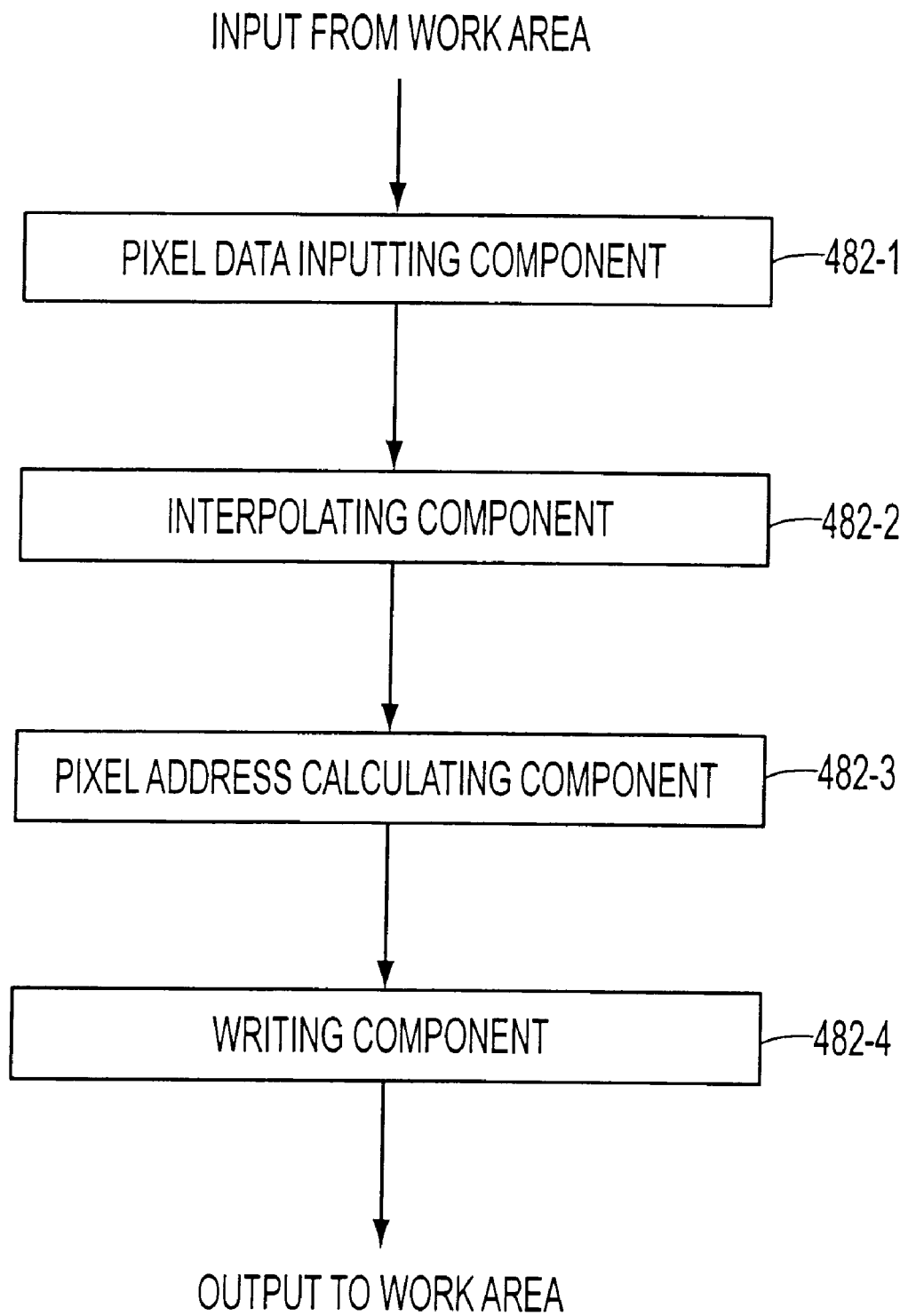
FIG. 31 is a functional block diagram of a resolution converting circuit.

FIG. 31 is a functional block diagram of the resolution converting circuit 482. A pixel data inputting component 482-1 reads the pixel data from the work area 424 to which the result of the expanding process has been written. Here, only the pixels which are necessary for interpolation of the pixels now under calculation are read and input using a reverse transformation according to the resolution transforming expression (1). An interpolating component 482-2 interpolates the luminance of the transformed pixel obtained from the input pixel data for each color component. The interpolation algorithm is executed based on the linear interpolation. A pixel address calculating component 482-3 calculates an address to be written to the work area 424 from the coordinates of the pixel under calculation. The writing component 482-4 writes a value of a new pixel based on the pixel address and the interpolation data to the work area 424. On the work area 424, the region where the input image is assigned is different from the region where the output image is assigned.

Figure 32:
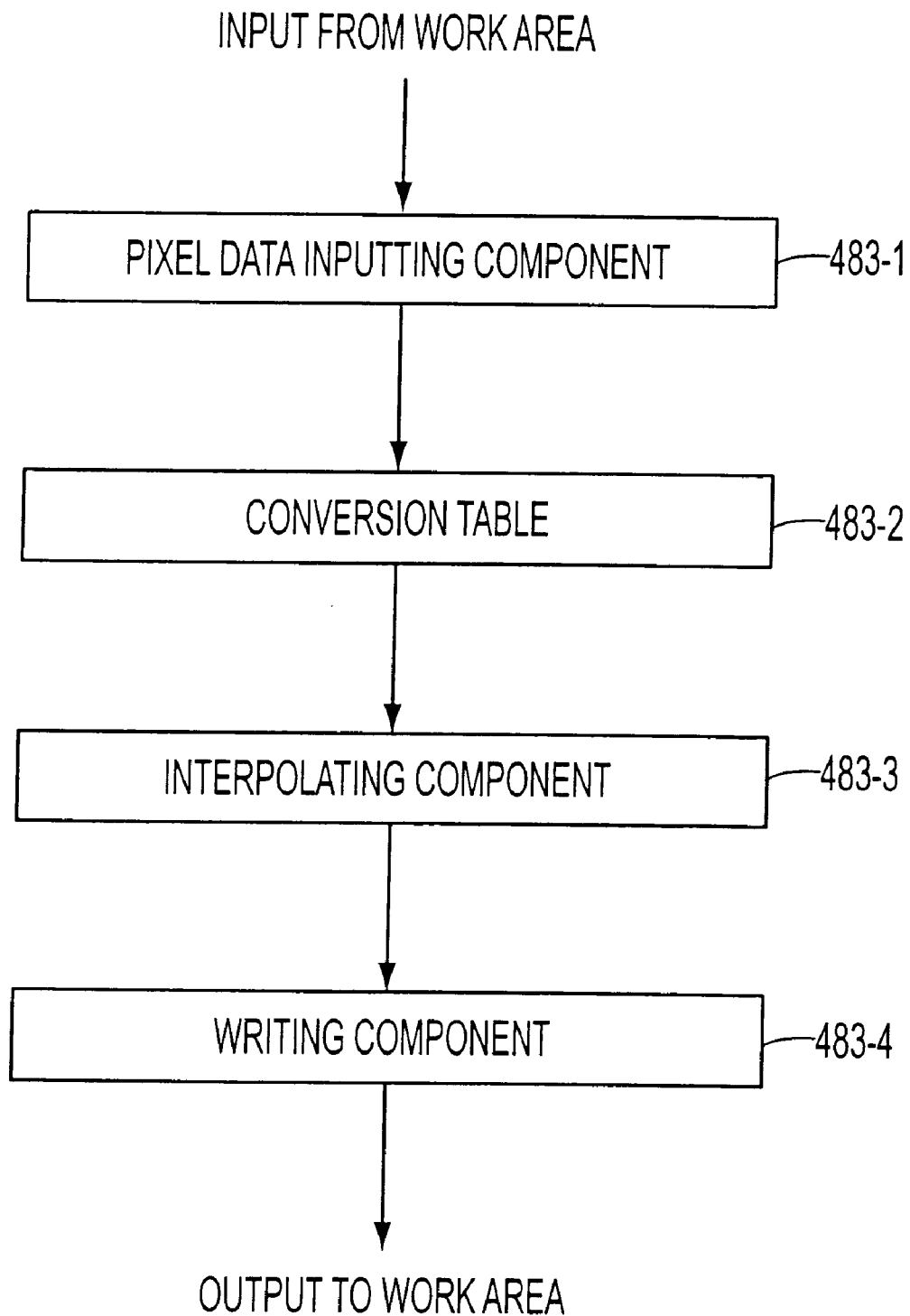
FIG. 32 is a functional block diagram of a color space converting circuit.

FIG. 32 is a functional block diagram showing the color space converting circuit 483. The color space conversion process converts the input image of RGB color space into an image of $CMYB_K$ color space. A pixel data inputting component 483-1 receives the pixel data of each pixel on the work area 424 which stores the result of the affine transformation. A conversion table 483-2 receives the RGB image data and outputs the image data for each of colors of $CMYB_K$.

In the present embodiment, image data is processed for each of the colors $CMYB_K$. Accordingly, only a conversion table for one color at a time is required. If it is desired to process the image data of four colors simultaneously, the conversion tables for four colors are required at the same time.

The conversion table is disposed in the conversion table 452 and has 9 representative points for each of the colors of RGB as the address of the table. More detailed conversion values are obtained by the addressing component in the next interpolating component 483-3.

Figure 33:
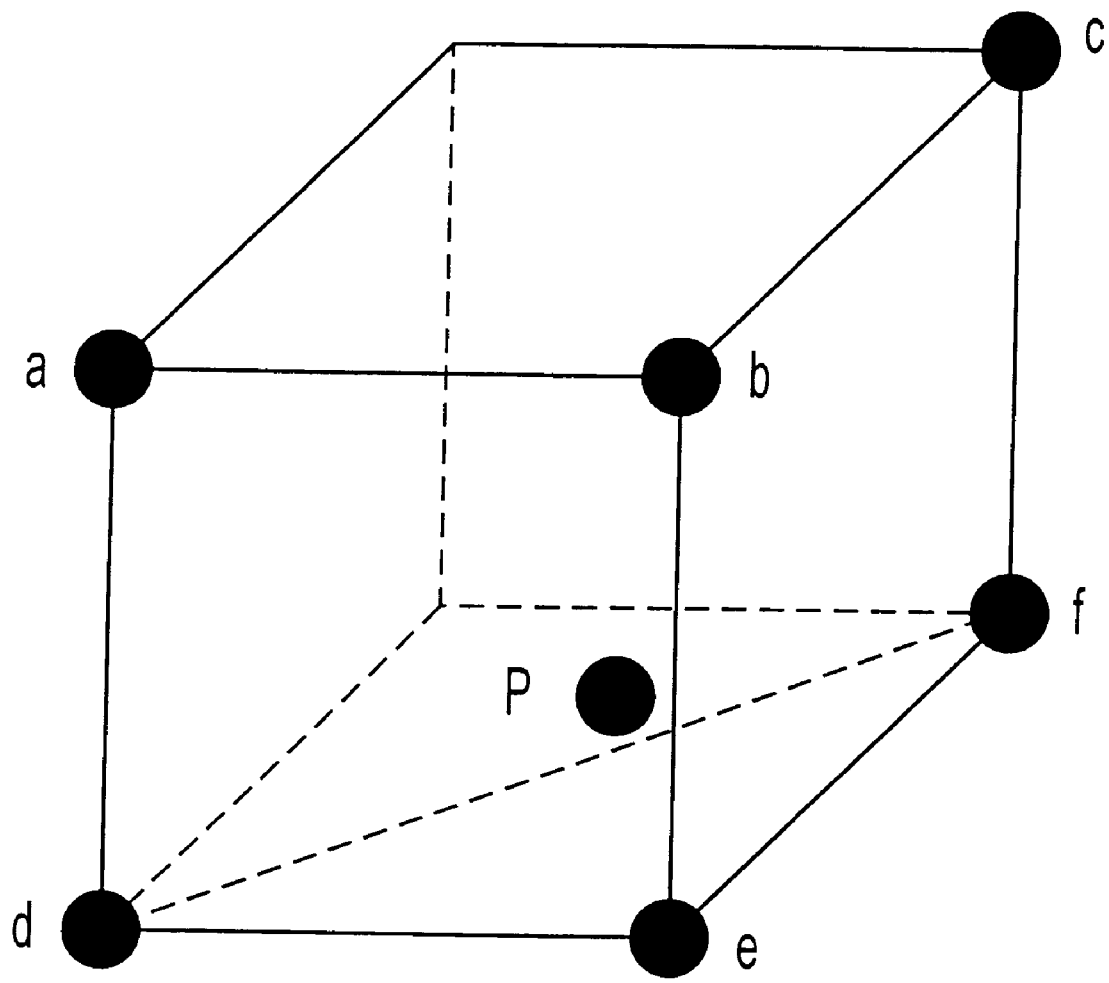
FIG. 33 shows a process of linear interpolation of color space conversion.

The interpolating component 483-3 obtains the detailed transformation values by executing linear interpolation in three dimensions based on 6 points surrounding one point of the RGB color space to be transformed. FIG. 33 shows this procedure. Regarding a point P in the RGB color space to be transformed, transformation values of 6 points (a, b, c, d, e, f) that are apexes of a triangular prism, one side of which includes P, are obtained by a lookup table in the table transforming component 483-2, and the linear interpolation is performed based thereon. The writing component 483-4 overwrites the result of transformation to the same address as that received by the pixel data inputting component 483-1.

The configuration of a trapezoid drawing circuit 484 for drawing the image data in the trapezoid region is basically the same as the functional blocks of trapezoid processes for the character or graphics shown in FIG. 27. Mapping and drawing an image in the trapezoid region is executed as shown in FIG. 8(*b*).

The points unique to drawing by the functional blocks shown in FIG. 27 are that the intermediate data inputting component 463 receives the image data from the work area 424. The intermediate data inputting component 463 outputs the image data to the edge drawing component 466 and the intermediate data representing the trapezoid data is received from the inputting buffer. As with the case of a character or graphics, the edge drawing component 466 writes the output image to the band buffer.

Screening is a process for converting the bit number of one color retained as the data, which is larger than that of one color able to be represented by a printer, into the bit number able to be represented by the printer. A typical process is referred to as halftoning which holds N×M threshold value data called a halftone matrix, compares the threshold value data with the image data for each color, and determines the color value for each color of the printer. For example, if the image data representing one color with 8 bits is to be output by the printer representing one color with one bit, an arbitrary value within 0 to 255 is stored in the halftone matrix of the N×M threshold value data. The value of the actual image data is compared with the halftone matrix threshold value data determined depending on the position of the image. If the value of the image data is larger than that of the halftone matrix threshold value data, the pixel is printed. Otherwise, the pixel is not printed.

The reconfigurable hardware element 46 executes the inputting/outputting processes between the memory through the arbitration element 45 and stores the result of rasterization in the band buffer.

In the present embodiment, the intermediate data is generated by the intermediate data generating element 31. However, it is possible to make the reconfigurable rasterizing element 40 generate the intermediate data by changing the hardware configuration of the rasterizing unit 4.

Figure 34:
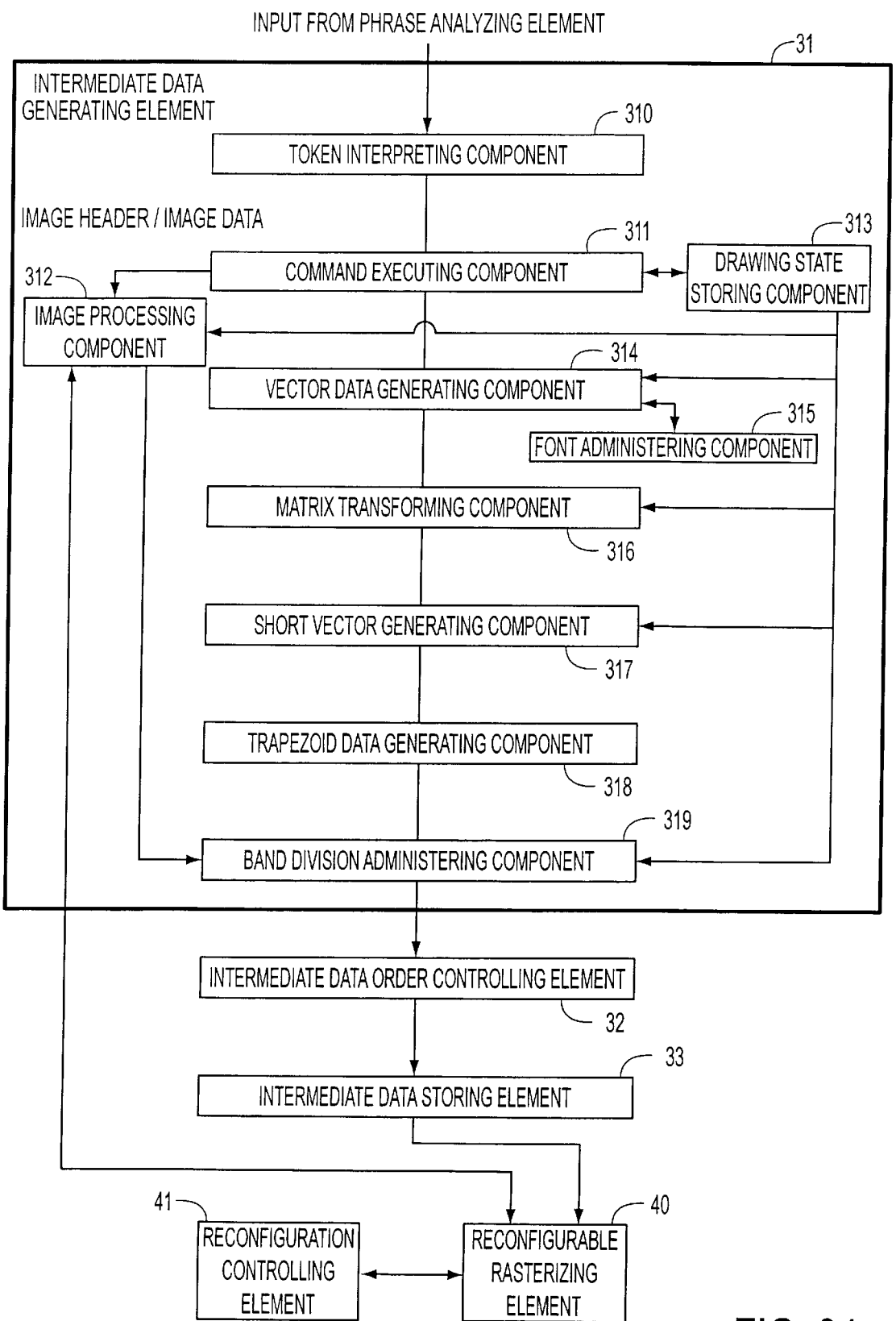
FIG. 34 shows the relation between a converting unit and a rasterizing unit in the case when the rasterizing unit is used as an accelerator.

Generation of the intermediate data by the reconfigurable rasterizing element 40 is described with reference to FIG. 34. For example, an image which was compressed by the Lempel-Ziv & Welch (LZW) method and input to the command executing component 311 of the intermediate data generating element 31 has been expanded by the LZW method, subject to the matrix operation, compressed by the LZW method by the image processing component 312 and then transferred to the band division administering component 319. This process can be done by the reconfigurable rasterizing element 40 of the rasterizing unit 4 instead of the image processing component 312.

The reconfiguration data for such a process is registered at the configuration data administering element 41 together with the rasterizing process ID in advance. When an image to be processed is input to the image processing component 312, the image processing component 312 interprets the content of the process and transfers the rasterizing process ID and input image data to the reconfigurable rasterizing element 40. According to the transferred rasterizing process ID, the reconfigurable rasterizing element 40 obtains the configuration data from the configuration data administering element 41 and reconstructs the internal reconfigurable hardware.

Then, in accordance with the procedures of image processing, the transferred input image data is processed by using the reconfigurable hardware. The image data prepared as a result of the process is then returned to the image processing component 312. With such a configuration, the reconfigurable resources of the reconfigurable rasterizing element 40 can be effectively utilized.

As described above, in rewriting of the reconfigurable hardware element 46 performed by the reconfiguration controlling element 41, it has been assumed that all of the hardware resources are rewritten. However, it is possible to partially rewrite the reconfigurable hardware element 46 if necessary. Now, a controlling method of the reconfiguration controlling element 41, on the assumption that the reconfigurable hardware element 46 is partially rewritten, is explained.

Figure 35:
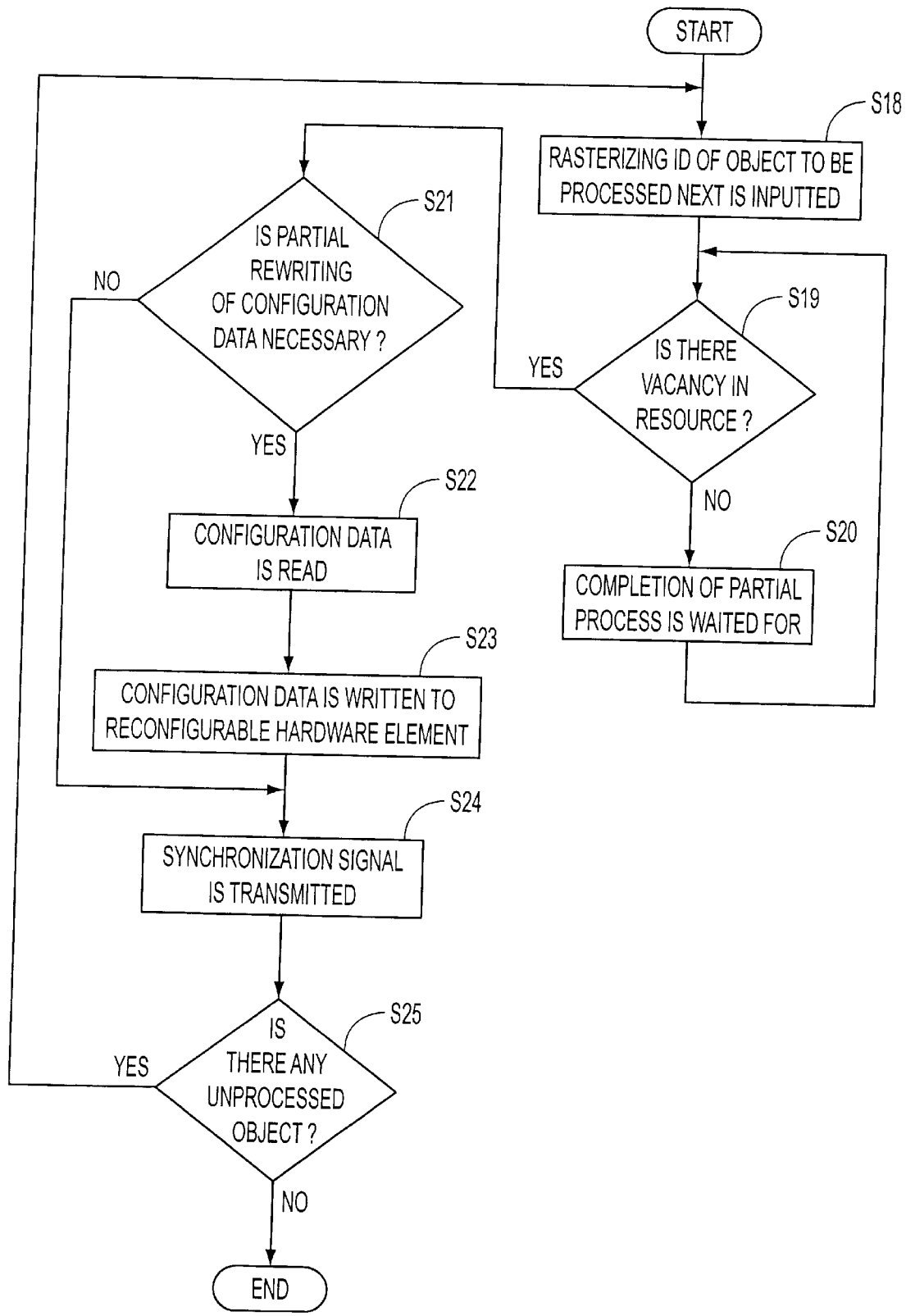
FIG. 35 is a flow chart showing procedures with which the reconfiguration controlling element performs control in the case of partially rewriting the reconfigurable hardware element.

In this case, when the data structure shown in FIG. 10 is generated, all objects which can be processed in parallel are classified into one group and hardware configuration IDs are not needed. FIG. 35 is a flow chart showing the processes executed by the reconfiguration controlling element 41 when the reconfigurable hardware element 43 is partially rewritten.

FIG. 35 shows a flow of control executed for the group of the objects which can be processed in parallel by the reconfiguration controlling element 41, including 8 steps from S18 to S25. First, in step S18, the rasterizing process ID of the object to be processed next is input. Then, in step S19, it is examined whether there is vacancy in the resource of the reconfigurable hardware element 46 for writing the configuration data corresponding to the input rasterizing process ID. If there is, the process proceeds to step S21. Otherwise, the process proceeds to step S20.

In step S20, completion of the partial process which is now under execution by the reconfigurable hardware element 46 is waited for. In step S21, it is examined whether partial rewriting of the configuration data is necessary. If the process finished by the reconfigurable hardware element 46 and the next process have the same rasterizing process ID, it is unnecessary to partially rewrite the configuration data. If partial rewriting is unnecessary, the process proceeds to step S24. Otherwise, the process proceeds to step S22.

In step S22, the configuration data corresponding to the rasterizing process ID input from the configuration data administering element 42 is read. Then, in step S23, the configuration data, which has been read, is partially written to the reconfigurable hardware element 46. Next, in step S24, a synchronization signal is transmitted to the reconfigurable hardware element 46 for indicating that the partial rewriting process is completed and it becomes possible to start a new process.

Then, in step S25, it is determined whether there is any unprocessed object data left in the group of the objects which can be processed in parallel now under processing. If there is, the process returns to step S18. Otherwise the process is completed. After that, completion of rasterizing of all objects in the reconfigurable hardware element 46 is waited for, and then the procedures of the controlling flow shown in FIG. 35 are executed on a new set of the objects which can be processed in parallel.

Second Embodiment

Figure 36:
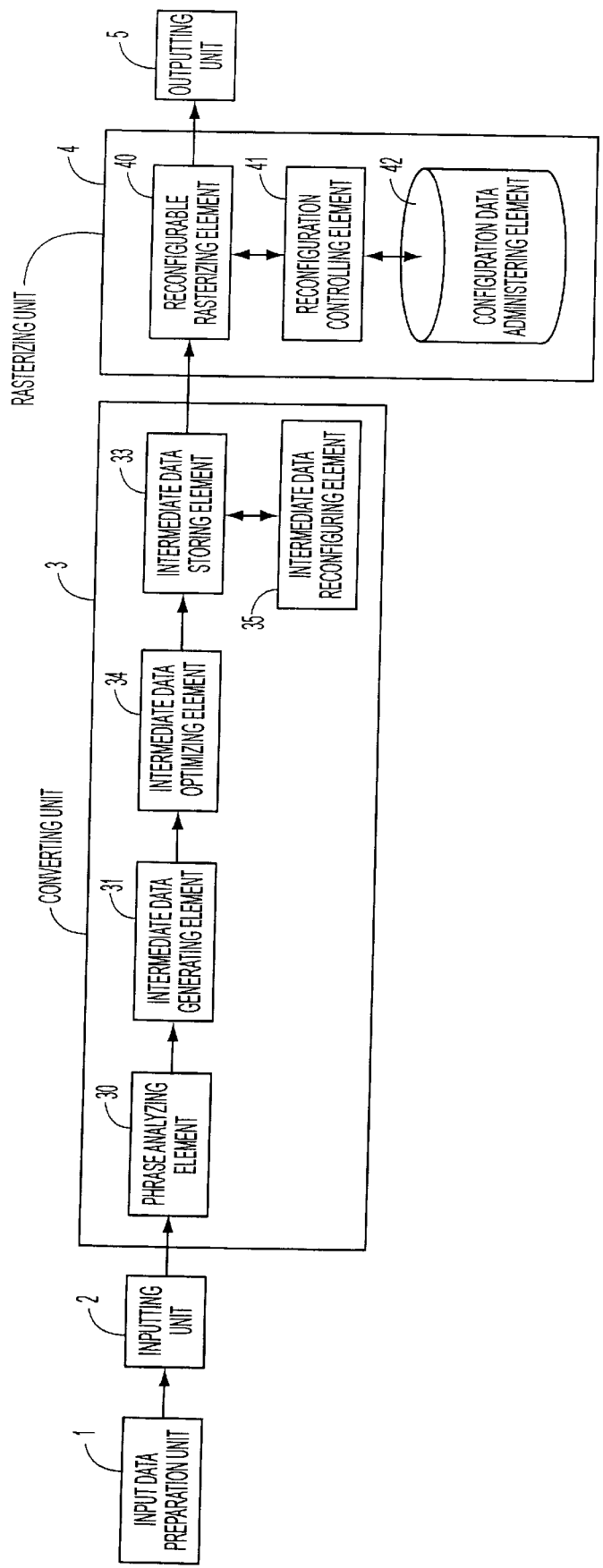
FIG. 36 is a block diagram showing a second embodiment of the print processing apparatus according to the present invention.

FIG. 36 is a block diagram showing the configuration of the second embodiment of the print processing apparatus according to the present invention. As shown in FIG. 36, the print processing apparatus includes an input data preparation unit 1, an inputting unit 2, a converting unit 3, a rasterizing unit 4, and an outputting unit 5. The converting unit 3 further includes a phrase analyzing element 30, an intermediate data generating element 31, an intermediate data optimizing element 34, an intermediate data reconfiguring element 35 and an intermediate data storing element 33. The rasterizing unit 4 further includes a reconfigurable rasterizing element 40, a reconfiguration controlling element 41 and a configuration data administering element 42.

In the above configuration, the input data preparation unit 1, the inputting unit 2, the rasterizing unit 4 and the outputting unit 5 are the same as those of the first embodiment. Accordingly, their explanations are omitted here.

The converting unit 3 generates the intermediate data which can be rasterized into the dot data from the input data input through the inputting unit 2 by the rasterizing unit 4. The rasterizing unit 4 includes the phrase analyzing element 30, the intermediate data generating element 31, the intermediate data optimizing element 34, the intermediate data reconfiguring element 35 and the intermediate data storing element 33. Among these elements, the phrase analyzing element 30, the intermediate data generating element 31 and the intermediate storing element 33 are same as those of the configuration of the first embodiment. Accordingly, their explanations are also omitted.

The intermediate data optimizing element 34 rearranges the pieces of the intermediate data (hereinafter referred to as objects) after band division. Each of the pieces of the intermediate data corresponds to each drawing command and the pieces are generated in the order of being written in the page description language by the intermediate data generating element 31 so that the pieces of the intermediate data corresponding to the same drawing command may successively appear in each band as much as possible.

The rearrangement is executed to reduce the number of times of reconfiguration of the reconfigurable circuit in the rasterizing unit 4, thus enabling high speed processing. In the rearrangement process, bounding boxes of the pieces of the intermediate data corresponding to each drawing command in each band are compared with each other to determine whether they have overlap. If it is determined that the pieces of the intermediate data can be rearranged based on the result of the comparison, rearrangement is executed so that the pieces of the intermediate data corresponding to the same drawing command may successively appear. If the rearrangement is impossible, the order is not changed and the pieces of the intermediate data are written to the intermediate data storing element 33.

The reason why determination as to the possibility of rearrangement of the order of the drawing commands based on overlap is necessary, is that only an object drawn by a drawing command executed last remains as a result in the case where multiple drawing commands are executed in the same place. This is because PDL adopts an opaque imaging model.

In accordance with the state of pieces of the intermediate data which are classified into each of the kinds of drawing by the intermediate data optimizing element 34, the intermediate data reconfiguring element 35 determines whether the process is to be executed or skipped. Here, the number of reconfigurations of the reconfigurable circuit in the rasterizing unit 4 is compared with a threshold value set in advance in the intermediate data optimizing element 34. If it is determined that the number of times of reconfiguration has been sufficiently reduced through rearrangement by the intermediate data optimizing element 34, the process can be skipped. However, if the number of times has not been sufficiently reduced, the pieces of the intermediate data are read from the intermediate data storing element 33 for each band unit and the process for removing overlap between the pieces of the intermediate data in each band unit is executed. Thus the pieces of the intermediate data can be generated. Since the pieces of the intermediate data have no overlap, they can be completely classified into each kind of drawing. Consequently, the intermediate data can be reconfigured based thereon and written again to the intermediate data storing element 33 for each band. The process is repeated for the number of times corresponding to the number of the bands.

Next, the flow of the input data in the print processing apparatus with the above-described configuration will be described. The input data prepared by the input data preparation unit 1 is input to the phrase analyzing element 30 of the converting unit 3 through the inputting unit 2. A token extracted from the input data in the phrase analyzing element 30 is input to the intermediate data generating element 31. Pieces of the intermediate data generated by the intermediate data generating element 31 and divided into band units, are input to the intermediate data optimizing element 34. Then the rearrangement of the data pieces is executed so that the same drawing commands may successively appear as much as possible and the intermediate data pieces are written to the intermediate data storing element 31 for each band unit. The intermediate data pieces read from the intermediate data storing element 33 for each band unit, as occasion demands, are input to the intermediate data reconfiguring element 35 and reconfigured to form the intermediate data in which pieces are completely classified into each of the drawing commands. After the reconfiguration is completed, the pieces of the intermediate data are written again to the intermediate data storing element 33 for each band unit.

The rasterizing unit 4 and the outputting unit 5 are the same as those of the configuration of the first embodiment. Therefore, their explanations are omitted.

Now the main part of the print processing apparatus will be described in detail. Here, the intermediate data optimizing element 34 and the intermediate data reconfiguring element 35 of the converting unit 3 are different from the configuration of the first embodiment.

Figure 37:
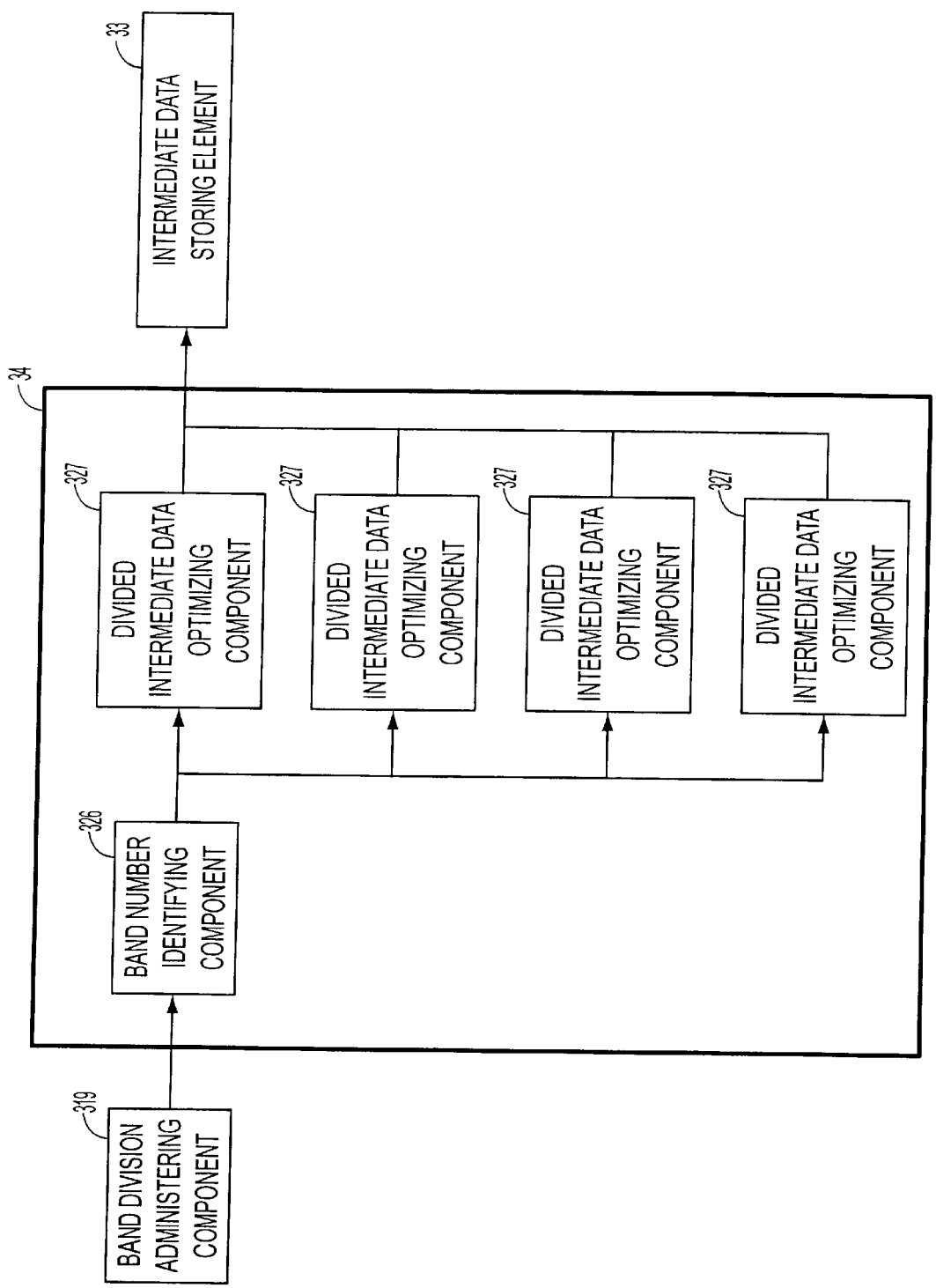
FIG. 37 shows an example of the configuration of an intermediate data optimizing element.

FIG. 37 shows the configuration of the intermediate data optimizing element 34. The element includes a band number identifying component 326 and divided intermediate data optimizing components 327 of the number corresponding to the number of the bands. FIG. 37 shows an example in which one page is divided into 4 bands, and accordingly, 4 divided intermediate data optimizing components corresponding to 4 bands constitute the intermediate data optimizing element 34. The band number identifying component 326 identifies the band ID contained in the object transferred from the band division administering component 319 and transfers the object to the divided intermediate data optimizing component 327 corresponding to the band ID.

Figure 38:
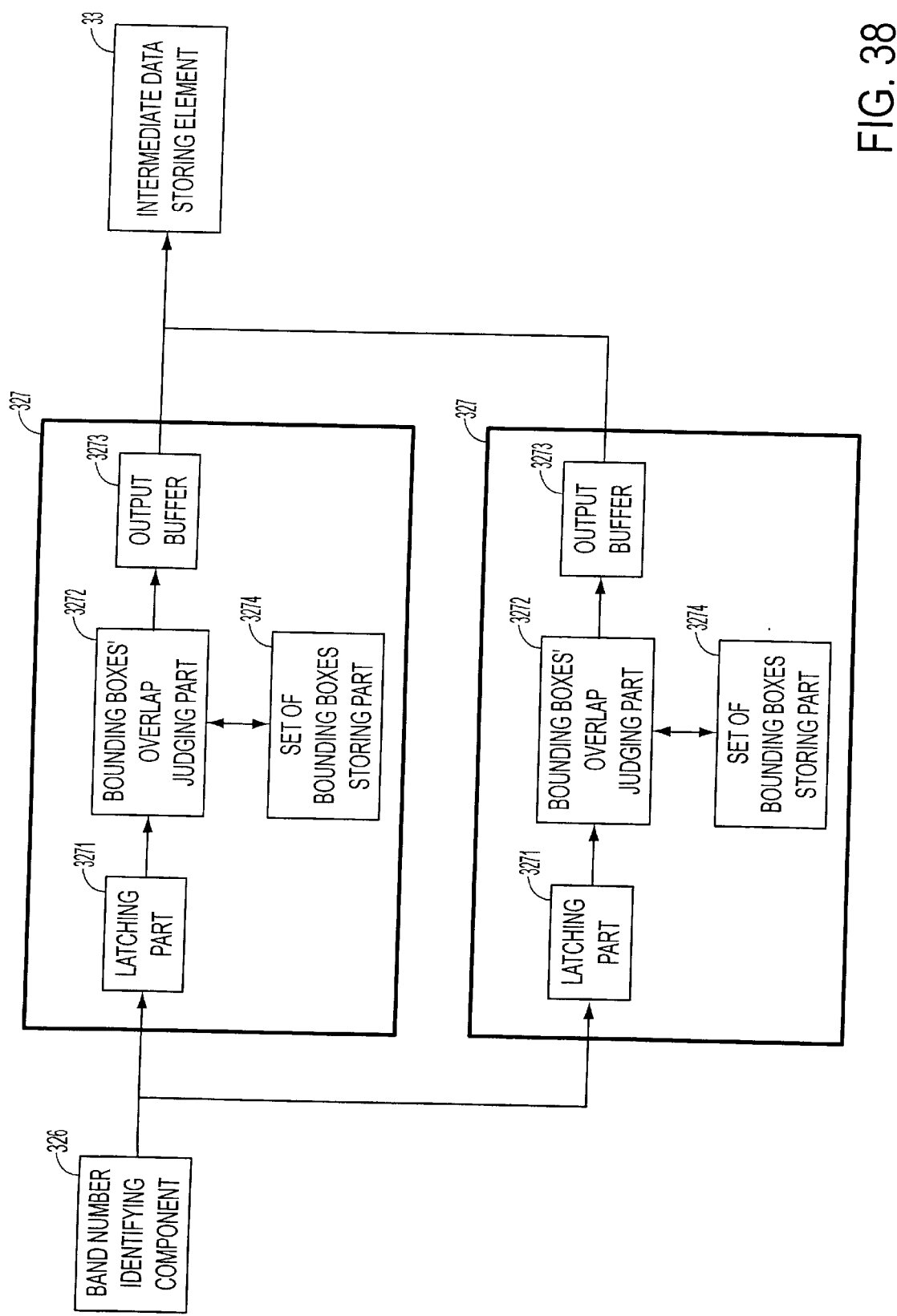
FIG. 38 shows an example of the configuration of a divided intermediate data optimizing component.

FIG. 38 shows the configuration of the divided intermediate data optimizing components 327 (for reasons of convenience, only two divided intermediate data optimizing components 327 are shown in the figure). The divided intermediate data optimizing component 327 includes a latching part 3271, a bounding box overlap judging part 3272, an output buffer 3273 and a set of bounding boxes storing part 3274. The latching part 3271 retains the objects, namely, the intermediate data pieces transferred from the band number identifying component 326. The bounding box overlap judging part 3272 judges whether the bounding boxes of the objects retained by the latching part 3271 overlap each other. Further, the bounding box overlap judging part 3272 adds the objects to the output buffer 3273 or erases the content of the output buffer 3273 according to the procedures described later.

Figure 39:
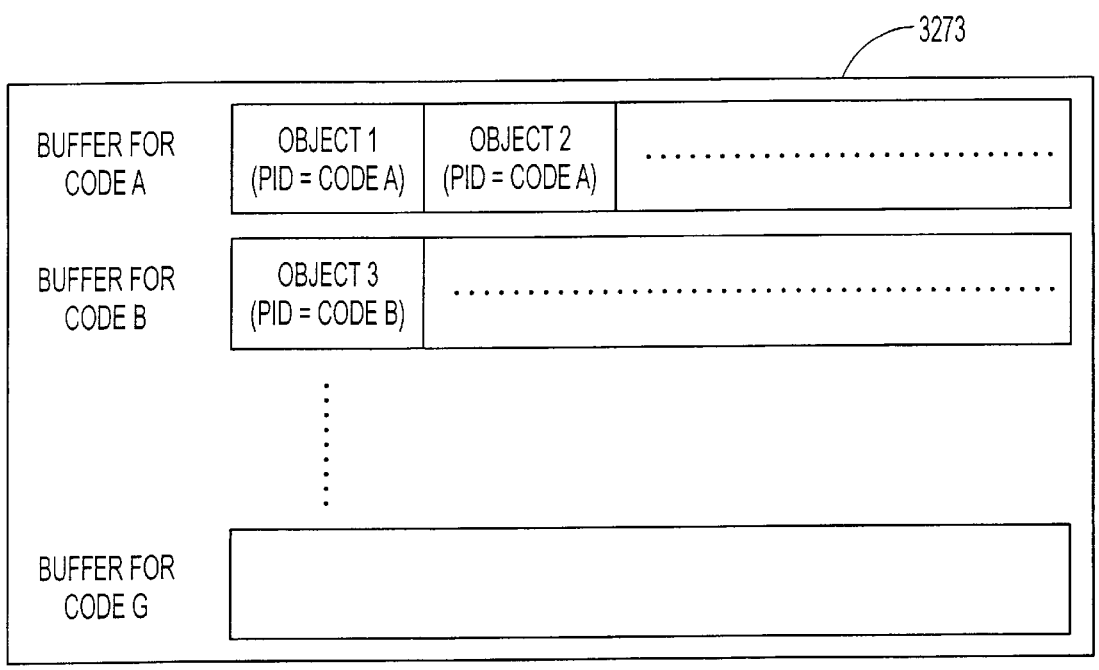
FIG. 39 shows an example of the configuration of an output buffer.

To enable successive processing, the output buffer 3273 has a group of output buffers of the FIFO type, each of which corresponds to each rasterizing process ID, namely, each type of process as shown in FIG. 39.

The set of bounding boxes storing part 3274 retains a set of bounding box data pieces of the objects which have been judged to have overlap with each other, as a bitmap. Hereinafter, the set of the bounding box data pieces of the objects retained as a bitmap is referred to as a set of bounding boxes. The set of bounding boxes is used for judgment of overlap between the bounding boxes in the bounding box overlap judging part 3272. In the judgment, the bounding box data of the object to which the judgment regarding overlap is given is referred to as the target bounding box. The object corresponds to the target bounding box is referred to as target object. A rasterizing process ID register is provided to the bounding box overlap judging part 3272 for retaining the rasterizing process ID of an object which has been processed immediately before the target object.

Figure 40A:
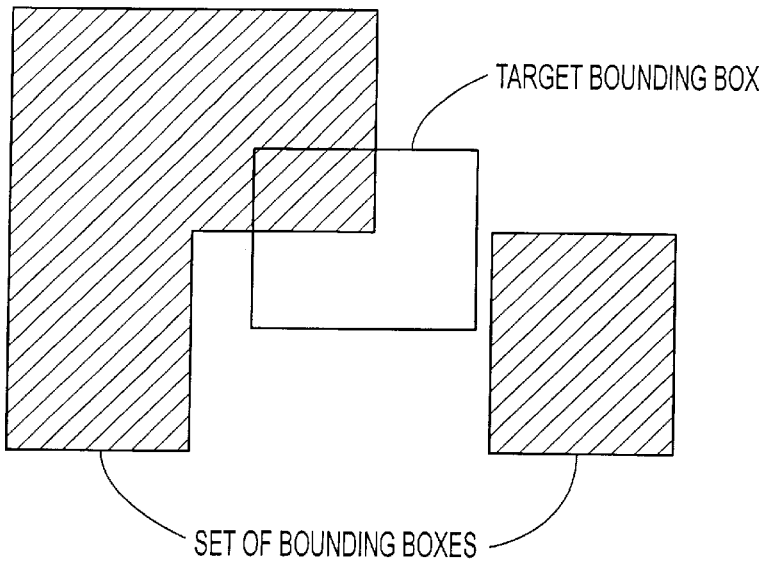
FIGS. 40(a) and 40(b) show the state of overlap between bounding boxes in the second embodiment.
Figure 40B:
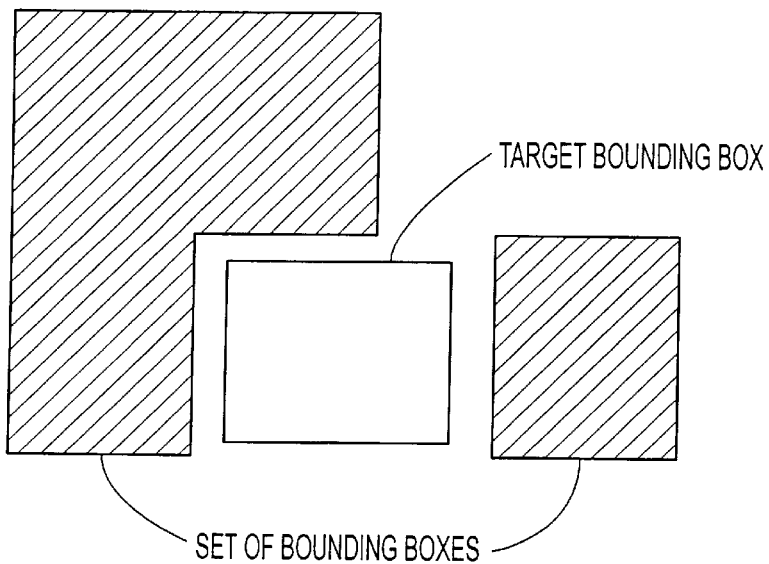
Figure 42:
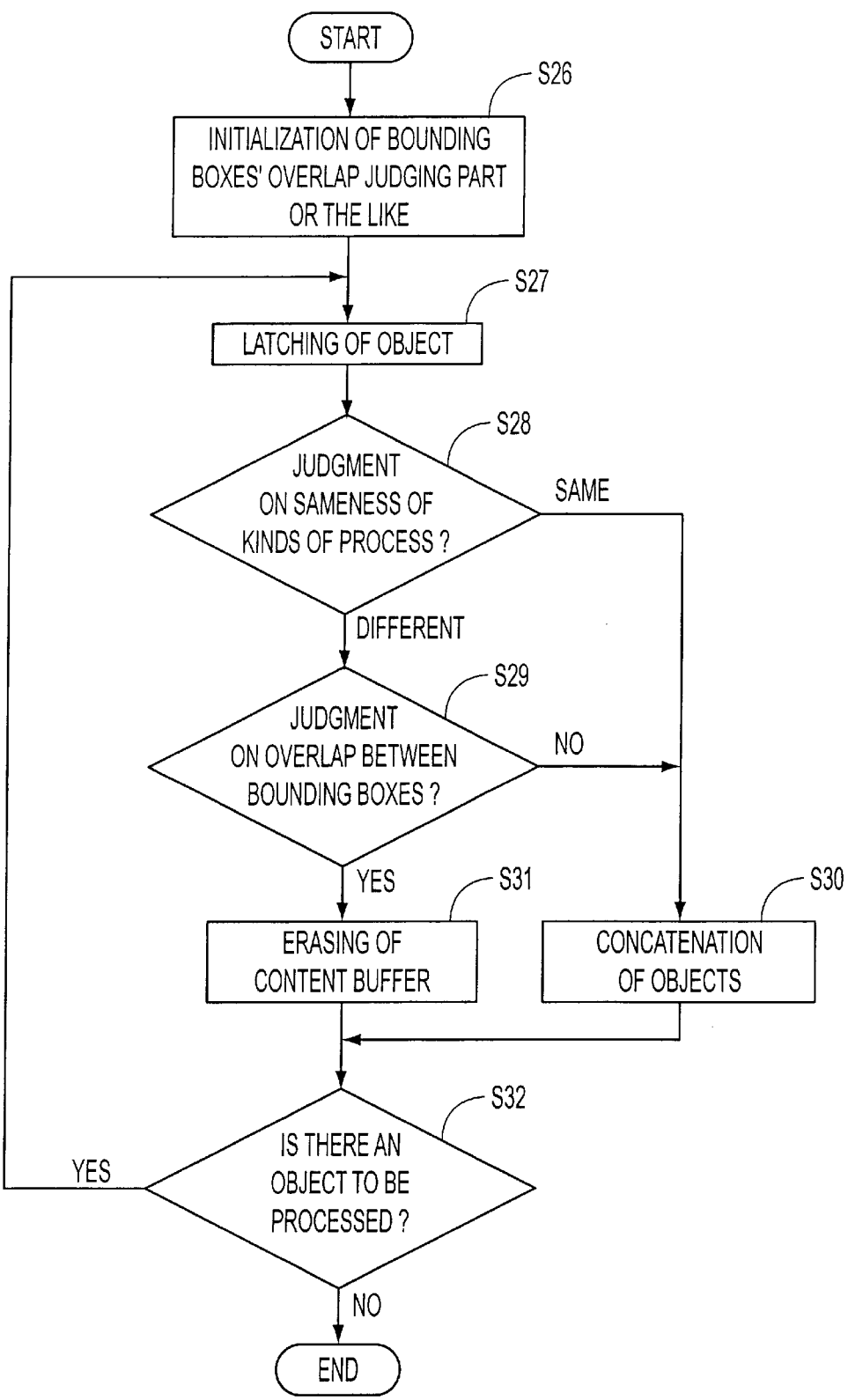
FIG. 42 is a flow chart showing the procedures for optimizing the intermediate data.

The overlap between the bounding boxes is classified into the following 4 states, as shown in FIG. 41, depending on whether the kind of process for the target object and that for the object processed immediately before the target object are the same. That is, the bounding boxes are classified depending on whether the kinds of process indicated by the rasterizing process ID register are the same in each of the cases of: (a) the target bounding box overlapping the set of the bounding boxes; and (b) the target bounding box not overlapping the set of the bounding boxes (see FIGS. 40(a) and 40(b)). The procedures for optimizing the intermediate data executed for each band, namely, the procedures for executing trapezoid data relocation process in each of the divided intermediate data optimizing component 327, are now explained with reference to FIG. 42.

(1) Initialization of the bounding box overlap judging part 3272 or the like (step S26).

The rasterizing process ID register held in the bounding box overlap judging part 3272 is cleared. The bitmap retained in the set of bounding boxes storing part 3274 is cleared. The buffers in the output buffer 3273 corresponding to each rasterizing process ID are cleared.

(2) Latching of objects (step S27).

The latching part 3271 retains the object for each band transferred from the band number identifying component 326. The retained object is the target object.

(3) Judgment on the sameness of the kinds of process (step S28).

The bounding boxes overlap judging part 3272 makes a judgment on the sameness between the kind of process for the target object retained in the latching part 3271 and the kind of process for the object processed immediately before the target object. In other words, the sameness between the rasterizing process ID of the target object and that retained in the rasterizing process ID register is judged.

If the kinds of process are same, the value of the rasterizing process ID register is updated with the rasterizing process ID of the target object, and the process proceeds to step S30. On the other hand, if the kinds of process are different from each other, the value of the rasterizing process ID register is updated with the rasterizing process ID of the target object, and the process proceeds to step S29.

Figure 43A:
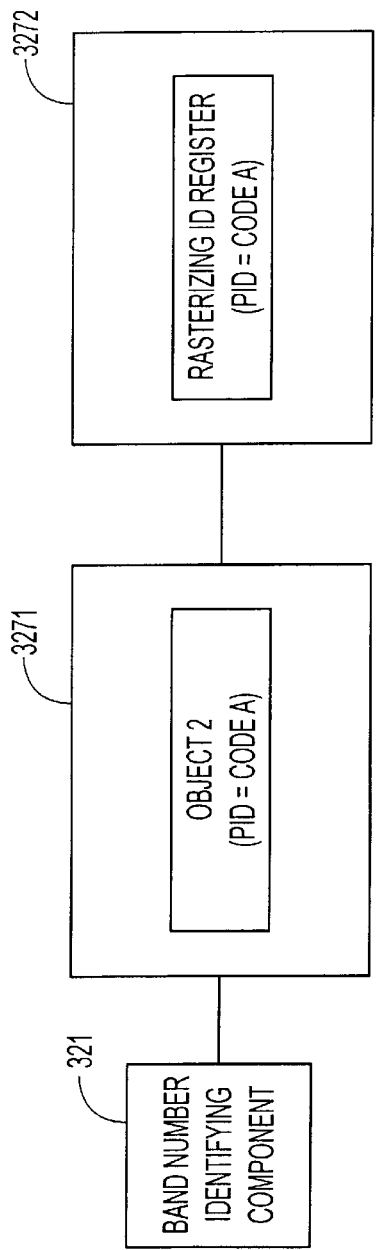
FIGS. 43(a) and 43(b) show the states of a latching part and a bounding box overlap judging part in the cases of the same process types and different process types, respectively.
Figure 43B:
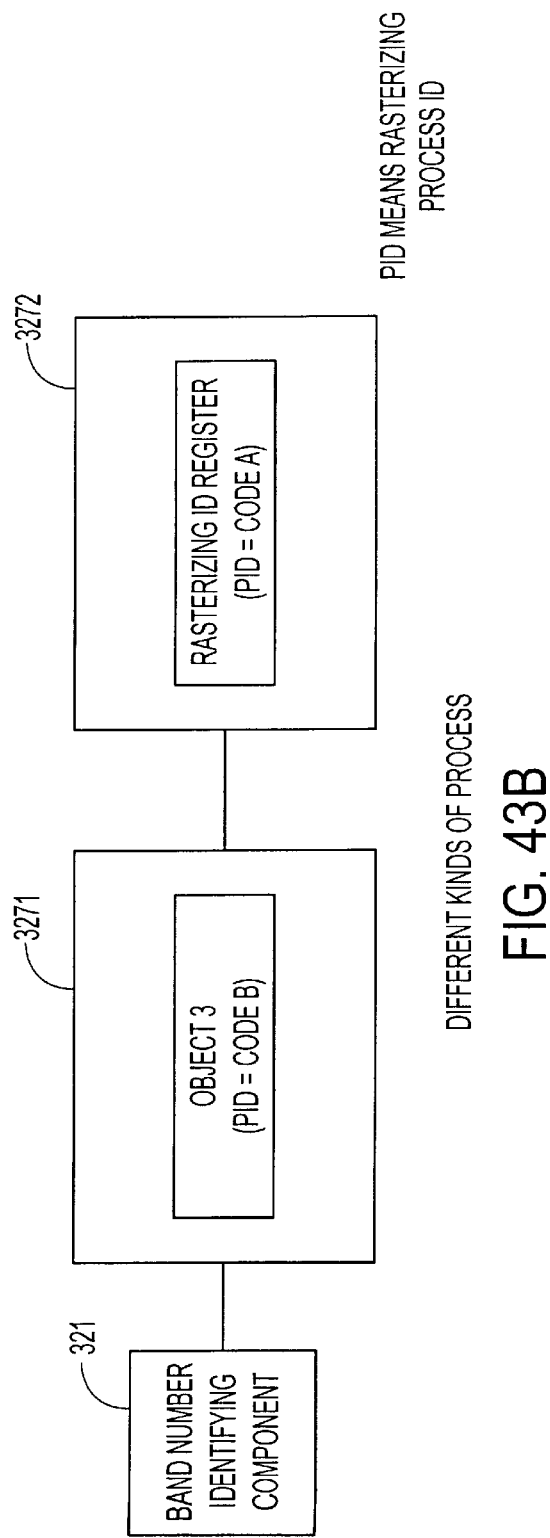

FIGS. 43(a) and 43(b) show the states of the latching part 3271 and the rasterizing process ID register of the bounding box overlap judging part 3272 in judging the sameness of the kinds of process. For example, if object 1 whose rasterizing process ID is Code A, object 2 whose rasterizing process ID is also Code A and object 3 whose rasterizing process ID is Code B, are retained in the latching part 3271 in that order, and object 2 is the target object, the value of the rasterizing process ID register is Code A. Thus, the kinds of process are judged to be the same. If object 3 is the target object, the value of the rasterizing process ID register is Code B and the kinds of process are judged to be different from each other.

If the process is to be executed for the first object retained in the latching part 3271, the value of the rasterizing process ID register is updated with the rasterizing process ID of the target object because the rasterizing process ID register has been cleared. The process then proceeds to step S30.

(4) Judgment on overlap between the bounding boxes (step S29).

The bounding box overlap judging part 3272 makes a judgment about the overlap between the target bounding box and the set of bounding boxes retained in the set of bounding boxes storing part 3274 by operating logical AND on them.

In the case where the target bounding box overlaps the set of bounding boxes (a), the process proceeds to step S31. In contrast, in the case where the target bounding box does not overlap the set of bounding boxes (b), the process proceeds to step S30.

(5) Object concatenating process (step S30).

The operation of the logical OR of the bitmap data corresponding to the target bounding box and the bitmap data retained in the set of bounding boxes storing part 3274 is executed and the bitmap in the set of bounding boxes storing part 3274 is updated with the result of the operation. A target object is added to the output buffer 3273 corresponding to the rasterizing process ID. Then the process proceeds to step S32.

Figure 44A:
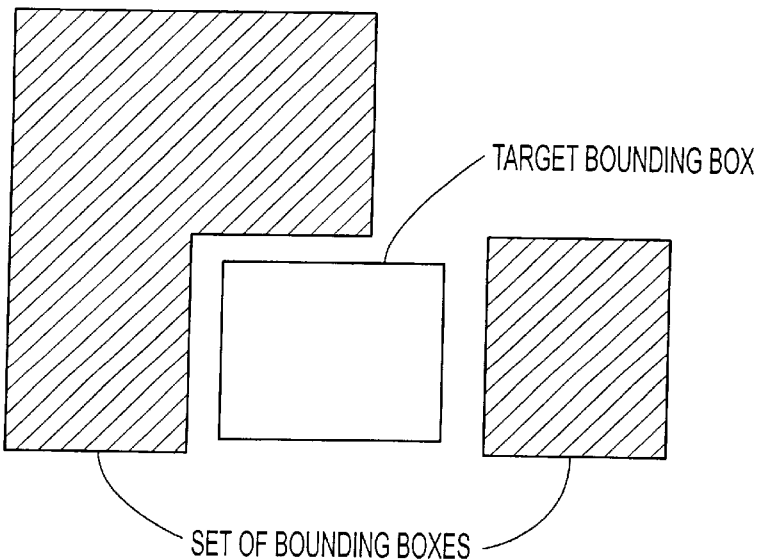
FIGS. 44(a) and 44(b) show the states of a bitmap updating process in a set of bounding boxes storing part before and after execution of the process, respectively.
Figure 44B:
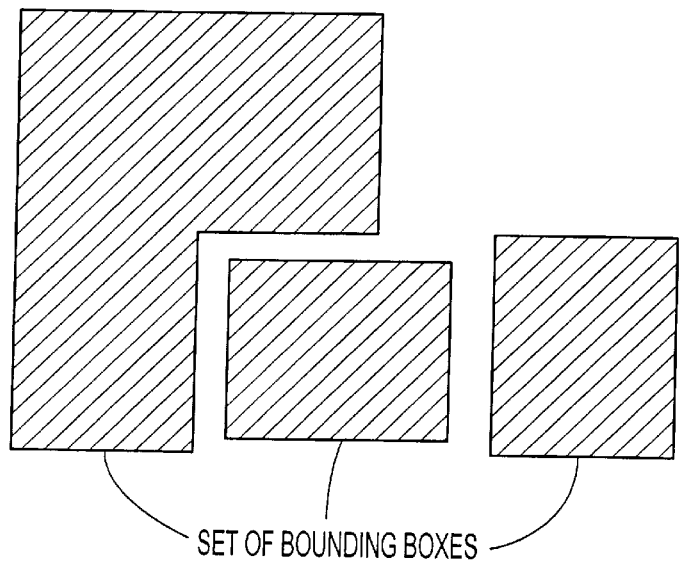

For example, FIGS. 44(a) and 44(b) show the process of updating the bitmap in the set of bounding boxes storing part 3274. For the target bounding box, the logical OR with the set of bounding boxes is operated, and the bitmap is updated based thereon. In the case where object 2, which does not overlap any bounding box, is retained in the latching part 3271 succeeding object 1, object 2 is concatenated with object 1 according to FIFO as shown in FIG. 39.

(6) Buffer flushing process (step S31).

The bitmap retained in the set of bounding boxes storing part 3274 is cleared. The objects retained in the buffer corresponding to each rasterizing process ID in the output buffer 3273 are transferred to the intermediate data storing element 33 in a predetermined order. The process then proceeds to step S32.

(7) Examination whether there is any object to be processed or not (step S32).

The latching part 3271 examines whether there is any object to be processed by determining whether the object transferred from the band number identifying component 326 is EOD, indicating the end of the objects for each band. If there is another object to be processed, the process proceeds to step S27. If there is not, the process is completed.

If the rasterizing unit 4 is capable of processing multiple pieces of configuration data which are the same or different, in parallel, i.e., simultaneously, it is possible to construct the divided intermediate data optimizing component 327 as follows.

First, as shown in FIG. 45, the set of bounding boxes storing part 3274 is constructed to retain the coordinates of the apexes of the bounding boxes in each layer in a list format. Here, a unit of processing of a single object or multiple objects, which are distinguished based on overlap between the bounding boxes judged by the bounding box overlap judging part 3272, is referred to as a layer. The objects in each layer do not overlap with one another.

Figure 46:
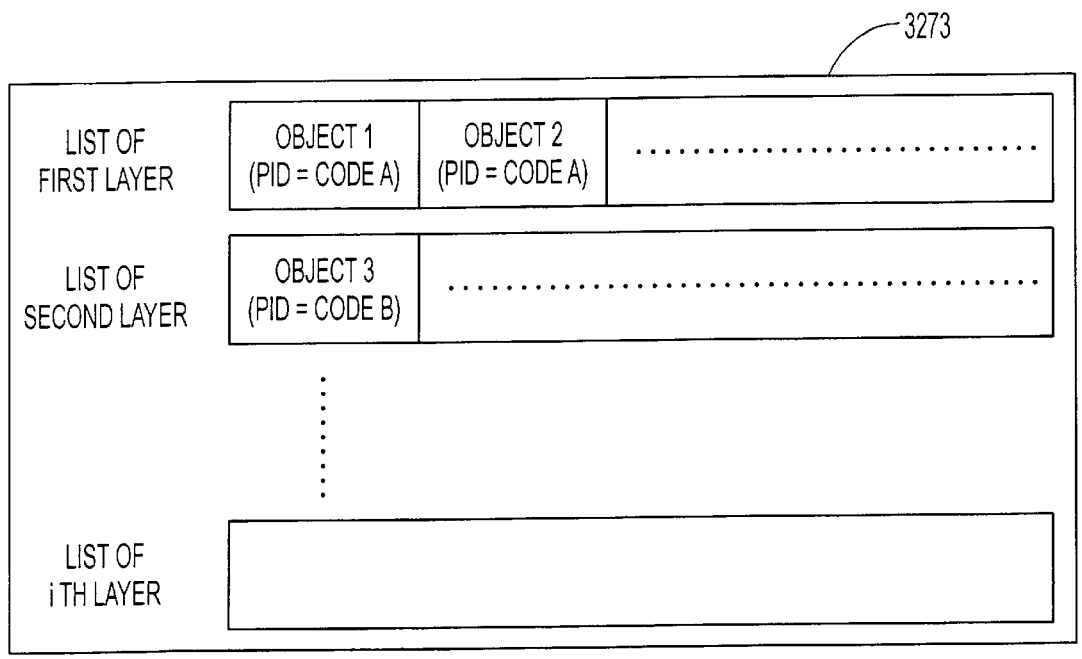
FIG. 46 shows an example of the configuration of an output buffer.
Figure 47:
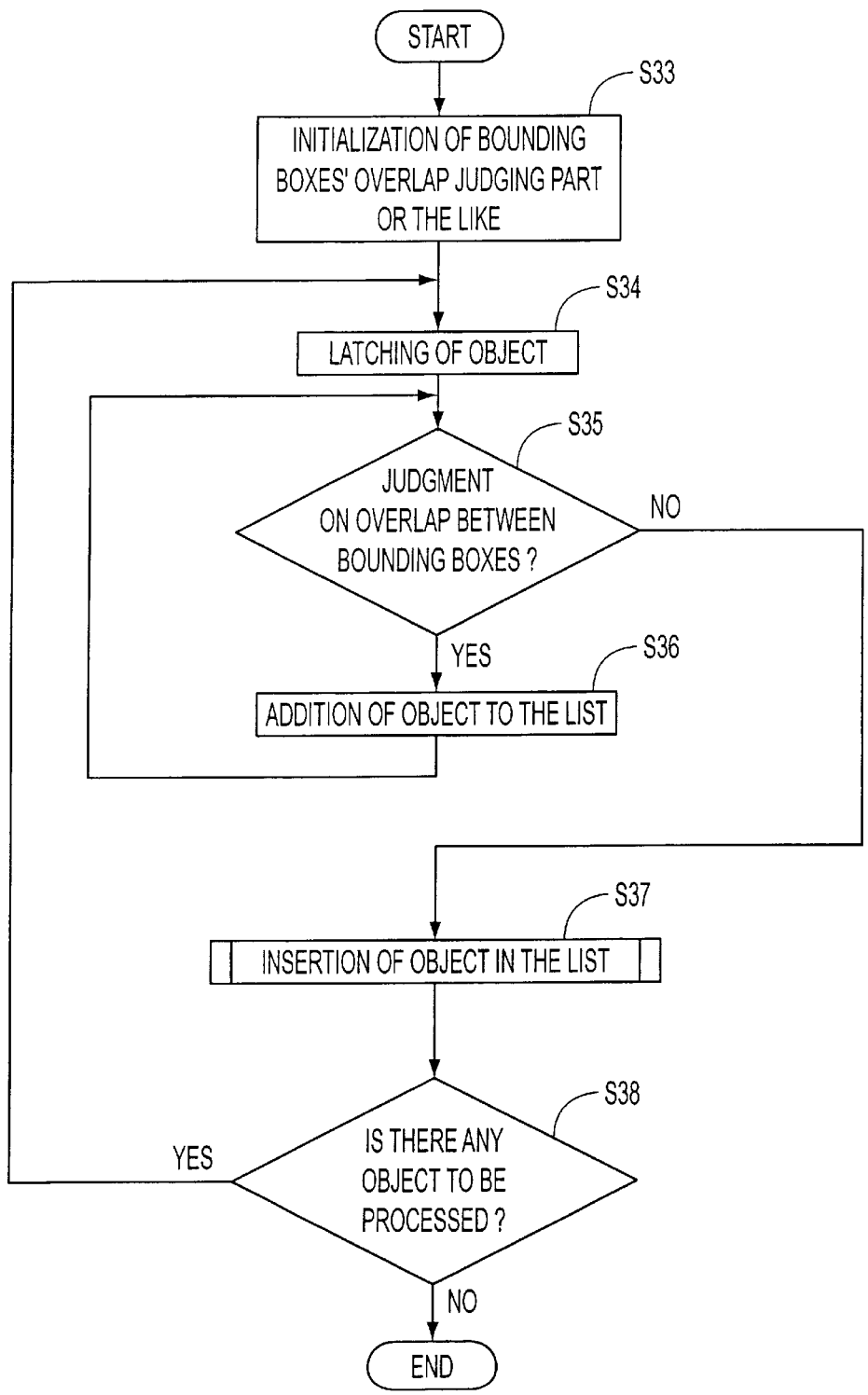
FIG. 47 is a flow chart showing the procedures of a second optimization process for the intermediate data.

As shown in FIG. 46, the output buffer 3273 is constructed to retain the objects, to which the layer numbers are added, in a list format. The data pieces of the layer numbers are deleted when the objects are transferred from the output buffer 3273 to the intermediate data storing element 33. Here, the rasterizing process ID register is unnecessary for the bounding box overlap judging part 3272. The bounding box overlap judging part 3272 has a register of total number of layers for retaining the value of the total number of layers, a current layer register for retaining the value of the layer number under processing and a bounding box register for retaining the last piece of data in the list of the apex coordinates of the bounding boxes in each layer held in the set of bounding box storing part 3274. The arrangement of the objects is optimized according to the procedures shown in FIG. 47.

(1) Initialization of the bounding box overlap judging part 3272 or the like (step S33).

It is assumed that the values of the register of total number of layers and the current layer register are 0. The bounding box register, the set of the bounding boxes storing part 3274 and the output buffer 3273 are cleared.

(2) Latching of the objects (step S34).

The latching part 3271 retains objects for each band transferred from the band number identifying component 326. The retained objects are the target objects.

(3) Judgment on overlap between the bounding boxes (step S35).

The bounding box overlap judging part 3272 judges whether the bounding box of the target object, retained in the latching part 3271, overlaps the bounding box retained in the bounding box register. If it overlaps, the process proceeds to step S36. In contrast, if it does not overlap, the process proceeds to step S37.

Figure 48A:
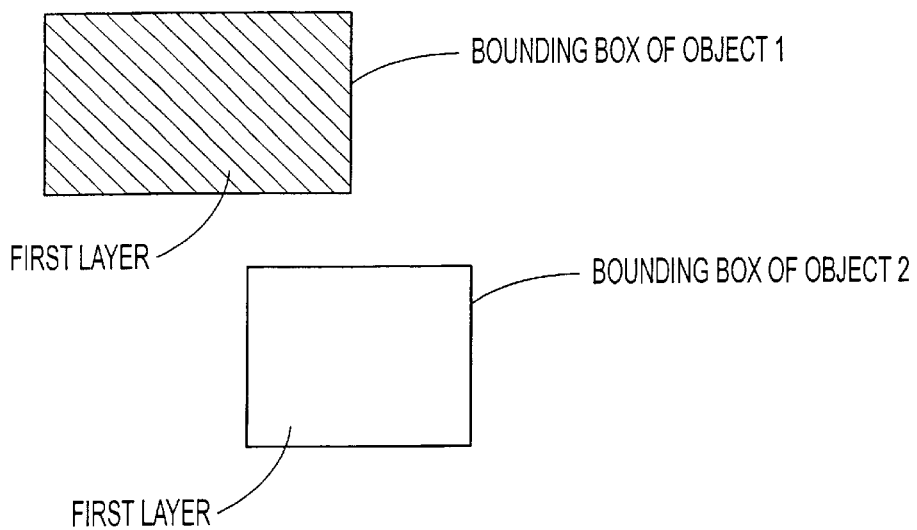
FIGS. 48(*a*) and 48(*b*) show the states of a layer in the case where the bounding boxes do not overlap and the case where the bounding boxes overlap each other, respectively.
Figure 48B:
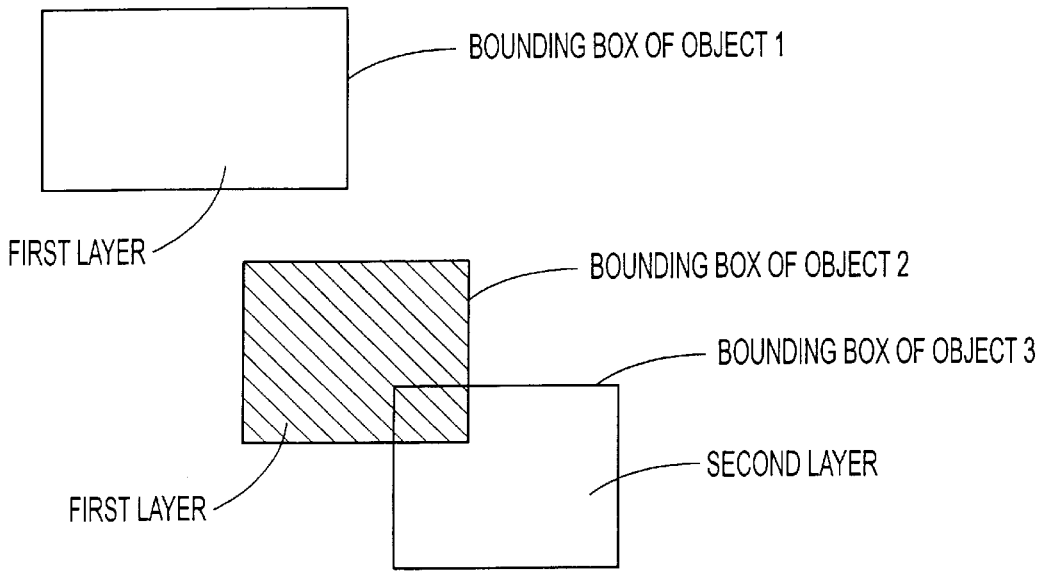

FIGS. 48(*a*) and 48(*b*) show the states of the layers related to overlap between the bounding boxes. For example, in the case where object 1, object 2 and object 3 are retained in the latching part 3271 in that order, and further, if the bounding box of object 1 does not overlap the bounding box of object 2, they are in the same layer. Here, object 1 and object 2 belong to the first layer. If the bounding box of object 2 overlaps the bounding box of object 3, object 3 belongs to a different layer from the layer to which object 2 belongs. Here, object 3 belongs to the second layer.

(4) Addition of an object to the list (step S36).

The value retained in the register of total number of layers is incremented. The bounding box of the target object is added to the list data in the set of bounding boxes storing part 3274 as the last piece of data. The piece of the bounding box data is made to be the content of the bounding box register. A value retained in the register of total number of layers is assigned to the target object as the layer number and the target object is added to the list data in the output buffer 3273 as the last piece of the data.

Figure 49A:
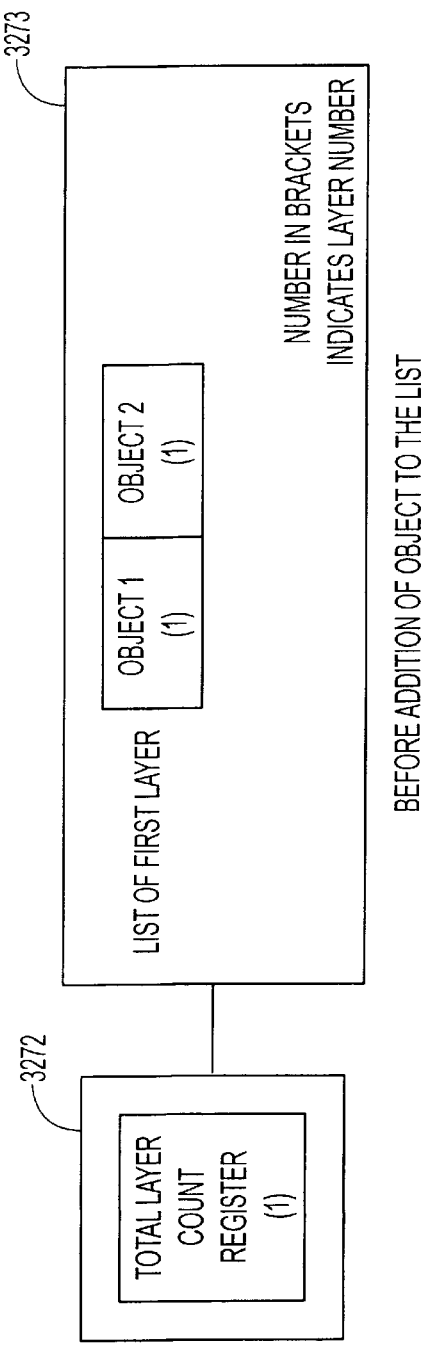
FIGS. 49(*a*) and 49(*b*) show the states of a list of objects before and after addition of an object to the list, respectively.
Figure 49B:
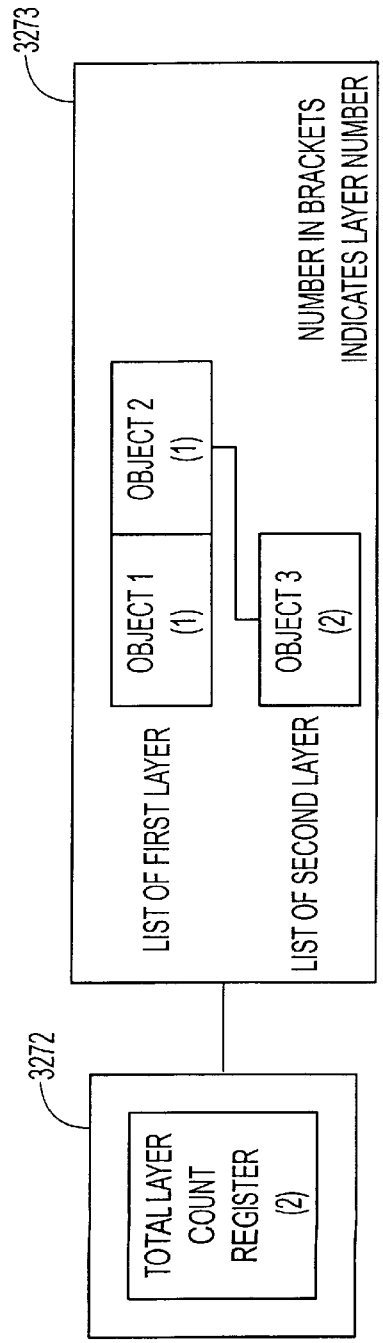

FIGS. 49(*a*) and 49(*b*) show the states before and after the addition of the target object to the list data in the output buffer 3273. The register of total number of layers is incremented from 1 to 2, and object 3, which is the target object, is added to follow object 2. At this time, the layer number 2 is assigned to object 3.

(5) Process of inserting the object in the list (step S37).

Figure 50:
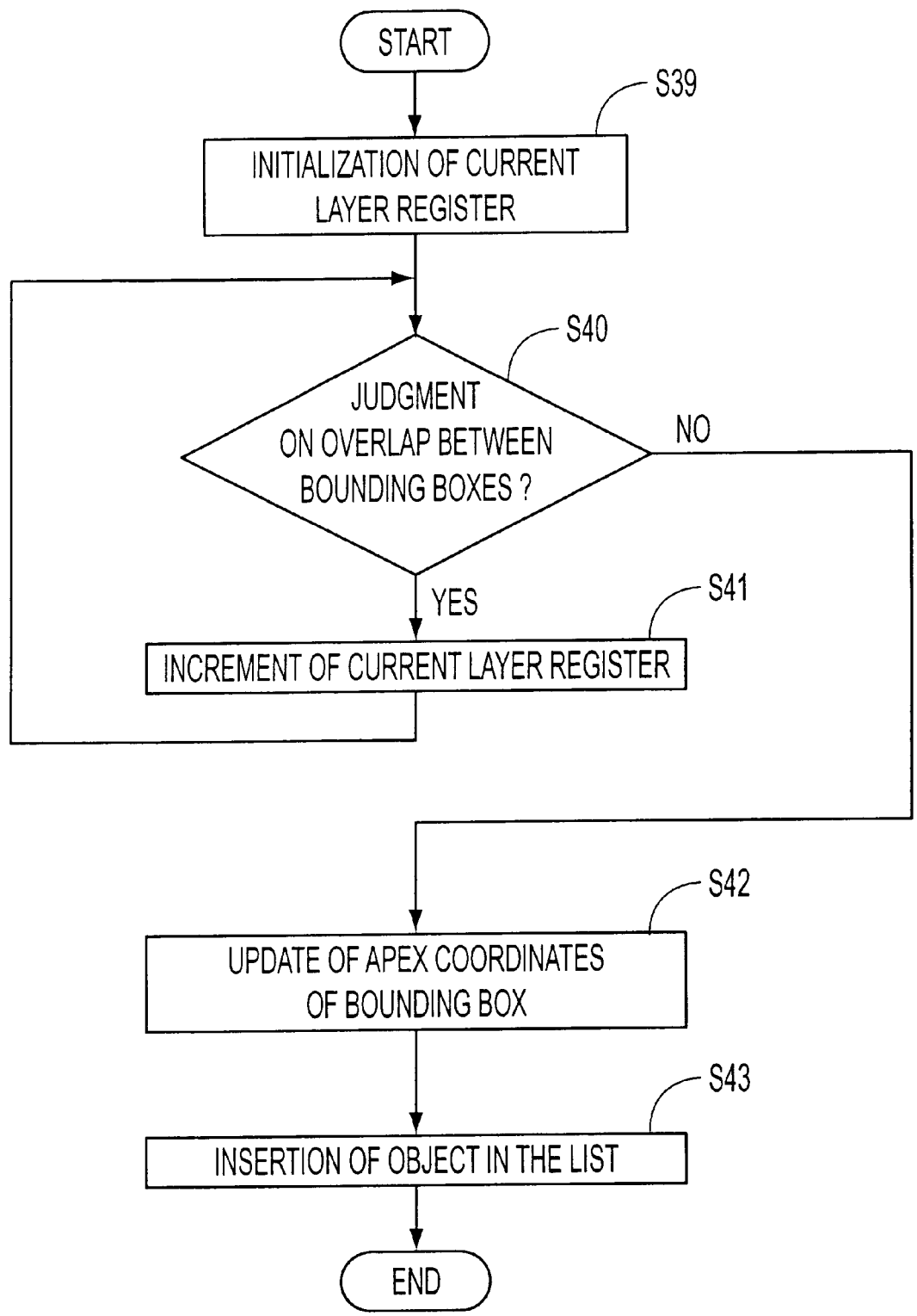
FIG. 50 is a flow chart showing the procedures of a process of inserting an object in the list shown in FIG. 47.

FIG. 50 shows the detailed procedures of inserting an object in the list (step S37).

(5.1) Initialization of the current layer register (step S39).

The value of the current layer register is set to 1.

(5.2) Judgment on overlap between the bounding boxes (step S40).

The bounding box overlap judging part 3272 judges the overlap between the bounding box of the target object and the bounding box retained in the set of bounding boxes storing part 3274 and corresponding to the layer number retained in the current layer register. If there is any overlap, the process proceeds to step S41. If there is no overlap, the process proceeds to step S42.

(5.3) Increment of the current layer register (step S41).

The bounding box overlap judging part 3272 increments the value retained by the current layer register and the process proceeds to step S40.

(5.4) Update of apex coordinates of the bounding box (step S42).

Figure 51A:
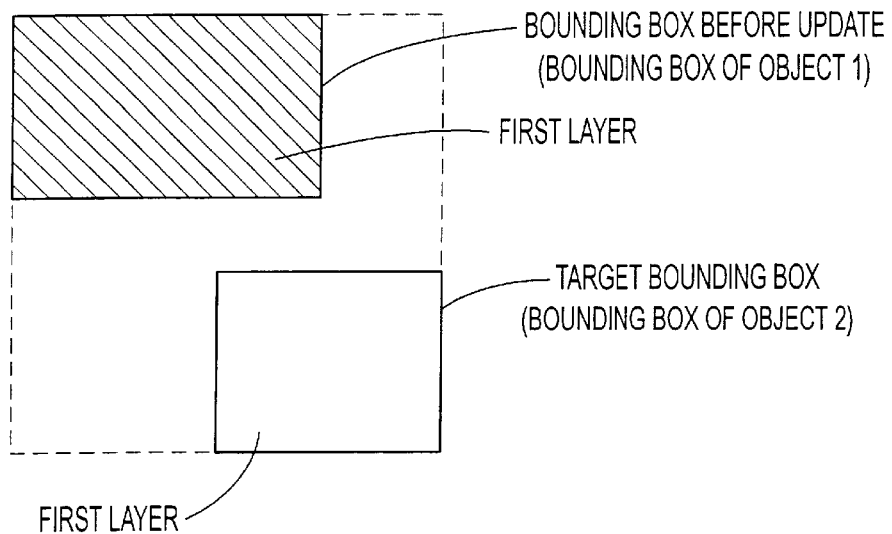
FIGS. 51(*a*) and 51(*b*) show the states of coordinates of apexes of the bounding box before and after updating, respectively.
Figure 51B:
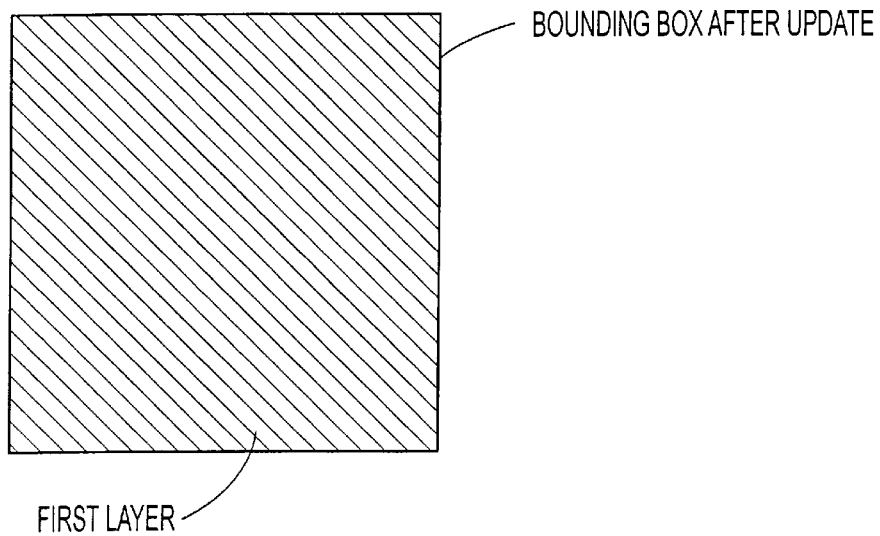

The bounding box overlap judging part 3272 updates the coordinates of the apexes of the bounding box retained in the set of bounding boxes storing part 3274 corresponding to the layer number retained in the current layer register by utilizing the bounding box of the target object. FIGS. 51(*a*) and 51(*b*) show the states before and after the update of the apex coordinates of the bounding box. For example, if object 2, whose bounding box does not overlap the bounding box of object 1, is retained subsequent to object 1 by the latching part 3271, the value of the current layer register is 1. Here, if the apex coordinates of the bounding box corresponding to the first layer retained in the set of bounding boxes storing part 3274 (the hatched rectangle in FIG. 51(*a*)) are the coordinates of the bounding box of object 1, a bounding box (the rectangle drawn by a broken line) containing the target bounding box, i.e., the bounding box of object 2 (the rectangle drawn by a solid line ) is operated, and the result of the operation is retained as a bounding box after updating corresponding to the first layer (the hatched rectangle in FIG. 51(*b*)) in the set of bounding boxes storing part 3274.

(5.5) Inserting of the object in the list (step S43).

Figure 52A:
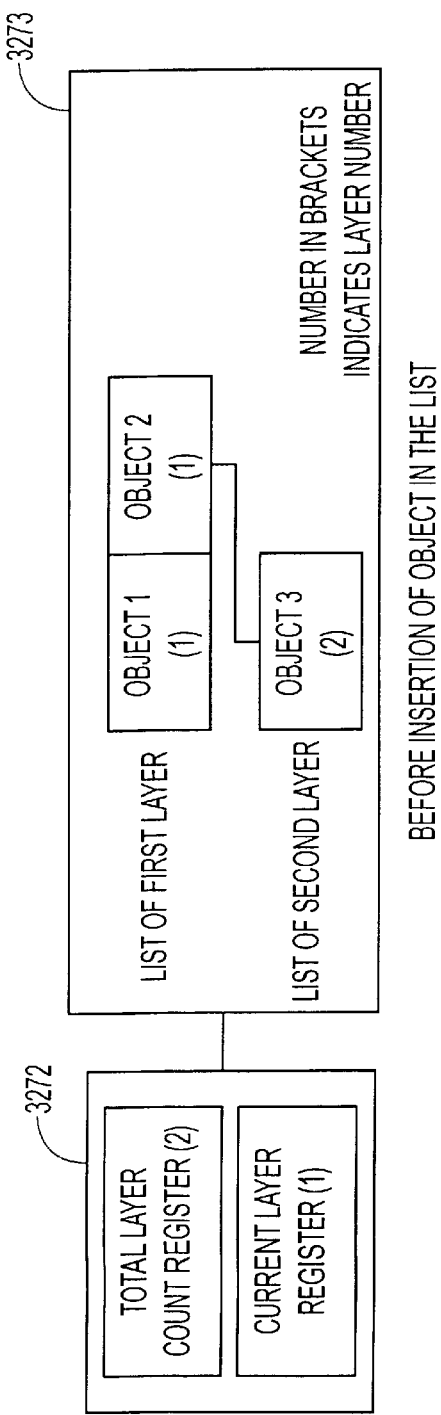
FIGS. 52(*a*) and 52(*b*) show the states of a list of objects before and after inserting an object to the list, respectively.
Figure 52B:
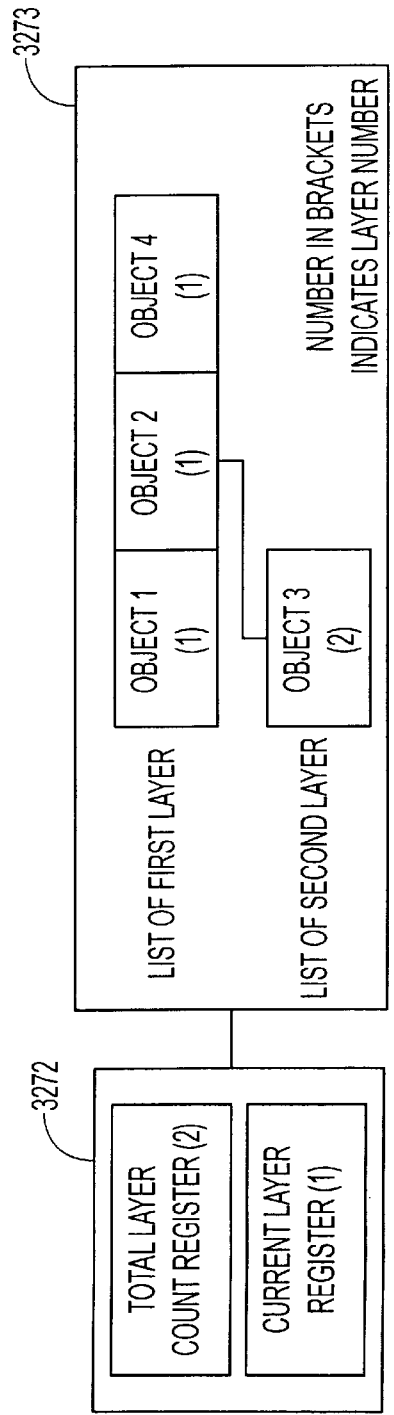

The bounding box overlap judging part 3272 adds the target object, as a last object in the layer corresponding to the layer number retained by the current layer register, to the list of the output buffer 3273. At this time, the layer number is assigned to the object. FIGS. 52(a) and 52(b) show the states before and after inserting the object in the list. If the value of the current layer register is 1, object 4 is inserted after object 2 whose layer number is 1 and before object 3 whose layer number is 2. Here, the layer number 1 is assigned to object 4.

(6) Examination as to whether there is any object to be processed (step S38).

The latching part 3271 examines whether there is any object to be processed by determining whether the object transferred from the band number identifying component 326 is EOD indicating the end of the objects in each band. It there is another object to be processed, the process proceeds to step S34. In contrast, if there are no more objects to be processed, the process is completed. The objects retained in the list format in the output buffer 3273 are transferred to the intermediate data storing element 33 for each layer in a predetermined order and processed in parallel.

Figure 53:
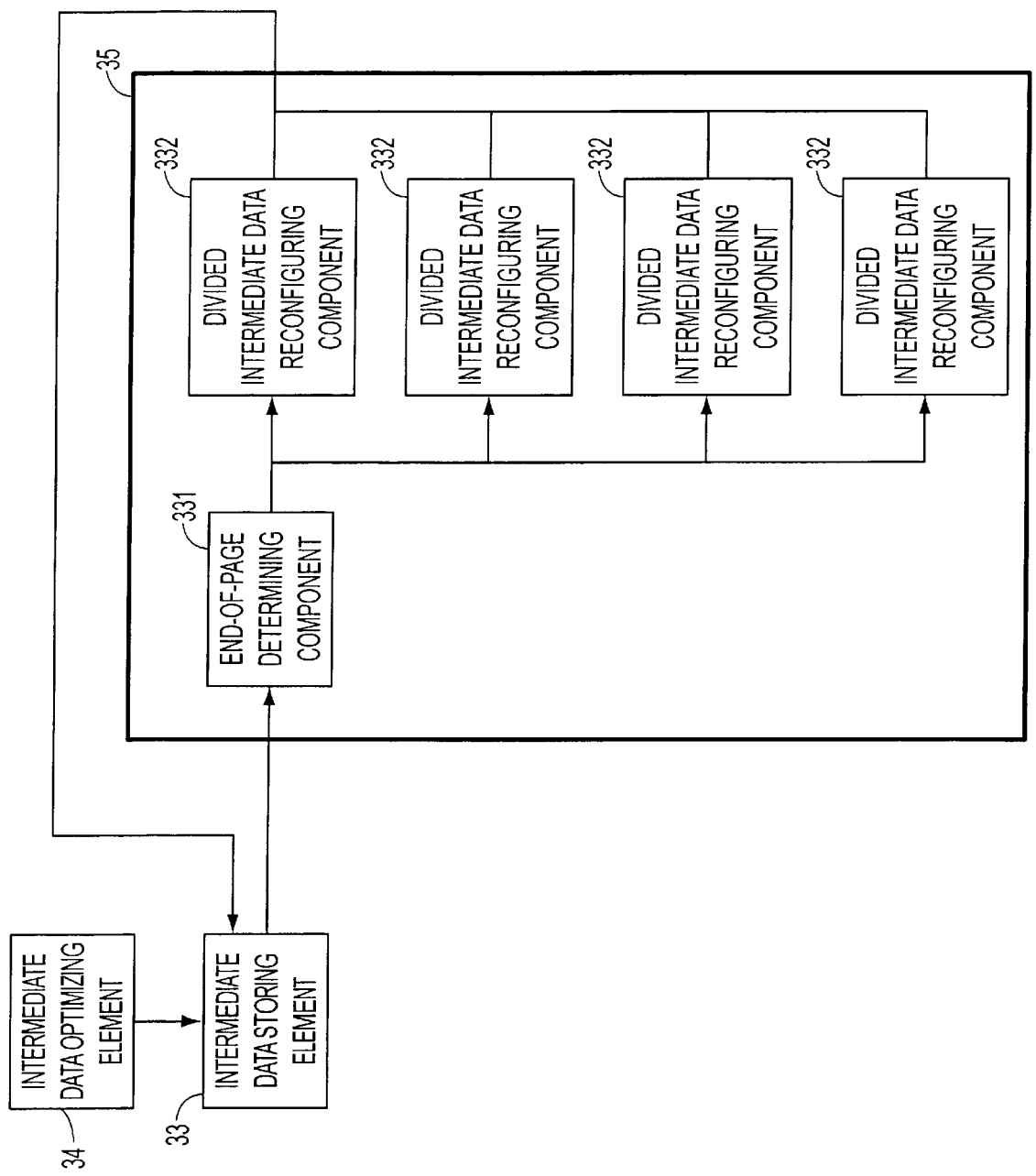
FIG. 53 shows an example of the configuration of an intermediate data reconfiguring element.

The reconfiguration of the intermediate data, i.e., removal of overlap between the pieces of the trapezoid data is performed by the intermediate data reconfiguring element 35 shown in FIG. 53. The intermediate data reconfiguring element 35 has an end-of-page determining component 331 and divided intermediate data reconfiguring components 332 of the number corresponding to the number of bands. FIG. 53 shows an example in which one page is divided into 4 bands, and the 4 divided intermediate data reconfiguring components 332 corresponding to the 4 bands constitute the intermediate data reconfiguring element 35.

Figure 54:
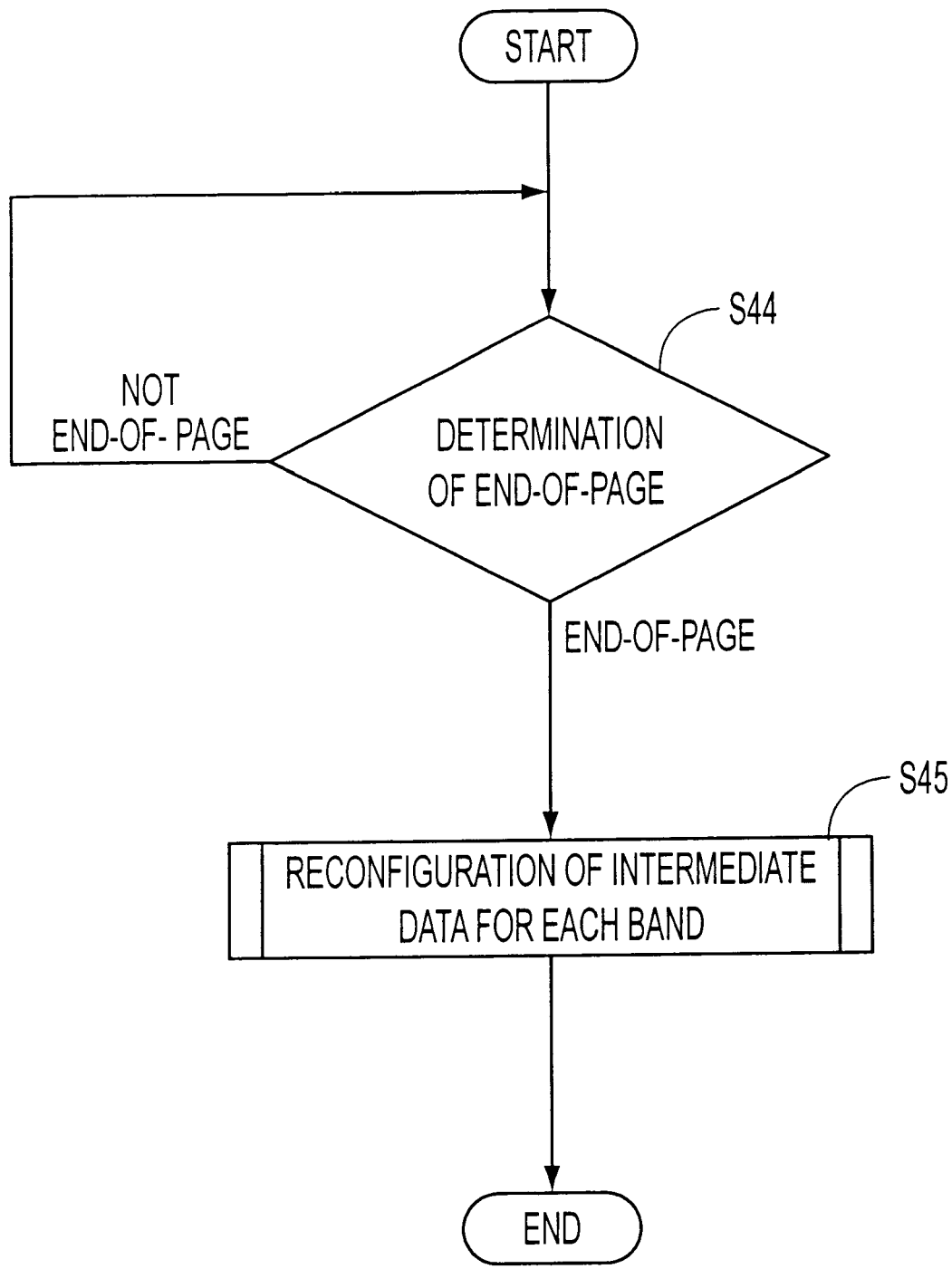
FIG. 54 is a flow chart showing the procedures for a process of reconfiguring the intermediate data.

FIG. 54 shows the process of the intermediate data reconfiguration. First, the end-of-page determining component 331 determines the end-of-page by determining whether the intermediate data optimizing element 34 has transferred the data for one page to the intermediate data storing element 33 based on, for example, whether all latching parts 3271 in the intermediate data optimizing element 34 retain EOD indicating the end of the objects to be processed in each band. The intermediate data optimizing element 34 instructs the start of operation of all divided intermediate data reconfiguring elements 332 (step S44). The divided intermediate data reconfiguring components 332 reconfigure the intermediate data corresponding to each band from the intermediate data storing element 33, and transfer the results to the part of the intermediate data storing element 33 corresponding to each band (step S45). The configuration of the divided intermediate data reconfiguring component 332 and procedures of step S35 are described in detail as follows.

Figure 55:
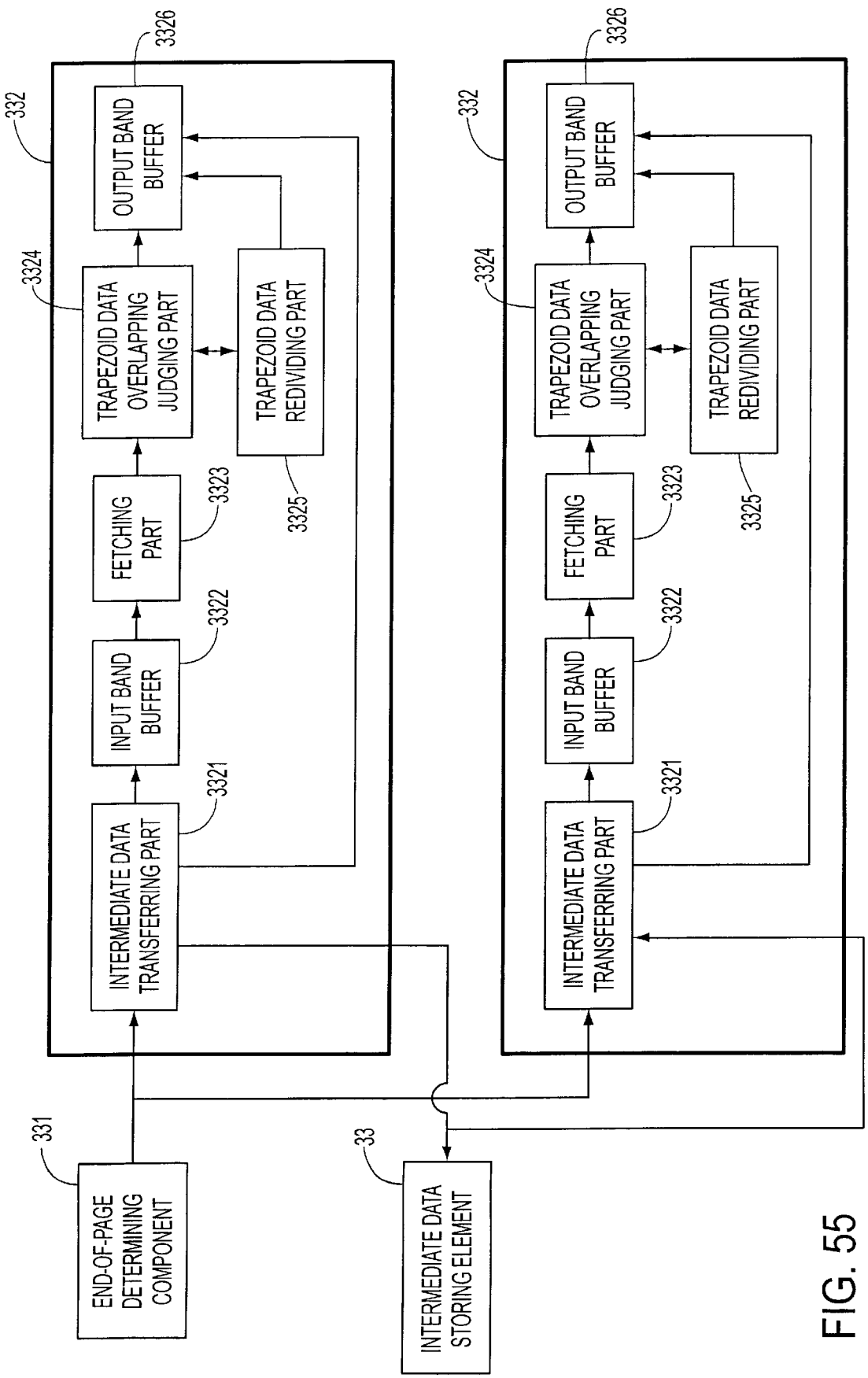
FIG. 55 shows an example of the configuration of a divided intermediate data reconfiguring component.
Figure 56:
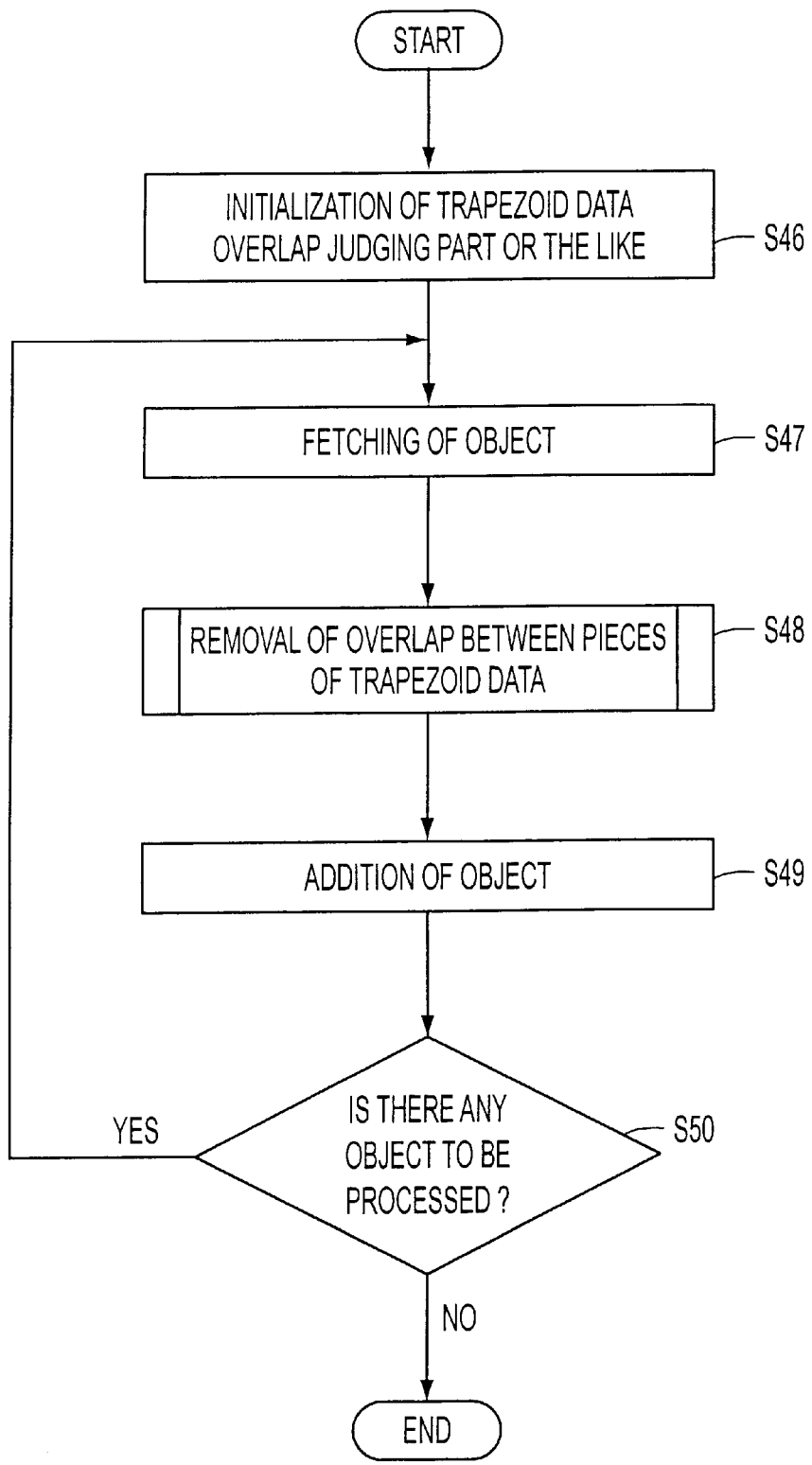
FIG. 56 is a flow chart showing the procedures for the process of reconfiguring the intermediate data for each band.

FIG. 55 shows an example of a configuration of the divided intermediate data reconfiguring component 332. The divided intermediate data reconfiguring component 332 includes an intermediate data transferring part 3321, an input band buffer 3322, a fetching part 3323, a trapezoid data overlap judging part 3324, a trapezoid data re-dividing part 3325 and an output band buffer 3326. The intermediate data transferring part 3321 transfers the intermediate data from the intermediate data storing element 33 to the input band buffer 3322 and also transfers the reconfigured intermediate data from the output band buffer 3326 to the intermediate data storing element 33. The input band buffer 3322 is the so-called FIFO band buffer that retains the objects which are the intermediate data pieces. The fetching part 3323 transfers the objects retained by the input band buffer 3322 to the trapezoid data overlap judging part 3324. The trapezoid data overlap judging part 3324 judges overlap between the trapezoid data pieces of each object according to the procedures descried later. The trapezoid data overlap judging part 3324 has an index retaining register Reg CUR for indicating the position of the object in the output band buffer 3326. The trapezoid data re-dividing part 3325 re-divides the trapezoid data so that there may be no overlap between all the trapezoid data pieces of the objects retained in the output band buffer 3326 and the trapezoid data pieces of the objects transferred to the trapezoid data overlap judging part 3324 by the fetching part 3323. The output band buffer 3326 retains the objects that have no overlap between their trapezoid data pieces. In the output band buffer 3326, the object is retained in the form of a list clearly showing the last item. Reconfiguration of the intermediate data for each band is executed according to the following procedures as shown in FIG. 56.

(1) Initialization of the trapezoid data overlap judging part 3324 or the like (step S46).

The intermediate data transferring part 3321 transfers the piece of the intermediate data corresponding to each band from the intermediate data storing element 33 to the input band buffer 3322. The output band buffer 3326 is cleared.

(2) Fetching of object (step S47).

The fetching part 3323 transfers an object from the input band buffer 3322 to the trapezoid data overlap judging part 3324. The object is the target object.

(3) Removal of overlap between the pieces of the trapezoid data (step S48).

Figure 57:
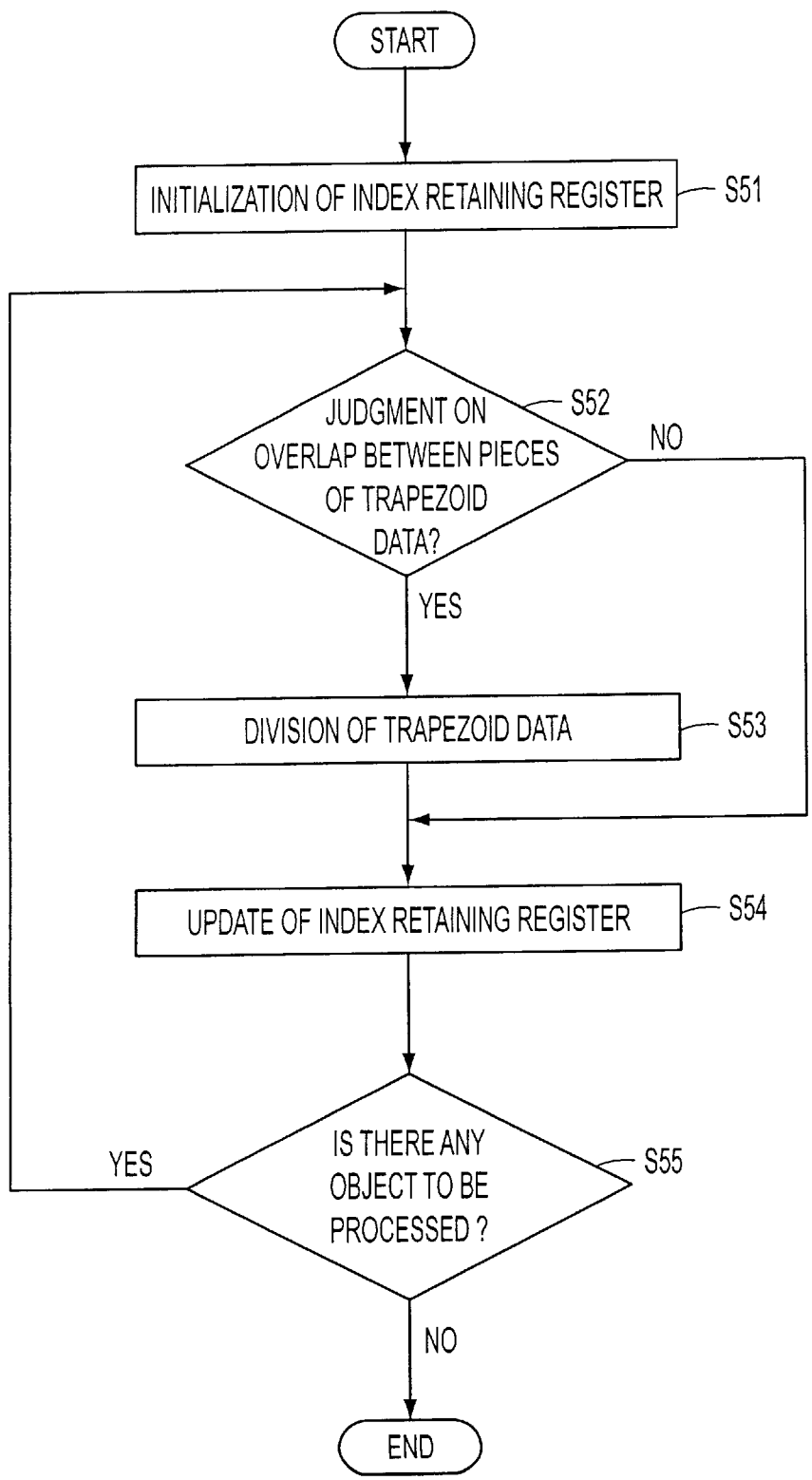
FIG. 57 is a flow chart showing the procedures for a process of removing overlap between pieces of the trapezoid data.

FIG. 57 shows the detailed procedures of removing overlap between the trapezoid data pieces.

(3.1) Initialization of the index retaining register (step S51)

The content of the index retaining register Reg CUR is regarded as an index indicating the position of the leading object in the output band buffer 3326.

(3.2) Judgment on overlap between the pieces of the trapezoid data (step S52).

For all pieces of the trapezoid data constituting the target object, the trapezoid data overlap judging part 3324 determines whether there is any overlap with all the trapezoid data pieces constituting the objects retained in the output band buffer 3326. If there is any overlap, the process proceeds to step S53. Otherwise, the process proceeds to step S54.

(3.3) Division of the trapezoid data (step S53).

Figure 58A:
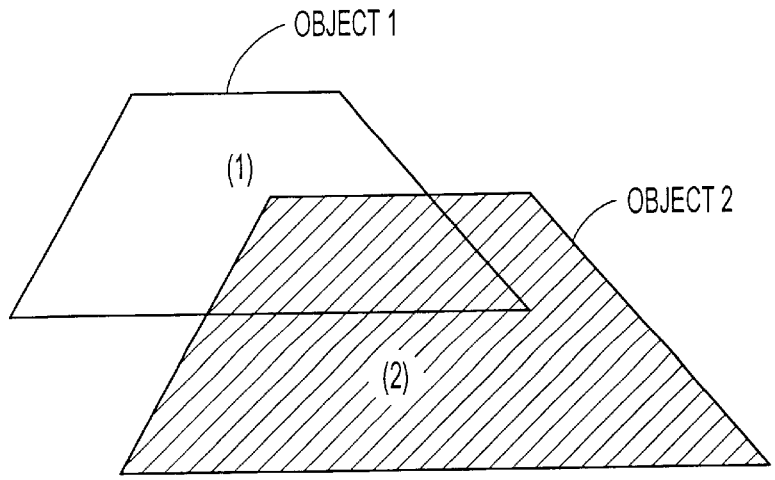
FIGS. 58(*a*) and 58(*b*) show the states of pieces of trapezoid data before and after the process of removing overlap is executed, respectively.
Figure 58B:
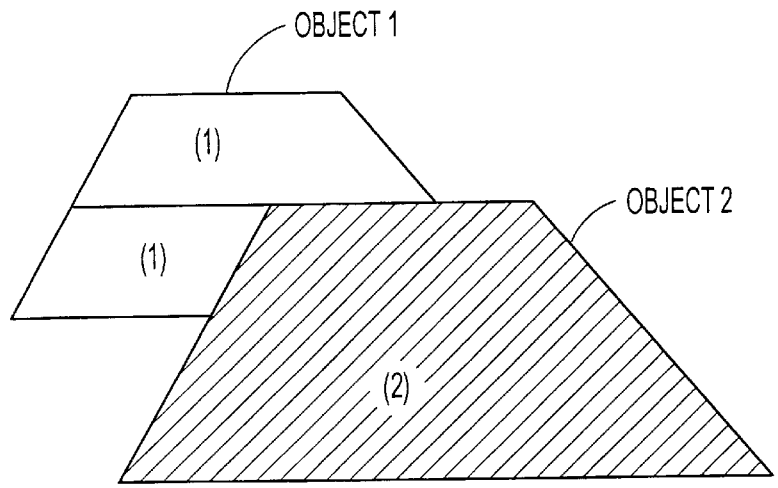

The trapezoid data re-dividing part 3325 further divides the pieces of the trapezoid data retained in the output band buffer 3326, which are determined by the trapezoid overlap determining part 3324 to overlap the pieces of the trapezoid data of the target object, into smaller trapezoid data pieces for removing the trapezoid data pieces corresponding to the overlapping part. FIGS. 58(a) and 58(b) show the states before and after the removal of the overlap of pieces of the trapezoid data. If it is assumed that the target object is object 2 which overlaps the trapezoid data of object 1 as shown in FIG. 58(a), the trapezoid data of object 1 is divided and the part of the trapezoid data of object 1 overlapping the trapezoid data of object 2 is removed as shown in FIG. 58(b). Nothing is changed with the trapezoid data of object 2. Thus the overlapping part is removed as if the trapezoid data of the target object were overwritten.

(3.4) Update of the index retaining register (step S54).

The value of the index retaining register Reg CUR is updated to retain an index indicating the position of the subsequent object.

(3.5) Examination as to whether there is any object to be processed (step S55).

The trapezoid data overlap judging part 3324 examines whether there is any object to be processed by determining whether the object indicated by the index retained by the index retaining register Reg CUR is the last object. If there is another object to be processed, the process proceeds to step S52. In contrast, if there is no object to be processed, the process proceeds to step S49.

(4) Addition of the object (step S49).

The object to be processed is added to the output band buffer 3326.

(5) Examination as to whether the there is any object to be processed (step S50).

The fetching part 3323 examines whether there is any object to be processed by determining whether there is any object in the input band buffer 3322. If there is an object to be processed, the process proceeds to step S48. Otherwise, the process is completed.

To reduce the number of times the configuration data is rewritten in the rasterizing unit 4, it is possible to rearrange the intermediate data pieces so that the intermediate data pieces for the same rasterizing process ID successively appear for each band in the intermediate data storing element 33. Alternatively, the output band buffer 3326 in each divided intermediate data reconfiguring component 332 may be constructed as a buffer for each rasterizing process ID, in the same manner as the output buffer 3273 of the intermediate data optimizing element 34, and rearrange the intermediate data pieces in order so that the intermediate data pieces for the same rasterizing process ID successively appear for each band after step S50.

As previously described, steps S46 to S50 can be omitted if the number of times the configuration data is rewritten in a band is less than a predetermined value. More specifically, after executing the optimizing process of the intermediate data and before executing the reconfiguring process of the intermediate data, the number of times the rasterizing process ID of each object in the intermediate data storing element 33 is changed, is counted. If the value is less than a predetermined value, it is possible to omit the reconfiguring process of the intermediate data.

Third Embodiment

Figure 59:
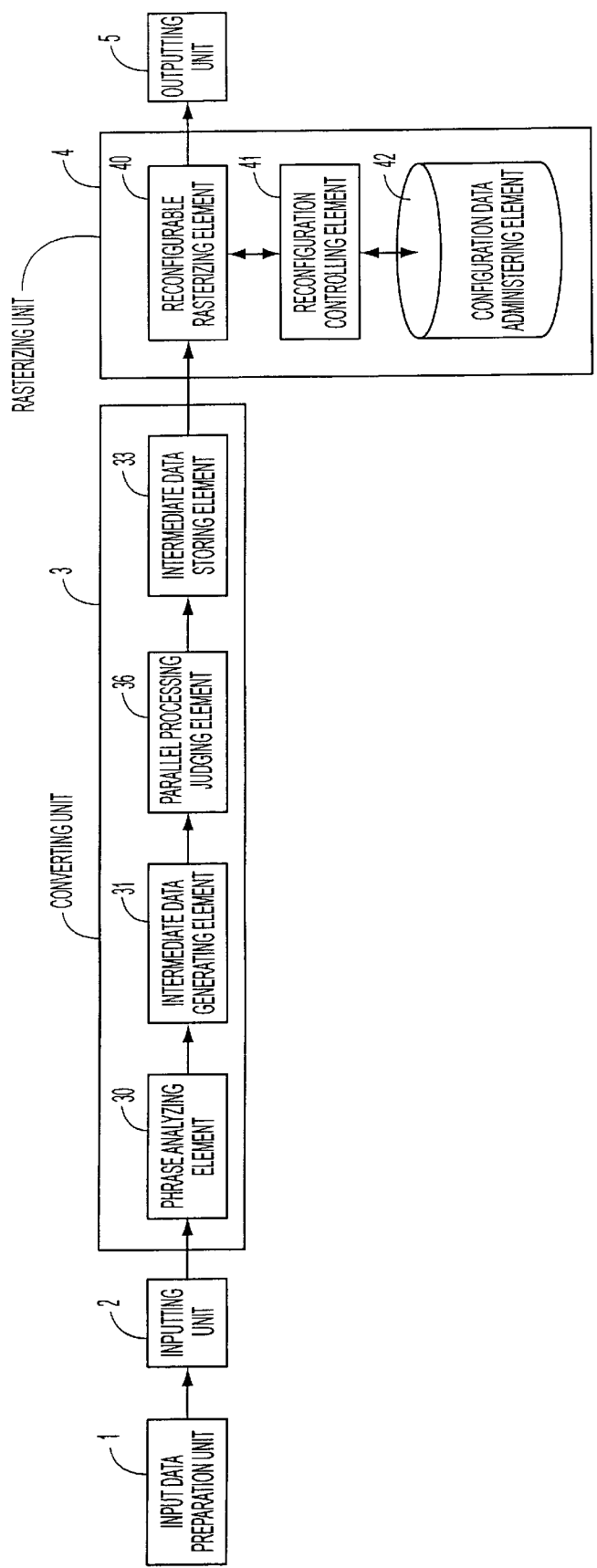
FIG. 59 is a block diagram showing a third embodiment of the print processing apparatus according to the present invention.

FIG. 59 is a block diagram showing the configuration of the third embodiment of the print processing apparatus according to the present invention. As shown in FIG. 59, the print processing apparatus includes an input data preparation unit 1, an inputting unit 2, a converting unit 3, a rasterizing unit 4 and an outputting unit 5. The converting unit 3 further includes a phrase analyzing element 30, an intermediate data generating element 31, a parallel processing judging element 36 and an intermediate data storing element 33. The rasterizing unit 4 further includes a reconfigurable rasterizing element 40, a reconfiguration controlling element 41 and a configuration data administering element 42.

In the above configuration, the input data preparation unit 1, the inputting unit 2, the rasterizing unit 4 and the outputting unit 5 are the same as those of the first embodiment. Therefore, their explanations are omitted.

The converting unit 3 generates the intermediate data which can be rasterized into the dot data in the rasterizing unit 4 from the input data input by the inputting unit 2. The converting unit 3 includes the phrase analyzing element 30, the intermediate data generating element 31, the parallel processing judging element 36 and the intermediate data storing element 33. Among these elements, the phrase analyzing element 30, the intermediate data generating element 31 and the intermediate data storing element 33 are the same as those of the first embodiment. Therefore, their explanations are omitted.

The parallel processing judging element 36 reads the intermediate data pieces output by the intermediate data generating element 31 in order and judges whether there is any overlap between the pieces of data. If it is judged that there is no overlap between the successive pieces of the intermediate data, they are regarded as a group of intermediate data pieces which can be processed in parallel. A hardware configuration ID, which is an identifier of the configuration data processed in parallel and is to be written to the reconfigurable rasterizing element 40 of the rasterizing unit 4, is assigned to the group. The group of intermediate data pieces is output to the intermediate data storing element 33.

Now the flow of the input data in the print processing apparatus with the above configuration will be explained. The input data prepared by the input data preparation unit 1 is input to the phrase analyzing element 30 of the converting unit 3 through the inputting unit 2. The token extracted from the input data in the phrase analyzing element 30 is input to the intermediate data generating element 31. The intermediate data pieces, generated by the intermediate data generating element 31 and divided into the band units, are input to the parallel processing judging element 36 and classified into groups based on the overlap between the intermediate data pieces in which the pieces of the data can be processed in parallel. The groups of intermediate data pieces in band units for one page are stored in the intermediate data storing element 33.

The rasterizing unit 4 and the outputting unit 5 are the same as those of the first embodiment. Therefore, their explanations are omitted.

The main part of the third embodiment of the print processing apparatus will now be described in detail. The parallel processing judging element 36 reads the intermediate data pieces, output by the intermediate data generating element 31, in order and judges whether there is any overlap between the data pieces. If it is judged that there is no overlap between successive intermediate data pieces, they are regarded as a group of intermediate data pieces which can be processed in parallel. A hardware configuration ID, which is an identifier of the configuration data processed in parallel and is to be written to the reconfigurable rasterizing element 40 of the rasterizing unit 4, is assigned to the group. The group of intermediate data pieces is output to the intermediate data storing element 33.

Figure 60:
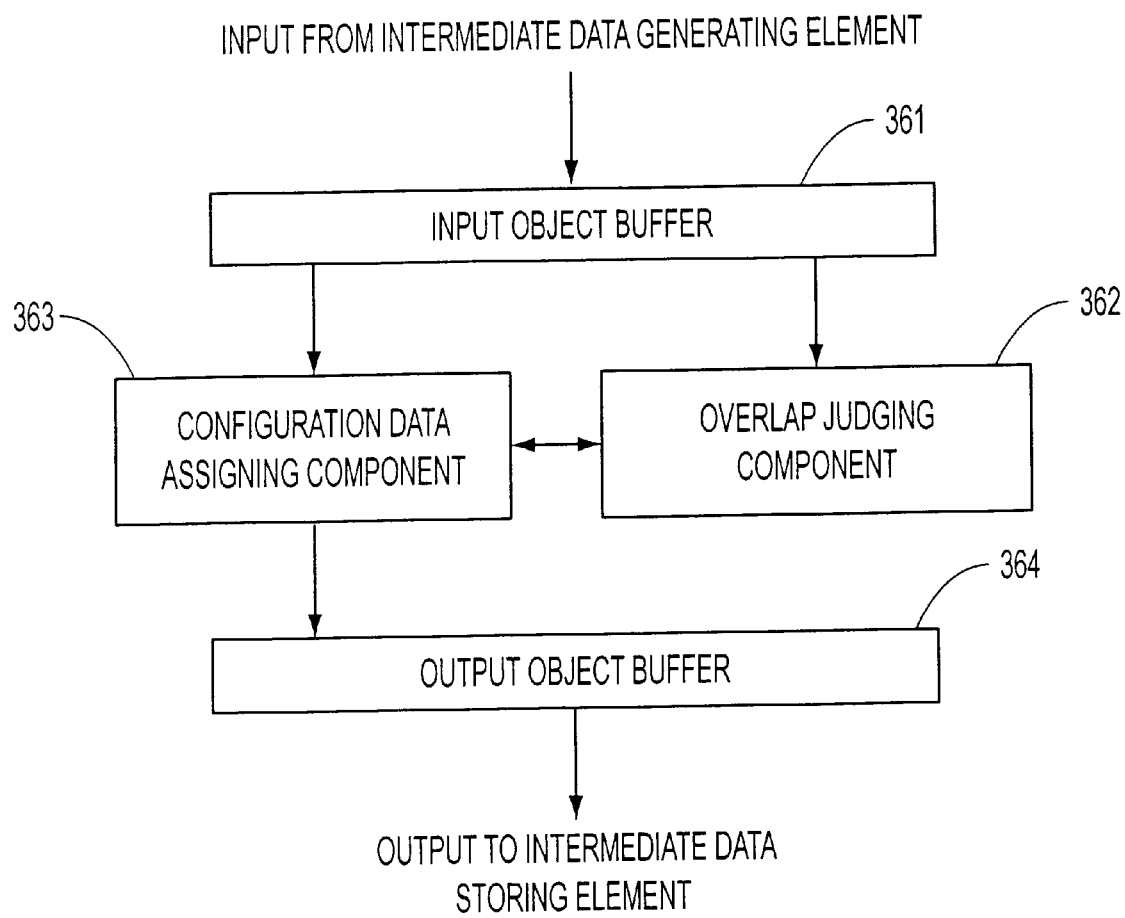
FIG. 60 is a block diagram showing a parallel process judging element.

The output data format in the parallel processing judging element 36 is the same as that of the first embodiment shown in FIG. 10. In FIG. 10, the data configuration of the intermediate data output by the parallel processing judging element 36 is constructed for each group of the objects that can be processed in parallel. The data of each group includes the band ID, the hardware configuration ID, the number of objects, and data pieces of objects belonging to the group. FIG. 60 shows the configuration of the parallel processing judging element 36 wherein the reference numerals 361, 362, 363 and 364 indicate an input object buffer, an overlap judging component, a configuration data assigning component and an output object buffer, respectively.

The input object buffer 361 receives the object data and stores it. The unit for receiving and storing the object data may be one, multiple drawing objects, or a more larger unit such as a band or page, according to the circumstances. For the objects stored in the input object buffer 361, the overlap judging component 362 receives the coordinate value of the bounding box of each of the objects having the same band ID and then judges whether there is any overlap between the objects. Judgment on overlap between the objects means to judge whether there is any overlap between the bounding box corresponding to the band ID of the input object and the bounding box of the input object among the bounding boxes retained for each band by the overlap judging component. Since the process is independent in each band, the explanation of further process is focused on the band corresponding to the band ID of the input object.

At first, there is no bounding box retained in the overlap judging component 362, therefore, the bounding box of the object initially input is regarded as the bounding box retained in the overlap judging component 362. The overlap judgment is conducted from the next object. If it is judged that there is no overlap, the retained bounding box is changed into that of the region as a result of the logical OR operation on itself and the bounding box of the input object. In contrast, if it is judged that there is any overlap, the retained bounding box is replaced with the bounding box of the input object. The overlap judgment is conducted by using the bottom left coordinates (Idx0, Idy0), the top right coordinates (rux0, ruy0) of the retained bounding box and the bottom left coordinates (Idx1, Idy1) and the top right coordinates (rux1, ruy1) of the input bounding box. It is judged that there is no overlap if the following relation is established:

$$Idx0 > rux1 \text{ or } rux0 < Idx1 \text{ or } Idy0 > ruy1 \text{ or } ruy0 < Idy1 \quad (4)$$

In the case where there is no overlap, the logical OR operation of the bounding boxes is expressed by the following relations:

$$Idx0 = \min (Idx0, Idx1), Idy0 = \min (Idy0, Idy1) \quad (5)$$

$$rux0 = \max (rux0, rux1), ruy0 = \max (ruy0, ruy1) \quad (6)$$

The result of judgment made as described above is transferred to the configuration data assigning component 363 where the result of judgment and the object ID of the input object are checked. In the case where there is no overlap, the input object is added to the output object buffer 364, if the object ID of the input object and the object ID of another object previously input and stored in the output object buffer 364 make a combination which can be processed in parallel in the reconfigurable rasterizing element 40 of the rasterizing unit 4. If it is a combination which cannot be processed in parallel, the configuration data for parallel processing is assigned to the object group previously input and stored in the output object buffer 364 and the objects stored in the output object buffer 364 are transferred to the intermediate data storing element 33. After that the input object is written to the output object buffer 364 and the data of the bounding box of the input object and the band ID is transferred to the overlap judging component 362 to reset the retained bounding box.

If the result of judgment shows that there is an overlap, the configuration data for parallel processing is assigned to the group of objects previously input and stored in the output object buffer 364 and the objects stored in the output object buffer 364 are transferred to the intermediate data storing element 33. Then the input object is written to the output object buffer 364.

The output object buffer 364 receives the object data and stores it. The number of objects stored by receiving the object data can be of a larger unit, such as a band or page, if it is larger than the maximum number of objects which can be processed in parallel in the reconfigurable rasterizing element 40 of the rasterizing unit 4. As described above, the pieces of data output by the parallel processing judging element 36 are transferred to the intermediate data storing element 33 in order.

The processes of the rasterizing unit 4 and those subsequent thereto are the same as those of the first embodiment. Therefore, their explanations are omitted.

Fourth Embodiment

Figure 61:
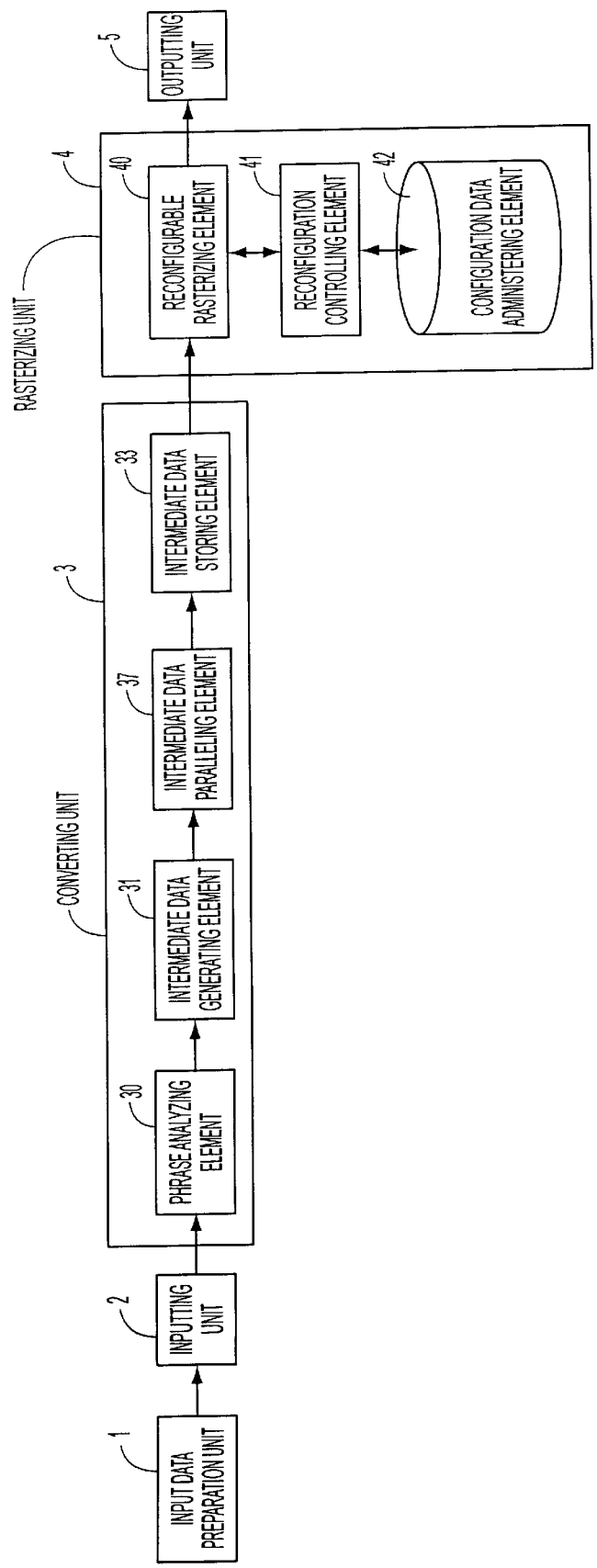
FIG. 61 is a block diagram showing a fourth embodiment of the print processing apparatus according to the present invention.

FIG. 61 is a block diagram showing the configuration of the fourth embodiment of the print processing apparatus according to the present invention. As shown in FIG. 61, the print processing apparatus includes an input data preparation unit 1, an inputting unit 2, a converting unit 3, a rasterizing unit 4 and an outputting unit 5. The converting unit 3 further includes a phrase analyzing element 30, an intermediate data generating element 31, an intermediate data paralleling element 37 and an intermediate data storing element 33. The rasterizing unit 4 further includes a reconfigurable rasterizing element 40, a reconfiguration controlling element 41 and a configuration data administering element 42. The units and elements of the above configuration are the same as those of the first embodiment except for the intermediate data paralleling element 37.

The intermediate data paralleling element 37 generates multiple region data pieces for each object of the intermediate data output by the intermediate data generating element 31. The region data pieces indicate a region of an object to be drawn, divided by an area. The hardware configuration ID and the generated region data pieces are added to the object. The process is described with reference to FIG. 62.

Figure 62:
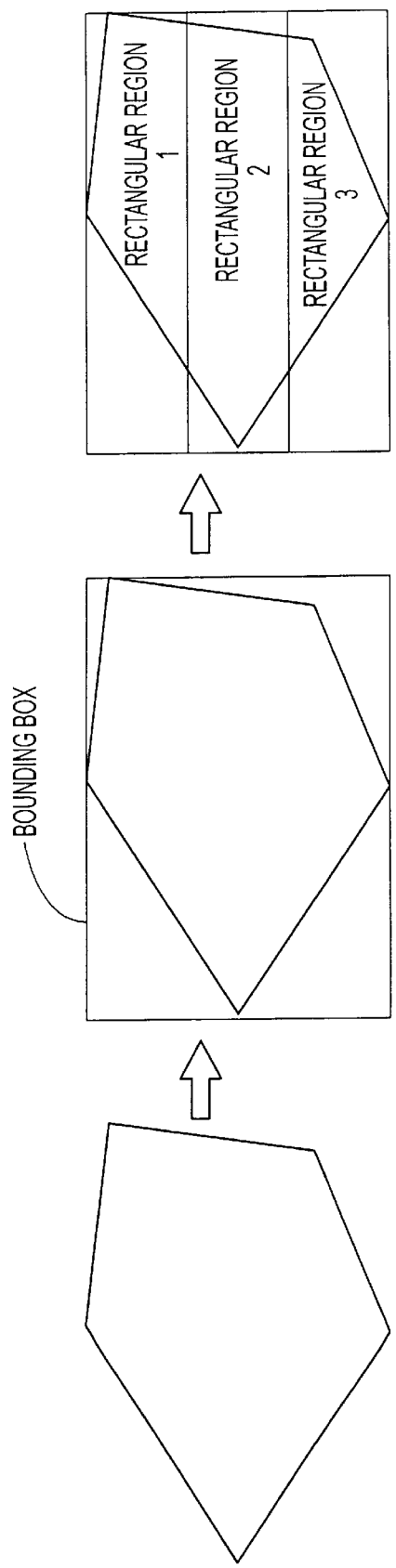
FIG. 62 illustrates division of an object into regions.

In FIG. 62, the case where a region represented by a pentagon is divided into three by drawing regions is taken as an example. At first, the smallest rectangular region circumscribing the pentagon is obtained. Then rectangular regions to divide the previously obtained rectangular region into three are obtained. In the example of FIG. 62, the rectangular region is divided by y-coordinate, but it is also possible to divide the region by x-coordinate or other arbitrary lines. The region data is coordinate data indicating a region thus divided.

In the case of FIG. 62, the region data is represented by coordinates of four apexes of each of rectangular regions 1, 2 and 3. The divisor, i.e., the degree of parallelism for drawing, is determined by selecting a combination satisfying the following inequality based on the scale of the processing circuit available from the rasterizing process IDs of the objects to be processed in parallel:

$$SIZE \geq XN \times SIZE (X) \quad (7)$$

SIZE is a scale of the reconfigurable hardware circuits in the reconfigurable rasterizing element 40. SIZE (X) is a scale of a processing circuit corresponding to the rasterizing process ID X. XN is the degree of parallelism of the processing circuit corresponding to X.

Figure 63:
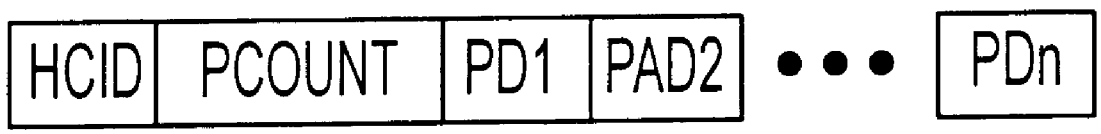
FIG. 63 illustrates addition of hardware configuration ID, number of divided regions and region data to the intermediate data.

The hardware configuration ID can be uniquely obtained based on the rasterizing process ID and the degree of parallelism of processes. The obtained hardware configuration ID, number of divisions and region data are shown in FIG. 63 and are added to each of the object data in the intermediate data format shown in FIG. 8.

The data pieces output by the intermediate data paralleling element 37 are transferred to the intermediate data storing element 33, the band IDs are interpreted therein and the data pieces are stored for each of the bands. As a page output command is interpreted in the phrase interpreting element 30, end-of-page (EOP) is transferred to the intermediate data storing element 33 through the intermediate data generating element 31 and the intermediate data paralleling element 36. The data indicating end-of-data (EOD) is added to the last data piece of each band stored in the intermediate data storing element 33 to clarify the end of the band data. The EOP is also transferred to the rasterizing unit 4 to start the operation of the unit 4.

Figure 65:
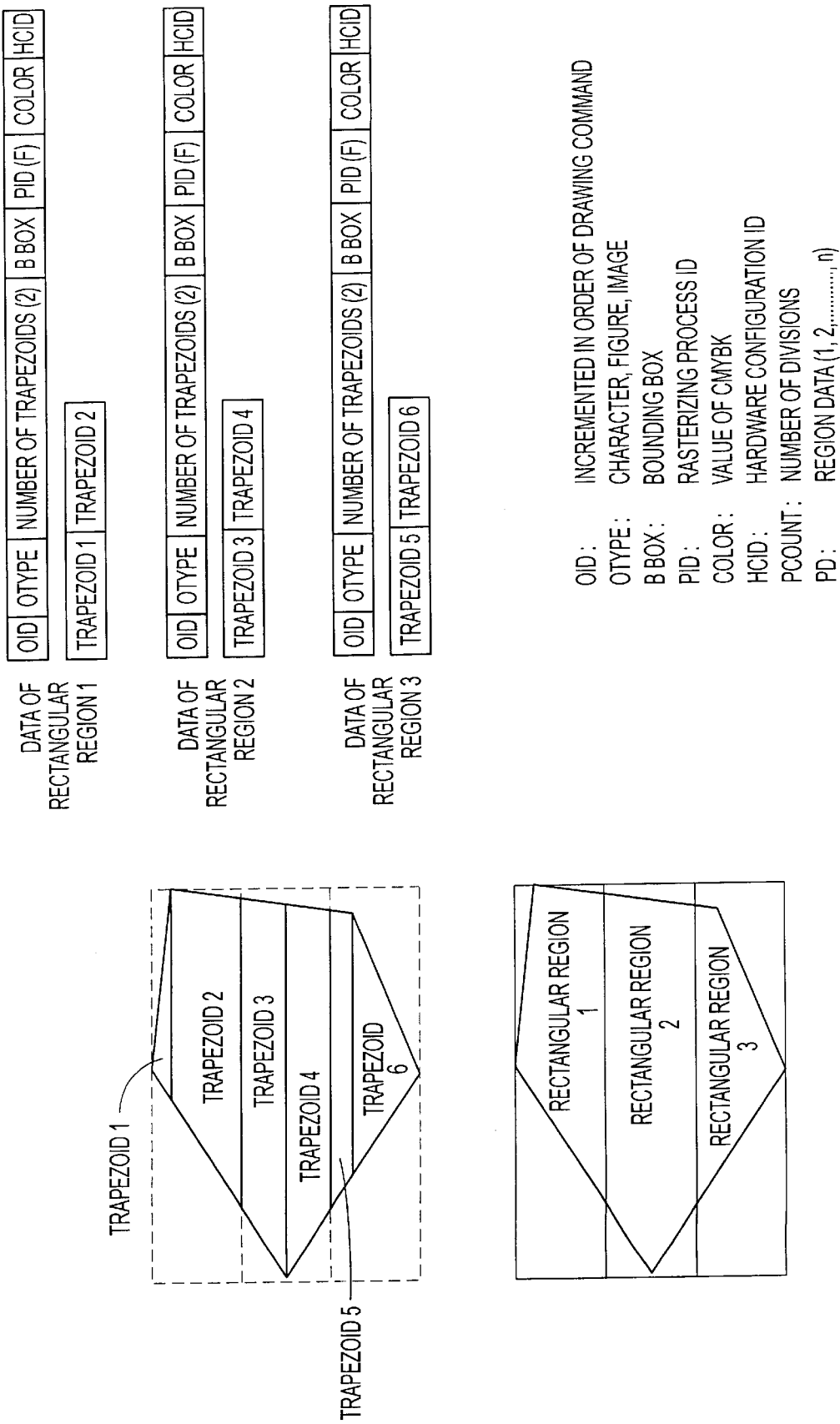
FIG. 65 shows intermediate data divided by region division for parallel processing.

In the present embodiment, the same intermediate data is input to each of the processing circuits rasterizing the image drawing object which has been divided into regions, but the region data pieces are different from each other. However, in dividing the image drawing object into regions in the intermediate data paralleling element 37, it is also possible to divide the intermediate data in conformance with divided region data pieces. The process is described with reference to FIGS. 64 and 65. In FIG. 64, three processing circuits execute processes using the same intermediate data and each piece of the divided region data. One processing circuit deals with region 1 identified by PD1, another processing circuit deals with region 2 identified by PD2, and another processing circuit deals with region 3 identified by PD3. In FIG. 65, intermediate data pieces indicating region 1, region 2 and region 3, respectively, are divided in the intermediate data paralleling element 37 to generate new intermediate data pieces. Each of the new intermediate data pieces includes trapezoids 1 and 2, trapezoids 3 and 4, and trapezoids 5 and 6. The three intermediate data pieces, generated by dividing a single drawing object, are separately input to three processing circuits and processed in parallel.

The region division may be division of a page into band units. It can be realized by adding only data pieces indicating band regions to every intermediate data piece or actually dividing an intermediate data piece into band regions.

The foregoing description of preferred embodiments of this invention has been presented for purposes of illustration and description. It is not intended to be exhaustive or to limit the invention to the precise form disclosed. Modifications and variations are possible in light of the above teachings or may be acquired from practice of the invention.

For example, the reconfigurable hardware element 46 is constructed using a FPGA unit as shown in FIG. 20. However, it is also possible to provide plural operation processing units (arithmetic and logic units) and to control the input/output flow of each unit by a switching element to perform the same functions as the FPGA. In this case, for instance, the operation processing unit can be disposed as the logical block 4621 in FIG. 21. Simple gates can be adopted instead of the cross-point switches 4622 or the switch matrixes 4623.

What is claimed is:

1. A print processing apparatus that rasterizes a first print data, described by a predetermined printer command language representing at least one of a drawing object that can be any of a character, graphics and an image, into a second print data having a data structure for outputting a completed image, and outputs the completed image based on the second print data, comprising:

an inputting element that inputs the first print data, the first print data including a plurality of drawing objects;

a judging element that judges whether there is overlap among at least two of the drawing objects included in the first print data;

a converting element that rearranges the plurality of drawing objects based on at least one of a result of judgment by the judging element and a content of the first print data and converts the first print data into intermediate data of a predetermined format including hardware configuration information;

a hardware element comprising:
 a plurality of configurable processing components that can reconfigure to a type of drawing object based on the hardware configuration information included with the intermediate data;
 a reconfiguration controller component; and
 a switching component that controls a flow of input data and output data of each of the plurality of configurable processing components, the reconfiguration controller component setting a mode of the switching component and a function of at least one of the plurality of configurable processing components corresponding to the hardware configuration information included in the intermediate data, wherein the hardware element receives the intermediate data from the converting element and rasterizes the data into the second print data; and an outputting element that outputs the completed image based on the second print data rasterized by the hardware element.

2. The print processing apparatus as set forth in claim 1, wherein the converting element rearranges the plurality of drawing objects so that the objects which can be rasterized in parallel by the hardware element appear successively.

3. The print processing apparatus as set forth in claim 2, wherein the hardware element executes parallel rasterization with at least one processing module containing a plurality of functional blocks.

4. The print processing apparatus as set forth in claim 3, wherein the functional blocks are the same.

5. The print processing apparatus as set forth in claim 3, wherein at least one of the plurality of functional blocks is different from the other functional blocks.

6. The print processing apparatus as set forth in claim 1, wherein the converting element rearranges the plurality of drawing objects so that the number of times the mode of the switching component and the function of at least one corresponding module is changed, is reduced.

7. The print processing apparatus as set forth in claim 1, wherein the converting element maintains the order of arrangement of the plurality of drawing objects which have been judged to have overlap by the judging element.

8. The print processing apparatus as set forth in claim 1, wherein the judging element judges whether there is overlap among the plurality of drawing objects by using bounding boxes, each circumscribing the drawing object.

9. The print processing apparatus as set forth in claim 1, wherein the converting element rearranges the plurality of drawing objects in a page or in a band generated by dividing a page into units, each including a plurality of scanning lines.

10. The print processing apparatus as set forth in claim 1, wherein the hardware element can change a plurality of functional blocks in the processing module partially or as a whole.

11. The print processing apparatus as set forth in claim 1, wherein the hardware element omits changing of the mode of the switching component and the function of at least one corresponding module in the case where the hardware configuration information in the intermediate data of the predetermined format is the same as that in the data received immediately before.

12. The print processing apparatus as set forth in claim 1, wherein the hardware element includes a field-programmable gate array.

13. The print processing apparatus as set forth in claim 1, wherein the plurality of processing modules is a plurality of operation devices.

14. The print processing apparatus as set forth in claim 1, wherein the converting element further comprises a hardware component that has a plurality of processing modules and a switching part controlling a flow of input data and output data of each of the plurality of processing modules, wherein the hardware component sets a mode of the switching part and a function of at least one processing module corresponding to the mode of the switching part, and wherein at least part of the process executed by the converting element is executed by the hardware component in the converting element.

15. The print processing apparatus as set forth in claim 1, wherein the hardware element executes rasterization by pipeline processing of a plurality of functional blocks in the processing module.

16. A print processing apparatus that rasterizes a first print data, described by a predetermined printer command language representing at least one of a drawing object that can be any of a character, graphics and an image, into a second print data having a data structure for outputting a completed image, and outputs the completed image based on the second print data, comprising:
    an inputting element that inputs the first print data;
    a judging element that judges whether there is overlap among a plurality of drawing objects included in the first print data;
    a converting element that converts the first print data into intermediate data of a predetermined format, including hardware configuration information, based on at least one of a result of judgment by the judging element and a content of the first print data;
    a hardware element comprising:
        a plurality of configurable processing components that can reconfigure to a type of drawing object based on the hardware configuration information included with the intermediate data;
        a reconfiguration controller component; and
        a switching component that controls a flow of input data and output data of each of the plurality of configurable processing components, the reconfiguration controller component setting mode of the switching component and a function of at least one configurable processing components corresponding to the hardware configuration information included in the intermediate data, wherein the hardware element receives the intermediate data from the converting element and a rasterizes the data into the second print data; and
    an outputting element that outputs the completed image based on the second print data rasterized by the hardware element.

17. The print processing apparatus as set forth in claim 16, wherein the converting element converts the first print data, including a plurality of successive drawing objects judged to have no overlap by the judging element, into data of a format including hardware configuration information, which identifies at least one processing module for rasterizing the plurality of drawing objects in parallel.

18. The print processing apparatus as set forth in claim 17, wherein the hardware element executes parallel rasterization with at least one processing module containing a plurality of functional blocks.

19. The print processing apparatus as set forth in claim 18, wherein the functional blocks are the same.

20. The print processing apparatus as set forth in claim 18, wherein at least one of the plurality of functional blocks is different from the other functional blocks.

21. A print processing apparatus that rasterizes a first print data, described by a predetermined printer command language representing at least one of a drawing object that can be any of a character, graphics and an image, into a second print data having a data structure for outputting a completed image, and outputs the completed image based on the second print data, comprising:
    an inputting element that inputs the first print data;
    a converting element that rearranges the drawing objects included in the first print data based on a content of the first print data and converts the first print data into intermediate data of a predetermined format that includes hardware configuration information;
    a hardware element comprising:
        a plurality of configurable processing components that can reconfigure to a type of drawing object based on the hardware configuration information included with the intermediate data;
        a reconfiguration controller component; and
        a switching component controlling a flow of input data and output data of each of the plurality of configurable processing components, wherein the reconfiguration controller component sets a mode of the switching component and a function of at least one of the plurality of configurable processing components corresponding to the hardware configuration information included in the intermediate data, and wherein the hardware element receives the data from the converting element and rasterizes the data into the second print data; and
    an outputting element that outputs the completed image based on the second print data rasterized by the hardware element.

22. The print processing apparatus as set forth in claim 21, wherein the converting element omits the hardware configuration information from the converted data of the predetermined format in the case where the hardware configuration information in the converted data is the same as that in the data converted immediately before.

23. A print processing apparatus, comprising:
    an inputting element that inputs a print data, the print data including drawing objects representing at least one of a character, graphics and an image and described by a precedeterminated printer command language;
    a determining element that determines a drawing region of the drawing object included in the print data;
    a converting element that divides the drawing region, based at least on the drawing region determined by the determining element and a content of the print data, and converts the print data into conversion data including hardware configuration changing information which is set corresponding to the divided drawing region;
    a hardware element comprising:
        a reconfiguration controller component;
        a processing component that changes its configuration in accordance with a type of drawing object in accordance with the hardware configuration changing information included in the conversion data, and rasterizes the conversion data; and an outputting element that outputs the conversion data rasterized by the hardware element.

24. The print processing apparatus as set forth in claim 23, wherein the converting element divides the drawing region based on an area of the drawing object.

25. The print processing apparatus as set forth in claim 23, wherein the converting element divides the drawing region by adding data indicating a drawing region to the conversion data.

26. The print processing apparatus as set forth in claim 25, wherein the converting element divides the drawing region into band units by adding data indicating a band region to the conversion data.

27. The print processing apparatus as set forth in claim 23, wherein the converting element divides the drawing region by dividing the drawing object into units.

28. The print processing apparatus as set forth in claim 27, wherein the units are band units.

29. The print processing apparatus as set forth in claim 23, wherein the hardware element further comprises a clipping component that draws the drawing object only in a divided region.

30. A print processing apparatus comprising:
an inputting element that inputs print data, the print data including drawing objects representing at least one of a character, graphics and an image, and described by a predetermined drawing command;
a converting element that divides the drawing object based on a content of the print data, and converts the print data into conversion data including hardware configuration changing information which is set corresponding to the divided drawing object;
a hardware element that changes its configuration in accordance with the hardware configuration changing information included in the conversion data, and rasterizes the conversion data; and
an outputting element that outputs the conversion data rasterized by the hardware element.

31. A print processing apparatus that rasterizes a first print data, described by a predetermined printer command language representing at least one of a drawing object that can be any of a character, graphics and an image, into a second print data having a data structure for outputting a completed image, and outputs the completed image based on the second print data, comprising:
an inputting element that inputs the first print data, the first print data including a plurality of drawing objects;
a judging element that judges whether there is overlap among at least two of the drawing objects included in the first print data;
a removing element that removes the overlap when it is judged that there is the overlap among the drawing objects by the judging element;
a converting element that rearranges the drawing objects from which the overlap is removed by the removing element and the drawing objects judged to have no overlap by the judging element based on at least a content of the first print data and converts the first print data into intermediate data of a predetermined format including hardware configuration information;
a hardware element comprising:
a plurality of configurable processing modules that can reconfigure to a type of drawing object based on the hardware configuration information included with the intermediate data;
a reconfiguration controller component; and
a switching component that controls a flow of input data and output data of each of the plurality of configurable processing modules, the reconfiguration controller component setting a mode of the switching component and a function of at least one of the plurality of configurable processing modules corresponding to the hardware configuration information included in the intermediate data, wherein the hardware element receives the intermediate data from the converting element and rasterizes the data into the second print data; and
an outputting element that outputs the completed image based on the second print data rasterized by the hardware element.

32. A method of rasterizing a first print data, described by a predetermined printer command language representing at least one of a drawing object that can be any of a character, graphics and an image, into a second print data having a data structure for outputting a completed image, and outputting the completed image based on the second print data, comprising:
inputting the first print data including a plurality of drawing objects;
determining whether there is overlap among at least two of the drawing objects included in the first print data;
rearranging the plurality of drawing objects based on the result of the determining step and the content of the drawing objects;
converting the first print data into intermediate data of a predetermined format, using a converting element, including hardware configuration information, based on at least on of a result of judgment by the judging element and a content of the first print data;
utilizing the hardware configuration information to configure at least one configurable processing component to a type of drawing object, by the use of a reconfiguration controller component;
controlling the flow of input data and output data of each of the at least one configurable processing components by the use of a switching component;
rasterizing the intermediate data into second print data corresponding to the hardware configuration information; and
outputting an image based on the second print data.

33. A method of rasterizing first print data, described by a predetermined printer command language representing at least one of a drawing object that can be any of a character, graphics and an image, into second print data having a data structure for outputting a completed image, and outputting the completed image based on the second print data, comprising:
inputting the first print data;
determining, using a judging element, whether there is overlap among a plurality of drawing objects included in the first print data;
converting the first print data into intermediate data of a predetermined format including hardware configuration information, based on at least one of a result of the determining step and a content of the first print data using a converting element;
utilizing the hardware configuration information to configure a configurable processing component to a type of drawing object using a reconfiguration control element;

rasterizing the intermediate data, using the configurable processing element, into second print data corresponding to the hardware configuration information; and outputting the completed image based on the second print data.

34. A method of rasterizing a first print data, described by a printer command language, representing at least one of a drawing object that can be any of a character, graphics and an image, into second print data having a data structure for outputting a completed image, comprising:

inputting the first print data;

rearranging the drawing objects included in the first print data based on a content of the first print data;

converting the first print data into intermediate data of a predetermined format that includes hardware configuration information using a converting element;

utilizing the hardware configuration information to configure a configurable processing component to a type of drawing element; and rasterizing the intermediate data, using the configurable processing element into second print data corresponding to the hardware configuration information.

35. A method of rasterizing print data, comprising:

inputting print data, the print data including drawing objects representing at least one of a character, graphics and an image and described by a predetermined drawing command;

determining the drawing region of the drawing object included in the print data, using a determining element;

dividing the drawing region based at least on the drawing region determined by the determining step and a content of the print data;

converting the print data into conversion data, the conversion data including hardware configuration changing information which is set corresponding to the divided drawing region, using a converting element;

changing the configuration of a hardware element to a type of drawing object, in accordance with the hardware configuration changing information included in the conversion data, using a reconfiguration controller element;

rasterizing the conversion data, using the hardware element; and outputting the rasterized conversion data rasterized by the hardware element.

36. A method of rasterizing print data comprising:

inputting print data, the print data including drawing objects representing at least one of a character, graphics and an image and described by a predetermined drawing command;

dividing the drawing object, using a converting element based on a content of the print data;

converting the print data into conversion data, using the converting element, the conversion data including hardware configuration changing information which is set corresponding to the divided drawing object;

changing the configuration of a hardware element to a type of drawing object, in accordance with the hardware configuration changing information included in the conversion data, using a reconfiguration control element;

rasterizing the conversion data using the hardware element; and outputting the rasterized conversion data.

* * * * *